US010372248B2

(12) United States Patent
Endo et al.

(10) Patent No.: US 10,372,248 B2
(45) Date of Patent: Aug. 6, 2019

(54) DISPLAY DEVICE CONFIGURED TO OPERATE DISPLAY DRIVE AND TOUCH SENSING IN TIME SHARING MANNER AND SEMICONDUCTOR DEVICE TO BE EMPLOYED THEREON

(71) Applicant: SYNAPTICS INCORPORATED, San Jose, CA (US)

(72) Inventors: Kazuya Endo, Tokyo (JP); Shinobu Nohtomi, Tokyo (JP); Nobukazu Tanaka, Tokyo (JP); Tomohiro Hirakawa, Tokyo (JP); Hiroshi Takeyama, Tokyo (JP); Takayuki Noto, Tokyo (JP); Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 252 days.

(21) Appl. No.: 15/297,540

(22) Filed: Oct. 19, 2016

(65) Prior Publication Data

US 2018/0107309 A1 Apr. 19, 2018

(51) Int. Cl.
*G09G 3/36* (2006.01)
*G06F 3/041* (2006.01)

(52) U.S. Cl.
CPC .......... *G06F 3/0412* (2013.01); *G06F 3/0416* (2013.01); *G09G 3/3614* (2013.01); *G09G 3/3655* (2013.01); *G09G 2310/0289* (2013.01); *G09G 2310/08* (2013.01); *G09G 2330/02* (2013.01)

(58) Field of Classification Search
CPC ............................. G06F 3/0412; G06F 3/0416
See application file for complete search history.

(56) References Cited

U.S. PATENT DOCUMENTS

| 2014/0132525 | A1 | 5/2014 | Pyo et al. | |
|---|---|---|---|---|
| 2015/0301639 | A1* | 10/2015 | Shin | G06F 3/0412 345/173 |
| 2016/0085363 | A1 | 3/2016 | Azumi et al. | |
| 2016/0241139 | A1* | 8/2016 | Yao | G06F 1/3262 |
| 2017/0102825 | A1* | 4/2017 | Kim | G06F 3/0418 |

* cited by examiner

*Primary Examiner* — Amr A Awad
*Assistant Examiner* — Maheen I Javed
(74) *Attorney, Agent, or Firm* — Patterson + Sheridan, LLP

(57) ABSTRACT

The semiconductor device is intended for connection with an in-cell type display touch panel having a plurality of common electrodes, a reference voltage for display is applied to the common electrodes in a display drive period, and the common electrodes serve as sensor electrodes in a touch detection period. The semiconductor device includes a DC level shift circuit operable to shift the DC level of a toggle signal output by a toggle drive circuit to the reference voltage. The semiconductor device supplies the reference voltage to the common electrodes of the display touch panel in the display drive period, and performs a guarding action in which at least a part of the plurality of common electrodes is supplied with a toggle signal shifted in DC level in the touch detection period.

22 Claims, 28 Drawing Sheets

DISPLAY DEVICE CONFIGURED TO OPERATE DISPLAY DRIVE AND TOUCH SENSING IN TIME SHARING MANNER AND SEMICONDUCTOR DEVICE TO BE EMPLOYED THEREON

BACKGROUND

The present invention relates to a display device and a semiconductor device to be employed thereon, especially one which can be preferably used for a display device having a display touch panel arranged to operate display drive and touch detection in a time sharing manner.

Many in-cell type display touch modules each having a display panel and a touch panel which are integrally laminated are adopted for mobile products including smart phones in recent years. In such an in-cell type display touch module, common electrodes are shared. On a display touch module like this, a semiconductor IC (IC: Integrated Circuit) operable to drive and control an in-cell type display touch panel and termed TDDI (Touch and Display Driver Integration) is employed; display driver and touch controller functions are integrated in the semiconductor IC. TDDI drives common electrodes concerned as common electrodes for display in a display drive period, and drives the common electrodes as drive electrodes each forming a sensor capacitance between itself and a detection electrode opposed thereto in a touch detection period.

US Patent Application Publication No. 2016/0085363 (Patent Document 1, which is U.S. Patent Application based on Japanese Patent Application (No. 2014-189705)) discloses a display device which performs display and touch detection alternately. A one-frame period is constituted by a plurality of units; each unit is divided into a period during which a video is displayed, and a period (a blanking period) during which video display is paused. The display device can perform the action of detecting a touch position in the blanking period. The display device includes an active matrix liquid crystal display panel having a plurality of pixel electrodes PE arranged in a matrix, and a control circuit CTR supplies a common voltage Vcom to the common electrodes COME of the plurality of pixel electrodes PE (FIG. 1). The common electrodes COME are formed in a stripe pattern; a capacitance CC for touch detection is formed between each common electrode and a corresponding detection electrode DETE (FIGS. 8 and 9).

The common electrodes COME are used for video display and also used as electrodes for detection of a touch position in this way, which are driven in a time sharing manner. Specifically, the common electrodes COME are driven by drive pulses TSVCOM in a period during which a display action is paused (FIG. 10B).

US Patent Application Publication No. 2014/0132525 (Patent Document 2) discloses a display touch panel of the same in-cell type, in which a self-capacitive method is adopted for touch detection. On a self-capacitive type panel 100, a plurality of electrodes 110 for touch detection are arranged as if they cover an entire surface of the panel as shown in FIG. 3. Each electrode 110 is connected with a sampling voltage generating unit 210 and a touch sensing unit 230 through a wiring line 120 and a switching unit 240.

SUMMARY

The semiconductor device is intended for connection with an in-cell type display touch panel, which is arranged as described below.

The in-cell type display touch panel has a plurality of common electrodes to which a reference voltage for display is applied in a display drive period, the common electrodes serving as sensor electrodes in a touch detection period.

The semiconductor device includes: a plurality of terminals connected with the plurality of common electrodes of the display touch panel, respectively; a plurality of select circuits connected with the plurality of terminals, respectively; a touch detection circuit corresponding to the plurality of select circuits; a reference voltage drive circuit for supplying the reference voltage to the display touch panel; a toggle drive circuit for supplying a toggle signal to the sensor electrodes; a DC level shift circuit; and a timing control circuit.

The DC level shift circuit is a circuit operable to shift the DC level of a toggle output which is an output signal of the toggle drive circuit to the reference voltage output by the reference voltage drive circuit.

The timing control circuit controls the plurality of select circuits to supply a reference voltage output of the reference voltage drive circuit to the plurality of terminals in the display drive period. Further, the timing control circuit controls the plurality of select circuits to supply a detection signal input from one of the plurality of terminals to the touch detection circuit, and to supply an output of the DC level shift circuit to at least a part of the plurality of terminals other than the one terminal in the touch detection period.

DETAILED DESCRIPTION

Figure 1:
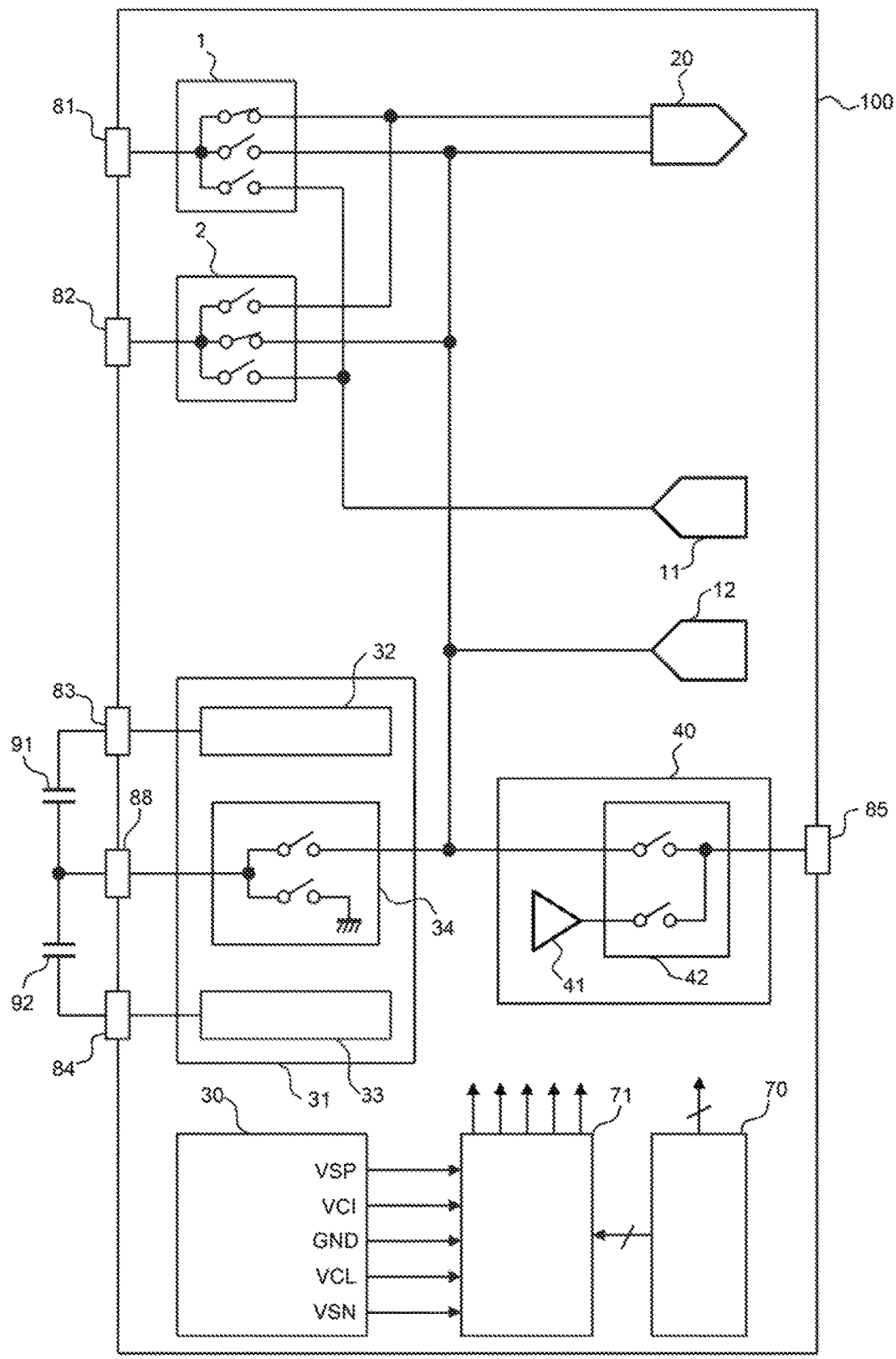
FIG. 1 is a block diagram showing an example of the configuration of a semiconductor device connectable with an in-cell type display touch panel (Study Example)

After examination on the US Patent Application Publications No. 2016/0085363 (Patent Document 1) and No. 2014/0132525 (Patent Document 2), the inventor found a new problem as described below.

That is, it has been found that in addition to frequency components of drive pulses input for touch detection, signals of low-frequency components produced by a time-sharing action are applied to a common electrode, and the low-frequency signal components owing to the time-sharing action are in danger of getting in a human audible frequency band. It has been also found that in such a case, the signals applied to the common electrode cause the charge/discharge of a surrounding parasitic capacitance as well as a capacitance between itself and each detection electrode and thus, cause the physical expansion and contraction of a display touch panel and vibrate the air around it, and a person (user) probably perceives the vibration as sound.

It has been revealed that the phenomenon like this is more remarkable in the case of performing a guard (guarding) action in a self-capacitive touch detection in which the approach of a conductive substance to a sensor capacitance is detected as a touch by observing electric charges charged and discharged while drive pulses are applied to a common electrode.

The guarding action refers to an action for minimizing the influence of a non-detection target electrode in self-capacitive touch detection as described in Patent Document 2, in which the same drive pulses as those put on the detection target electrode are applied to the non-detection target electrode. Since a detection target electrode and other electrodes around it are always put at the same potential, the influence of a parasitic capacitance can be excluded.

However, even in this case, no drive pulse is applied to e.g. the device housing and other members and their potentials remain fixed. So, a large-area capacitance is formed between them and all of the electrodes to which drive pulses are applied by the guarding action. The noise that the capacitance like this generates owing to the physical expansion and contraction is large in signal level because of being a large-area capacitance and therefore, the noise can reach a level of audible noise which a person (user) can perceive.

Thus, the problem of audible noise, stemming from the time-sharing action for display and touch detection turns out to be more remarkable in the case of performing the guarding action.

While means for solving the problem like this will be described below, other problems and novel features will become apparent from the description hereof and the accompanying diagrams.

The means for solving the problem according to one embodiment is as follows.

That is a semiconductor device to be connected with an in-cell type display touch panel, which is arranged as follows.

The in-cell type display touch panel has a plurality of common electrodes to which a reference voltage for display is applied in a display drive period, the common electrodes serving as sensor electrodes in a touch detection period.

The semiconductor device includes: a plurality of terminals connected with the plurality of common electrodes of the display touch panel, respectively; a plurality of select circuits connected with the plurality of terminals, respectively; a touch detection circuit corresponding to the plurality of select circuits; a reference voltage drive circuit for supplying the display touch panel with the reference voltage; a toggle drive circuit for supplying the sensor electrodes with toggle signals; a DC level shift circuit; and a timing control circuit.

The DC level shift circuit is a circuit operable to shift the DC level of a toggle output, which is an output signal of the toggle drive circuit, to the reference voltage output by the reference voltage drive circuit.

The timing control circuit controls the plurality of select circuits to supply a reference voltage output of the reference voltage drive circuit to the plurality of terminals in the display drive period. Further, in the touch detection period, the timing control circuit controls the plurality of select circuits to supply the touch detection circuit with a detection signal input from one of the plurality of terminals, and to supply an output of the DC level shift circuit to at least a part of the plurality of terminals other than the one terminal.

The effect achieved by the embodiment will be briefly described below.

The fluctuation of the DC level of signals supplied to the part of the terminals in a display drive period and a touch detection period can be minimized. Therefore, the generation of audible noise stemming from the time-sharing action for display driving and touch detection can be suppressed.

1. Summary of the Embodiments

First, the summary of the representative embodiments disclosed in the present application will be described. Reference numerals and others in the diagrams in parentheses referred to in the description of the summary of the representative embodiments just denote components included in the concept of the components to which the reference numerals and others are designated.

[1] Semiconductor Device with DC Level Shift Circuit Operable to Bring Guarding Toggle Signal DC Level Closer to VCOM A semiconductor device (100) is to be connected with an in-cell type display touch panel, and it is arranged as follows.

The display touch panel has a plurality of common electrodes to which a reference voltage (VCOM) for display is applied in a display drive period, and which serve as sensor electrodes in a touch detection period.

The semiconductor device includes: a plurality of terminals (81, 82) connected with the plurality of common electrodes of the display touch panel, respectively; a plurality of select circuits (1, 2) connected with the plurality of terminals, respectively; a touch detection circuit (20); a reference voltage drive circuit (11) for supplying the display touch panel with the reference voltage; a toggle drive circuit (12) for supplying the sensor electrodes with toggle signals; a DC level shift circuit (13); and a timing control circuit (70).

The DC level shift circuit is a circuit operable to shift the DC level of a toggle output, which is an output signal of the toggle drive circuit, to the reference voltage output by the reference voltage drive circuit.

The timing control circuit controls the plurality of select circuits to supply a reference voltage output of the reference voltage drive circuit to the plurality of terminals in the display drive period. Further, in the touch detection period, the timing control circuit controls the select circuits to supply the touch detection circuit with a detection signal input from one terminal (81) of the plurality of terminals in the touch detection period, and to supply an output of the DC level shift circuit to at least a part (82) of the plurality of terminals other than the one terminal.

According to the embodiment, the fluctuation in the DC level of a signal supplied to the part of the terminals can be minimized in a display drive period and a touch detection period. Therefore, the generation of audible noise stemming from the time-sharing action for display driving and touch detection can be suppressed.

[2] DC Level Shift Circuit which Utilizes HiZ Output from VCOM and Coupling Capacitance In the semiconductor device as described in [1], the DC level shift circuit has a pair of connection terminals (86, 87) to externally attach a capacitance (93) to; and the toggle drive circuit outputs the toggle output to one connection terminal (87) of the connection terminal pair. The timing control circuit performs control so that an output to the other connection terminal (86) of the connection terminal pair from the reference voltage drive circuit becomes the reference voltage output in the display drive period, and the output becomes high impedance in the touch detection period.

According to the embodiment, the DC level shift circuit can be arranged simply.

[3] DC Level Shift Circuit which Utilizes Weak Output from VCOM and Coupling Capacitance In the semiconductor device as described in [1], the DC level shift circuit has a pair of connection terminals (86, 87) for external attachment of a capacitance (93); and the toggle drive circuit outputs the toggle output to one connection terminal (87) of the connection terminal pair. The timing control circuit performs control so as to output the reference voltage output from the reference voltage drive circuit to the other connection terminal of the connection terminal pair (86) directly in the display drive period, or through a resistance in the touch detection period.

According to the embodiment, the DC level shift circuit can be arranged simply. Especially, even with a large electric charge leaking out of a sensor electrode of a display touch panel connected therewith, the reference voltage output to the part of the terminals in a display drive period is retained also in a touch detection period.

[4] Making an Output of the Toggle Drive Circuit a Center Value of a Toggle Signal Amplitude During a Display Drive Period In the semiconductor device as described in [2] or [3], an output of the toggle drive circuit in the display drive period coincides with the DC level of the toggle output in the touch detection period.

According to the embodiment, a potential difference across the externally attached capacitance serving to cut a DC component of a toggle signal (VGUARD) remains unchanged regardless of whether the device is in the display drive period or the touch detection period and thus, the stability of the toggle signal DC level after DC level shift is increased further.

[5] Power Source Select Circuit for Select of Power Supply to AFE_MUX (First Embodiment)

The semiconductor device as described in [1] further includes: a power source circuit (30); and a power source select circuit (71).

The power source circuit supplies a first positive voltage (VSP), a second positive voltage (VCI) lower than the first positive voltage, a ground voltage (GND), a first negative voltage (VSN), and a second negative voltage (VCL) higher than the first negative voltage. The reference voltage (VCOM) for display is lower than the ground voltage, and higher than the second negative voltage.

The power source circuit supplies the toggle drive circuit with the first positive voltage and the ground voltage as a power source, supplies the reference voltage drive circuit with the second positive voltage and the second negative voltage as a power source, and supplies the touch detection circuit with the first positive voltage and the ground voltage as a power source.

The timing control circuit causes the power source to be supplied from the power source circuit through the power source select circuit in such a way that the plurality of select circuits (1, 2) are supplied with the second positive voltage and the second negative voltage as the power source in the display drive period and that in the touch detection period, the select circuit (1) corresponding to the part of the plurality of terminals is supplied with the second positive voltage and the second negative voltage as the power source and the other select circuits (2) are supplied with the first positive voltage and the ground voltage as the power source.

According to the embodiment, the breakdown voltages of all the elements for constituting the circuits of the semiconductor device can be kept low. In other words, these circuits can be arranged by use of elements having endurance against a potential difference between the first positive voltage and the ground voltage, a potential difference between the second positive voltage and the second negative voltage, and a potential difference between the ground voltage and the first negative voltage, respectively.

[6] Omitting the Power Source Select Circuit by VSP/VSN Supply to AFE_MUX (Second Embodiment)

The semiconductor device as described in [1] further includes a power source circuit (30).

The power source circuit supplies a first positive voltage (VSP), a second positive voltage (VCL) lower than the first positive voltage, a ground voltage (GND), a first negative voltage (VSN), and a second negative voltage (VCL) higher than the first negative voltage. The reference voltage (VCOM) for display is lower than the ground voltage and higher than the second negative voltage.

The power source circuit supplies the toggle drive circuit with the first positive voltage and the ground voltage as a power source, supplies the reference voltage drive circuit with the first positive voltage and the first negative voltage as a power source, supplies the touch detection circuit with the first positive voltage and the ground voltage as a power source, and supplies the plurality of select circuits with the first positive voltage and the first negative voltage as a power source.

Thus, the need for switching the source voltage can be avoided even in the case of the reference voltage for display varying in a wide range because of the necessity for supporting various display touch panels.

[7] Configuration on the Negative Polarity Side (Fifth Embodiment)

The semiconductor device as described in [1] further includes: a power source circuit (30); and a power source select circuit (71).

The power source circuit supplies: a first positive voltage (VSP); a second positive voltage (VCI) lower than the first positive voltage; a ground voltage (GND); a first negative voltage (VSN); and a second negative voltage (VCL) higher than the first negative voltage. The reference voltage (VCOM) for display is lower than the ground voltage and higher than the second negative voltage.

The power source circuit supplies the toggle drive circuit with the ground voltage and the first negative voltage as a power source, supplies the reference voltage drive circuit with the second positive voltage and the second negative voltage as a power source, and supplies the touch detection circuit with the ground voltage and the first negative voltage as a power source.

The timing control circuit causes the power source to be supplied from the power source circuit through the power source select circuit in such a way that the plurality of select circuits (1, 2) are supplied with the second positive voltage and the second negative voltage as the power source in the display drive period, and that in the touch detection period, the select circuit (1) corresponding to the part of the plurality of terminals is supplied with the second positive voltage and the second negative voltage as the power source, and the other select circuits (2) are supplied with the ground voltage and the first negative voltage as the power source.

According to the embodiment, the breakdown voltages of all the elements for constituting the circuits of the semiconductor device can be kept low. In other words, these circuits can be arranged by use of elements having endurance against a potential difference between the first positive voltage and the ground voltage, a potential difference between the second positive voltage and the second negative voltage, and a potential difference between the ground voltage and the first negative voltage, respectively.

[8] Power Sources all Arranged on the Negative Polarity Side (Sixth Embodiment)

The semiconductor device as described in [1] further includes a power source circuit (30).

The power source circuit supplies a first positive voltage (VSP), a second positive voltage (VCI) lower than the first positive voltage, a ground voltage (GND), a first negative voltage (VSN), and a second negative voltage (VCL) higher than the first negative voltage. The reference voltage (VCOM) for display is lower than the ground voltage and higher than the second negative voltage.

The power source circuit supplies the toggle drive circuit with the ground voltage and the first negative voltage as a power source, supplies the reference voltage drive circuit with the ground voltage and the first negative voltage as a power source, supplies the touch detection circuit with the ground voltage and the first negative voltage as a power source, and supplies the plurality of select circuits with the ground voltage and the first negative voltage as a power source.

Thus, the need for switching the source voltage can be avoided even in the case of the reference voltage for display varying in a wide range because of the necessity for supporting various display touch panels.

[9] Toggling a Source Voltage to be Supplied to AFE_MUX (Third Embodiment)

The semiconductor device as described in [1] further includes: a power source circuit (30); and a power source select circuit (71).

The power source circuit supplies a first positive voltage (VSP), a second positive voltage (VCI) lower than the first positive voltage, a ground voltage (GND), a first negative voltage (VSN), and a second negative voltage (VCL) higher than the first negative voltage. The reference voltage (VCOM) for display is lower than the ground voltage and higher than the second negative voltage.

The power source circuit supplies the toggle drive circuit with the first positive voltage and the ground voltage as a power source, supplies the reference voltage drive circuit with the second positive voltage and the second negative voltage as a power source, and supplies the touch detection circuit with the first positive voltage and the ground voltage as a power source.

The timing control circuit causes the power source to be supplied from the power source circuit through the power source select circuit in such a way that the plurality of select circuits (1, 2) are supplied with the second positive voltage and the second negative voltage as the power source in the display drive period, and that in the touch detection period, the select circuit (2) corresponding to the part of the plurality of terminals is supplied with a voltage (toggled VH_MUX) alternating between the first positive voltage and the ground voltage in synchronization with the toggle output in positive polarity, and a voltage (toggled VL_MUX) alternating between the ground voltage and the first negative voltage in synchronization with the toggle output in negative polarity as the power source, and the other select circuit (1) is supplied with the first positive voltage and the ground voltage as the power source.

According to the embodiment, even in the case of the reference voltage for display spreading over a wide range because of the necessity for supporting various display touch panels, the breakdown voltages of all the elements for constituting all the circuits in the semiconductor device can be kept low.

In other words, these circuits can be arranged by use of elements having endurance against a potential difference between the first positive voltage and the ground voltage, a potential difference between the second positive voltage and the second negative voltage, and a potential difference between the ground voltage and the first negative voltage, respectively.

[10] Example of the Circuit Operable to Toggle a Source Voltage to be Supplied to AFE_MUX (Third Embodiment)

The semiconductor device as described in [9] further includes: a common connection terminal (87) for connecting one terminals of first and second capacitances (93, 94) to be attached externally in common; a first connection terminal (86) for connecting the other electrode of the first capacitance; and a second connection terminal (89) for connecting the other electrode of the second capacitance.

The toggle drive circuit outputs the toggle output to the common connection terminal. The timing control circuit performs control in such a way that an output from the reference voltage drive circuit to the first connection terminal is made the reference voltage output in the display drive period, and that in the touch detection period, the output of the reference voltage drive circuit is made high impedance or given to the first connection terminal after passing through a resistance.

The voltage (toggled VH_MUX) supplied, in positive polarity, to the select circuit corresponding to the part of the plurality of terminals from the power source circuit through the power source select circuit in the touch detection period is the toggle output, and the voltage (toggled VL_MUX) supplied thereto in negative polarity is supplied from the second connection terminal.

According to the embodiment, the circuit for toggling a source voltage to be supplied to the AFE select circuit can be arranged simply.

[11] DC Block (Fourth Embodiment)

In the semiconductor device as described in [1], the touch detection circuit includes a differential amplifier circuit having a pair of input terminals to which differential signals are input, and the toggle output is supplied to one input terminal of the input terminal pair; and the touch detection circuit has a DC voltage level shift circuit (23) operable to shift the DC voltage level at the other input terminal.

The timing control circuit controls the plurality of select circuits to enter a signal input to the one terminal (81) into the touch detection circuit (20) through the DC voltage level shift circuit in the touch detection period.

The semiconductor device further includes a power source circuit (30).

The power source circuit supplies a first positive voltage (VSP), a second positive voltage (VCI) lower than the first positive voltage, a ground voltage (GND), a first negative voltage (VSN), and a second negative voltage (VCL) higher than the first negative voltage. The reference voltage (VCOM) for display is lower than the ground voltage and higher than the second negative voltage.

The power source circuit supplies the toggle drive circuit with the first positive voltage and the ground voltage as a power source, supplies the reference voltage drive circuit with the second positive voltage and the second negative voltage as a power source, supplies the touch detection circuit with the first positive voltage and the ground voltage as a power source, and supplies the plurality of select circuits with the second positive voltage and the second negative voltage as a power source.

Thus, the need for switching the source voltage can be avoided even in the case of the reference voltage for display varying in a wide range because of the necessity for supporting various display touch panels.

[12] DC Block Circuit Configuration (Fourth Embodiment)

In the semiconductor device as described in [11], the DC voltage level shift circuit includes a capacitive element between the other input terminal, and the corresponding one of the plurality of select circuits.

According to the embodiment, the DC voltage level shift circuit (DC block) can be arranged simply.

[13] Display Device Including a Semiconductor Device with a DC Level Shift Circuit Operable to Bring DC Level of a Toggle Signal for Guarding Closer to VCOM A display device (1000) includes: an in-cell type display touch panel (200); and a semiconductor device (100) connected with the display touch panel. The display device is arranged as follows.

The display touch panel has common electrodes to which a reference voltage (VCOM) for display is applied in a display drive period, and the plurality of common electrodes serve as sensor electrodes in a touch detection period.

The semiconductor device includes: a plurality of terminals (81, 82) connected with the plurality common electrodes of the display touch panel, respectively; a plurality of select circuits (1, 2) connected with the plurality of terminals, respectively; a touch detection circuit (20); a reference voltage drive circuit (11) for supplying the display touch panel with the reference voltage; a toggle drive circuit (12) for supplying the sensor electrode with toggle signals; a DC level shift circuit (13); and a timing control circuit (70).

The DC level shift circuit is a circuit operable to shift the DC level of a toggle output, which is an output signal of the toggle drive circuit, to the reference voltage output by the reference voltage drive circuit.

The timing control circuit controls the plurality of select circuits to supply a reference voltage output of the reference voltage drive circuit to the plurality of terminals in the display drive period. In addition, the timing control circuit controls the plurality of select circuits to supply a detection signal input from one terminal (81) of the plurality of terminals to the touch detection circuit in the touch detection period, and to supply an output of the DC level shift circuit to at least a part (82) of the plurality of terminals other than the one terminal.

According to the embodiment, the fluctuation in the DC level of a signal supplied to the part of the terminals can be minimized in a display drive period and a touch detection period. Therefore, the generation of audible noise stemming from the time-sharing action for display driving and touch detection can be suppressed.

[14] DC Level Shift Circuit which Utilizes HiZ Output from VCOM and Coupling Capacitance The display device described in [13] further includes a capacitance (93) for constituting the DC level shift circuit; the semiconductor device has a pair of connection terminals (86, 87) for connecting the capacitance; and the toggle drive circuit outputs the toggle output to one connection terminal (87) of the connection terminal pair.

The timing control circuit performs control so that an output to the other connection terminal (86) of the connection terminal pair from the reference voltage drive circuit becomes the reference voltage output in the display drive period, and the output becomes high impedance in the touch detection period.

According to the embodiment, the DC level shift circuit can be arranged simply.

[15] DC Level Shift Circuit which Utilizes Weak Output from VCOM and Coupling Capacitance The display device as described in [13] further includes a capacitance (93) for constituting the DC level shift circuit; the semiconductor device has a pair of connection terminals (86, 87) for connecting the capacitance; and the toggle drive circuit outputs the toggle output to one connection terminal (87) of the connection terminal pair.

The timing control circuit performs control so as to output the reference voltage output from the reference voltage drive circuit to the other connection terminal (86) of the connection terminal pair directly in the display drive period or through a resistance in the touch detection period.

According to the embodiment, the DC level shift circuit can be arranged simply. Especially, even with a large electric charge leaking out of a sensor electrode of a display touch panel connected therewith, the reference voltage output to the part of the terminals in a display drive period is retained also in a touch detection period.

[16] Making an Output of the Toggle Drive Circuit During a Display Drive Period a Center Value of a Toggle Signal Amplitude In the display device as described in [14] or [15], the toggle drive circuit is arranged so that its output in the display drive period coincides with the DC level of the toggle output in the touch detection period.

According to the embodiment, a potential difference across the externally attached capacitance serving to cut a DC component of a toggle signal (VGUARD) remains unchanged regardless of whether the device is in the display drive period or the touch detection period and thus, the stability of the toggle signal DC level after DC level shift is increased further.

[17] Power Source Select Circuit for Select of Power Supply to AFE_MUX (First Embodiment)

In the display device as described in [13], the semiconductor device further includes a power source circuit (30), and a power source select circuit (71).

The power source circuit supplies a first positive voltage (VSP), a second positive voltage (VCI) lower than the first positive voltage, a ground voltage (GND), a first negative voltage (VSN), and a second negative voltage (VCL) higher than the first negative voltage. The reference voltage (VCOM) for display is lower than the ground voltage and higher than the second negative voltage.

The power source circuit supplies the toggle drive circuit with the first positive voltage and the ground voltage as a power source, supplies the reference voltage drive circuit with of the second positive voltage and the second negative voltage as a power source, and supplies the touch detection circuit with the first positive voltage and the ground voltage as a power source.

The timing control circuit causes the power source to be supplied from the power source circuit through the power source select circuit in such a way that the plurality of select circuits (1, 2) are supplied with the second positive voltage and the second negative voltage as the power source in the display drive period, and that in the touch detection period, the select circuit (1) corresponding to the part of the plurality of terminals is supplied with the second positive voltage and the second negative voltage as the power source and the other select circuits (2) are supplied with the first positive voltage and the ground voltage as the power source.

According to the embodiment, the breakdown voltages of all the elements for constituting the circuits of the semiconductor device can be kept low. In other words, these circuits can be arranged by use of elements having endurance against a potential difference between the first positive voltage and the ground voltage, a potential difference between the second positive voltage and the second negative voltage, and a potential difference between the ground voltage and the first negative voltage, respectively.

[18] Arrangement on the Negative Polarity Side (Fifth Embodiment)

In the display device as described in [13], the semiconductor device further includes a power source circuit (30) and a power source select circuit (71).

The power source circuit supplies a first positive voltage (VSP), a second positive voltage (VCI) lower than the first positive voltage, a ground voltage (GND), a first negative voltage (VSN), and a second negative voltage (VCL) higher than the first negative voltage. The reference voltage (VCOM) for display is lower than the ground voltage and higher than the second negative voltage.

The power source circuit supplies the toggle drive circuit with the ground voltage and the first negative voltage as a power source, supplies the reference voltage drive circuit with the second positive voltage and the second negative voltage as a power source, and supplies the touch detection circuit with the ground voltage and the first negative voltage as a power source.

The timing control circuit causes the power source to be supplied from the power source circuit through the power source select circuit in such a way that the plurality of select circuits (1, 2) are supplied with the second positive voltage and the second negative voltage as the power source in the display drive period, and that in the touch detection period, the select circuit (1) corresponding to the part of the plurality of terminals is supplied with the second positive voltage and the second negative voltage as the power source, and the other select circuits (2) are supplied with the ground voltage and the first negative voltage as the power source.

According to the embodiment, the breakdown voltages of all the elements for constituting the circuits of the semiconductor device can be kept low. In other words, these circuits can be arranged by use of elements having endurance against a potential difference between the first positive voltage and the ground voltage, a potential difference between the second positive voltage and the second negative voltage, and a potential difference between the ground voltage and the first negative voltage, respectively.

[19] Toggling a Source Voltage to be Supplied to AFE_MUX (Third Embodiment)

In the display device as described in [13], the semiconductor device further includes a power source circuit (30) and a power source select circuit (71).

The power source circuit supplies a first positive voltage (VSP), a second positive voltage (VCI) lower than the first positive voltage, a ground voltage (GND), a first negative voltage (VSN), and a second negative voltage (VCL) higher than the first negative voltage. The reference voltage (VCOM) for display is lower than the ground voltage and higher than the second negative voltage.

The power source circuit supplies the toggle drive circuit with the first positive voltage and the ground voltage as a power source, supplies the reference voltage drive circuit with the second positive voltage and the second negative voltage as a power source, and supplies the touch detection circuit with the first positive voltage and the ground voltage as a power source.

The timing control circuit causes the power source to be supplied from the power source circuit through the power source select circuit in such a way that the plurality of select circuits (1, 2) are supplied with the second positive voltage and the second negative voltage as the power source in the display drive period, and that in the touch detection period, the select circuit (2) corresponding to the part of the plurality of terminals is supplied with a voltage (toggled VH_MUX) alternating between the first positive voltage and the ground voltage in synchronization with the toggle output in positive polarity, and a voltage (toggled VL_MUX) alternating between the ground voltage and the first negative voltage in synchronization with the toggle output in negative polarity as the power source, and the other select circuit (1) is supplied with the first positive voltage and the ground voltage as the power source.

According to the embodiment, even in the case of the reference voltage for display spreading over a wide range because of the necessity for supporting various display touch panels, the breakdown voltages of all the elements for constituting all the circuits in the semiconductor device can be kept low. In other words, these circuits can be arranged by use of elements having endurance against a potential difference between the first positive voltage and the ground voltage, a potential difference between the second positive voltage and the second negative voltage, and a potential difference between the ground voltage and the first negative voltage, respectively.

[20] DC Block (Fourth Embodiment)

In the display device as described in [13], each touch detection circuit includes a differential amplifier circuit having a pair of input terminals to which differential signals are input; the toggle output is supplied to one input terminal of the input terminal pair; and the touch detection circuit has a DC voltage level shift circuit (23) operable to shift the DC voltage level at the other input terminal.

The timing control circuit controls the plurality of select circuits to enter a signal input to the one terminal (81) into the touch detection circuit (20) through the DC voltage level shift circuit in the touch detection period.

The semiconductor device further includes a power source circuit (30).

The power source circuit supplies: a first positive voltage (VSP); a second positive voltage (VCI) lower than the first positive voltage; a ground voltage (GND); a first negative voltage (VSN); and a second negative voltage (VCL) higher than the first negative voltage. The reference voltage (VCOM) for display is lower than the ground voltage, and higher than the second negative voltage.

The power source circuit supplies the toggle drive circuit with the first positive voltage and the ground voltage as a power source, supplies the reference voltage drive circuit with the second positive voltage and the second negative voltage as a power source, supplies the touch detection circuit with the first positive voltage and the ground voltage as a power source, and supplies the plurality of select circuits with the second positive voltage and the second negative voltage as a power source.

Thus, the need for switching the source voltage can be avoided even in the case of the reference voltage for display varying in a wide range because of the necessity for supporting various display touch panels.

2. Details Description of the Embodiments

To further clarify the problem to be solved prior to further detailed description on the embodiments, the examples already examined will be described below.

Figure 2:
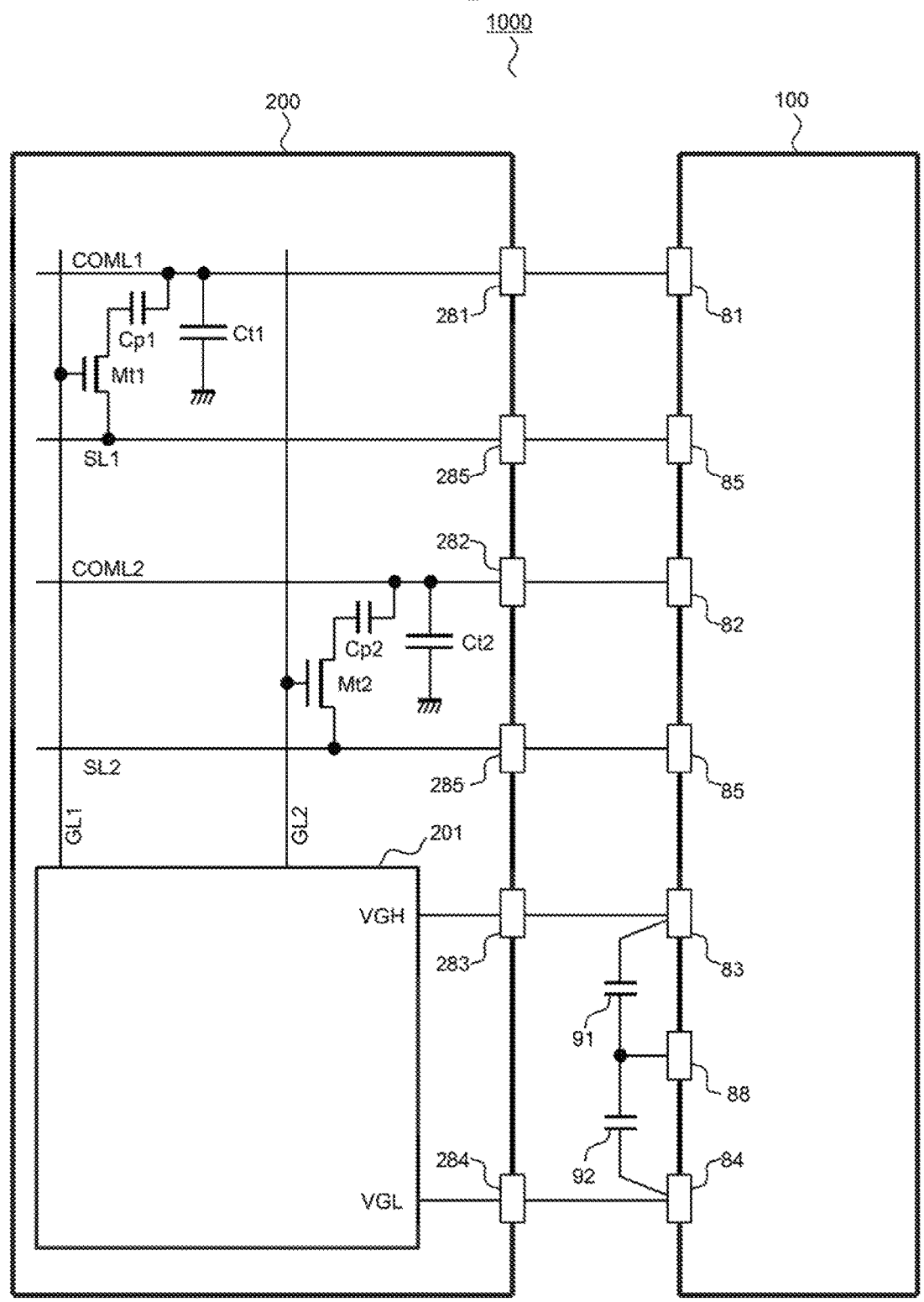
FIG. 2 is an explanatory diagram schematically showing an example of the configuration of a display device including the in-cell type display touch panel and the semiconductor device.

FIG. 1 is a block diagram showing an example of the configuration of a semiconductor device 100 connectable with an in-cell type display touch panel 200 (not shown). In addition, FIG. 2 is an explanatory diagram schematically showing an example of the configuration of a display device 1000 including the in-cell type display touch panel 200 and the semiconductor device 100. Incidentally, touch detection in the display device 1000 is based on the self-capacitive method.

The in-cell type display touch panel 200 to be connected with the semiconductor device includes: a plurality of common electrodes (COML1 and COML2 are shown by example) and sensor capacitances (Ct1 and Ct2 are shown by example) connected thereto, respectively in a part serving as a touch panel; and a plurality of gate lines (two gate lines GL1 and GL2 are shown by example), a plurality of source lines (two source lines SL1 and SL2 are shown by example), a plurality of pixel capacitances (Cp1 and Cp2 are shown by example), a plurality of transfer transistors (Mt1 and Mt2 are shown by example), and a gate line drive circuit 201 in a part serving as a display panel. In the display touch panel 200, at intersections between the gate lines and the source lines which are orthogonal to each other, the transfer transistors (Mt1, Mt2) and the pixel capacitances (Cp1, Cp2) are arranged in a matrix, and the gate terminals are connected with the corresponding gate lines. Each transfer transistor has a gate electrode connected with the corresponding gate line, a source electrode connected with the corresponding source line, and a drain electrode connected with one electrode of its pixel capacitance; the other electrode of the pixel capacitance is connected with one of the common electrodes (COML1 and COML2 are shown by example) in proximity thereto.

As described above, the plurality of common electrodes serve as common electrodes of the plurality of pixel capacitances for display as well as electrodes of the sensor capacitances for touch detection. Specifically, the in-cell type display touch panel 200 has common electrodes (COML1, COML2, etc.) which serve as sensor electrodes (i.e. electrodes connected with the sensor capacitances) in a touch detection period; a reference voltage (VCOM) for display must be applied to the plurality of common electrodes (COML1, COML2, etc.) in a display drive period. The resolution of touch detection may be significantly lower than the display resolution. So, many pixel capacitances are mounted so as to be superposed in regions where the electrodes that the sensor capacitances Ct1, Ct2 include are formed. Therefore, in a display drive period, a reference voltage (VCOM) for display must be applied uniformly.

The semiconductor device 100 has the plurality of terminals (of which two terminals 81 and 82 are shown in FIG. 1 by example) for electrically connecting with the plurality of common electrodes COML1, COML2. Further, the semiconductor device 100 has power source terminals 83 and 84 for supplying a power source to the gate drive circuit 201 on the display touch panel 200, and a Guarding signal output terminal 88. Also, the semiconductor device 100 has a plurality of source line drive terminals for outputting display levels to the plurality of source lines (SL1, SL2, etc.) of the display touch panel 200; one of them, a source drive terminal 85 is shown in FIG. 1 by example.

The semiconductor device 100 has: a plurality of AFE select circuits 1 and 2; a touch detection circuit (AFE) 20; a reference voltage drive circuit 11 for supplying a reference voltage (VCOM) for display; a toggle drive circuit 12 for supplying toggle signals to the sensor electrodes; a source drive block 40 including a source amplifier 41 and a select switch 42; a charge pump block 31 including a charge pump 32 for a high-potential side power source (VGH), a charge pump 33 for a low-potential side power source (VGL), a toggle output switch 34; a power source circuit 30; a power source select circuit 71; and a timing control circuit 70.

Figure 3:
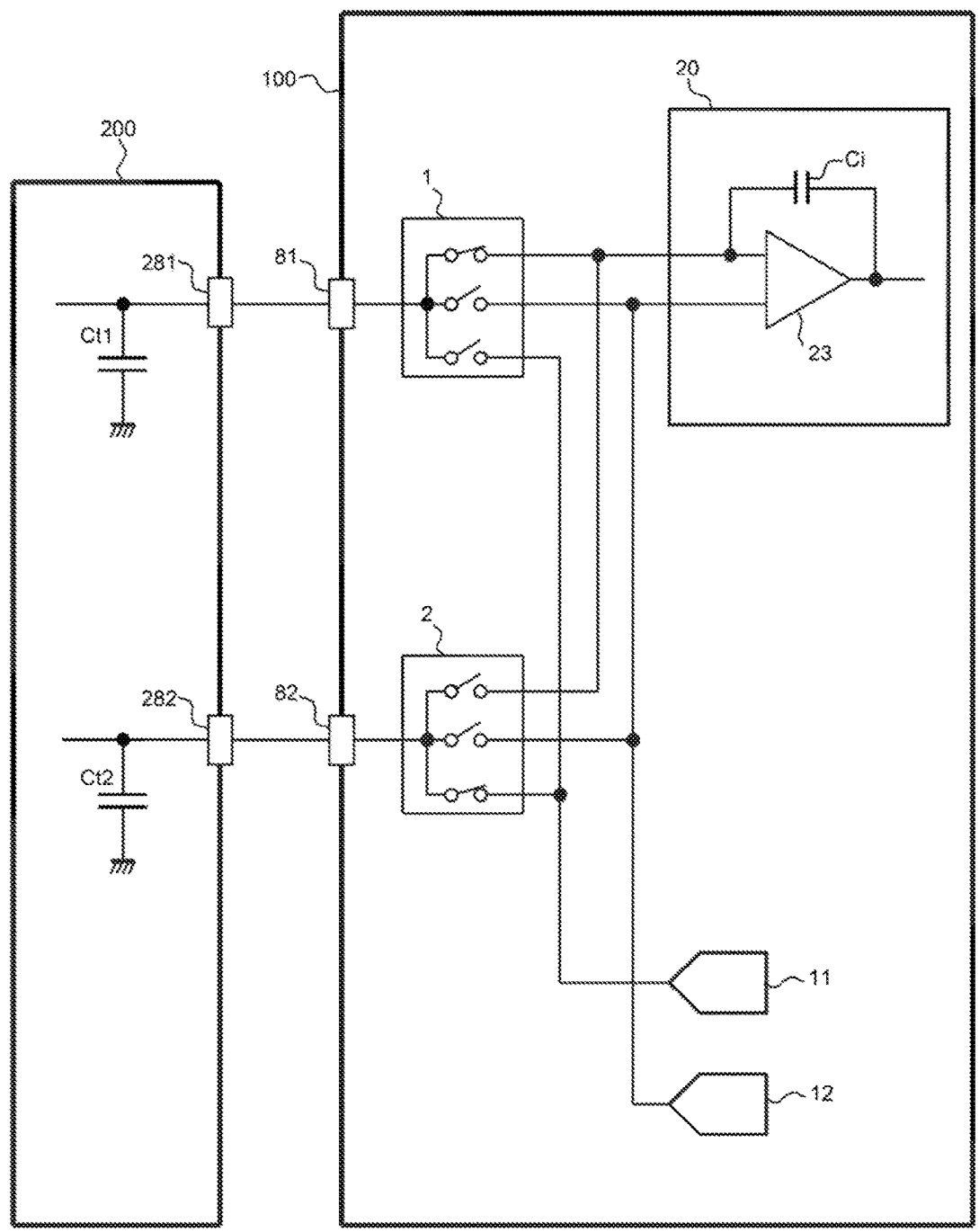
FIG. 3 is an explanatory diagram showing an example of the circuit configuration of a touch detection circuit (AFE)

FIG. 3 is an explanatory diagram showing an example of the circuit configuration of the touch detection circuit (AFE) 20.

The touch detection circuit (AFE) 20 is electrically connected with the sensor capacitance Ct1 on the display touch panel 200 through the terminal 81 by the AFE select circuit 1. The touch detection circuit 21 is electrically connected with the sensor capacitance Ct2 through the terminal 82 by the AFE select circuit 2. The plurality of sensor capacitances are partially targeted for touch detection, and others are not targeted for touch detection. In FIG. 1, the sensor capacitance Ct1 is illustrated as a target for touch detection, and the sensor capacitance Ct2 is shown as no target for touch detection, for example. The touch detection circuit (AFE) 20 is connected with the sensor capacitance Ct1 targeted for touch detection through the AFE select circuit 1 and the terminal 81, and is separated from the sensor capacitance Ct2 not targeted for touch detection by the AFE select circuit 2.

As shown in FIG. 3, by example, the touch detection circuit (AFE) 20 has a first stage including an integration circuit having a differential amplifier circuit 23, and an integration capacitance Ci connected between its output and one input.

It operates so that one pair of differential inputs of the differential amplifier circuit 23 of the first stage are identical to each other in potential. So, on condition that the toggle drive circuit 12 supplies a toggle signal to one input, the amplitude and phase on the other input are made the same as those of the toggle signal. The touch detection circuit (AFE) 20 is connected with the sensor capacitance Ct1 targeted for touch detection through the AFE select circuit 1 and the terminal 81. The touch detection circuit (AFE) 20 detects an electric charge amount for charging/discharging the sensor capacitance having an effective capacitance value by use of the toggle signal. The effective capacitance value that the sensor capacitance has is varied by the approach of a conductive object to the sensor capacitance. Therefore, the approach of the conductive object to the sensor capacitance can be sensed by detecting the change. In short, the action of a user bringing his/her finger closer to the display touch panel or fingering it is sensed as the approach of a conductive object to the sensor capacitance.

On the other hand, the toggle signal is applied to the sensor capacitance Ct2 not targeted for touch detection from the toggle drive circuit 12 through the AFE select circuit 2 and the terminal 82. By preventing a potential difference from being made between the sensor capacitance Ct1 targeted for touch detection and the sensor capacitance Ct2, the capacitance value of a parasitic capacitance which is present between the sensor capacitance Ct1 targeted for touch detection and the non-target sensor capacitance Ct2 becomes zero effectively and thus, the influence of the non-target sensor capacitance Ct2 on a touch detection action can be suppressed. This is an example of the guarding action.

In guarding action, the toggle signal is likewise applied to other electrodes on the display touch panel 200, whereby the influence of a parasitic capacitance which is present between the electrodes on the touch detection action can be suppressed.

The toggle signal is output to the terminal 88 through the toggle output switch 34. In the semiconductor device, a capacitance 91 is connected between the terminals 88 and 83, and a capacitance 92 is connected between the terminals 88 and 84; and a source voltage given by VGH and VGL supplied through the power source terminals 83 and 84 to the gate drive circuit 201 on the display touch panel 200 is modulated by the toggle signal. Thus, all the gate lines (GL1, GL2, etc.), which are outputs of the gate drive circuit, are driven in amplitude of the toggle signal. In this way, the influence of a parasitic capacitance which is present between each gate line and the sensor capacitance Ct1 targeted for detection on the touch detection action can be suppressed. Incidentally, in a display drive period, the terminal 88 is cut off from the toggle drive circuit 12 by the toggle output switch 34 and fixed to the ground potential, whereby the source voltage supplied to the gate drive circuit on the display touch panel 200 from the power source terminals 83 and 84 is made stable DC one.

As to all the source line (SL1, SL2, etc.) on the display touch panel 200, an output of the source amplifier 41 is supplied to each source line (SL1, SL2, etc.) connected thereto through the select switch 42 and then through the terminal 85 as a display level signal in a display drive period; and a toggle signal is supplied from the toggle drive circuit 12 through the select switch 42 and the terminal 85 to each source line (SL1, SL2, etc.) connected thereto in a touch detection period.

Figure 29:
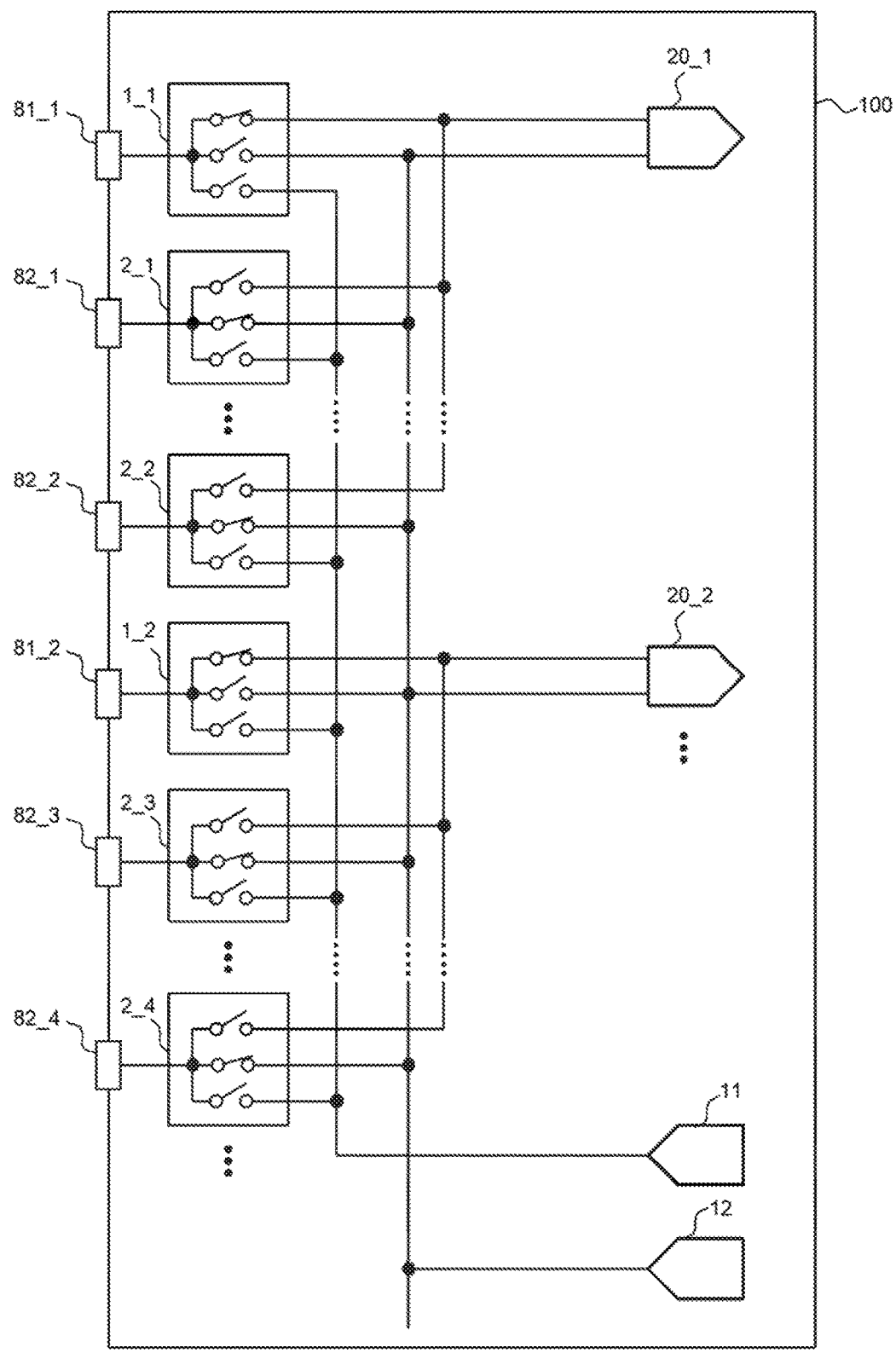
FIG. 29 is an explanatory diagram showing a more concrete example of arrangement of AFE select circuits and touch detection circuits (AFE), in connection with the semiconductor devices according to the study example and the embodiments of the invention.

FIG. 29 is an explanatory diagram showing a more concrete example of the arrangement of the AFE select circuits and the touch detection circuits (AFE) in the semiconductor device 100. The semiconductor device 100 has touch detection circuits (AFE) 20_1, 21_2 and so on, and a plurality of AFE select circuits and a plurality of terminals are arranged to correspond to each touch detection circuit (AFE). The plurality of AFE select circuits and the plurality of terminals can be electrically connected with the plurality of sensor capacitances (not shown) on the touch panel 200 (not shown).

As in FIG. 29, the plurality of AFE select circuits 1_1, 2_1, . . . , 2_2 and the plurality of terminals 81_1, 82_1, . . . , 82_2 correspond to the touch detection circuit (AFE) 20_1 and connected with the plurality of sensor capacitances (not shown). The plurality of sensor capacitances are made the sensor capacitance Ct1 (not shown) targeted for touch detection one by one. The targeted sensor capacitance is electrically connected with the touch detection circuit (AFE) 20_1 through the terminal 81_1 and the AFE select circuit 1_1, and a toggle signal is applied through the terminals 82_1, . . . , 82_2 and the AFE select circuits 2_1, . . . , 2_2 to the other sensor capacitances (not shown) not targeted for touch detection, and denoted by Ct2, thanks to the guarding action.

Likewise, the plurality of AFE select circuits 1_2, 2_2, . . . , 2_4 and the plurality of terminals 81_2, 82_3, . . . , 82_4 correspond to the touch detection circuit (AFE) 20_2, and a plurality of sensor capacitances (not shown) are connected thereto. The plurality of sensor capacitances are made the sensor capacitance Ct1 (not shown) targeted for touch detection one by one. The targeted sensor capacitance is electrically connected with the touch detection circuit (AFE) 20_2 through the terminal 81_2 and AFE select circuit 1_2, and a toggle signal is applied through the terminals 82_3, . . . , 82_4 and the AFE select circuits 2_3, . . . , 2_4 to the other sensor capacitances (not shown) not targeted for touch detection, and denoted by Ct2, thanks to the guarding action.

The number of the touch detection circuits (AFE) provided in the semiconductor device 100, and the numbers of the sensor capacitances, AFE select circuits and terminals which correspond to one touch detection circuit (AFE) are arbitrary.

While the study example has been described with reference to the example of the configuration shown by FIG. 29, it can likewise apply to the respective embodiments described below.

Figure 4:
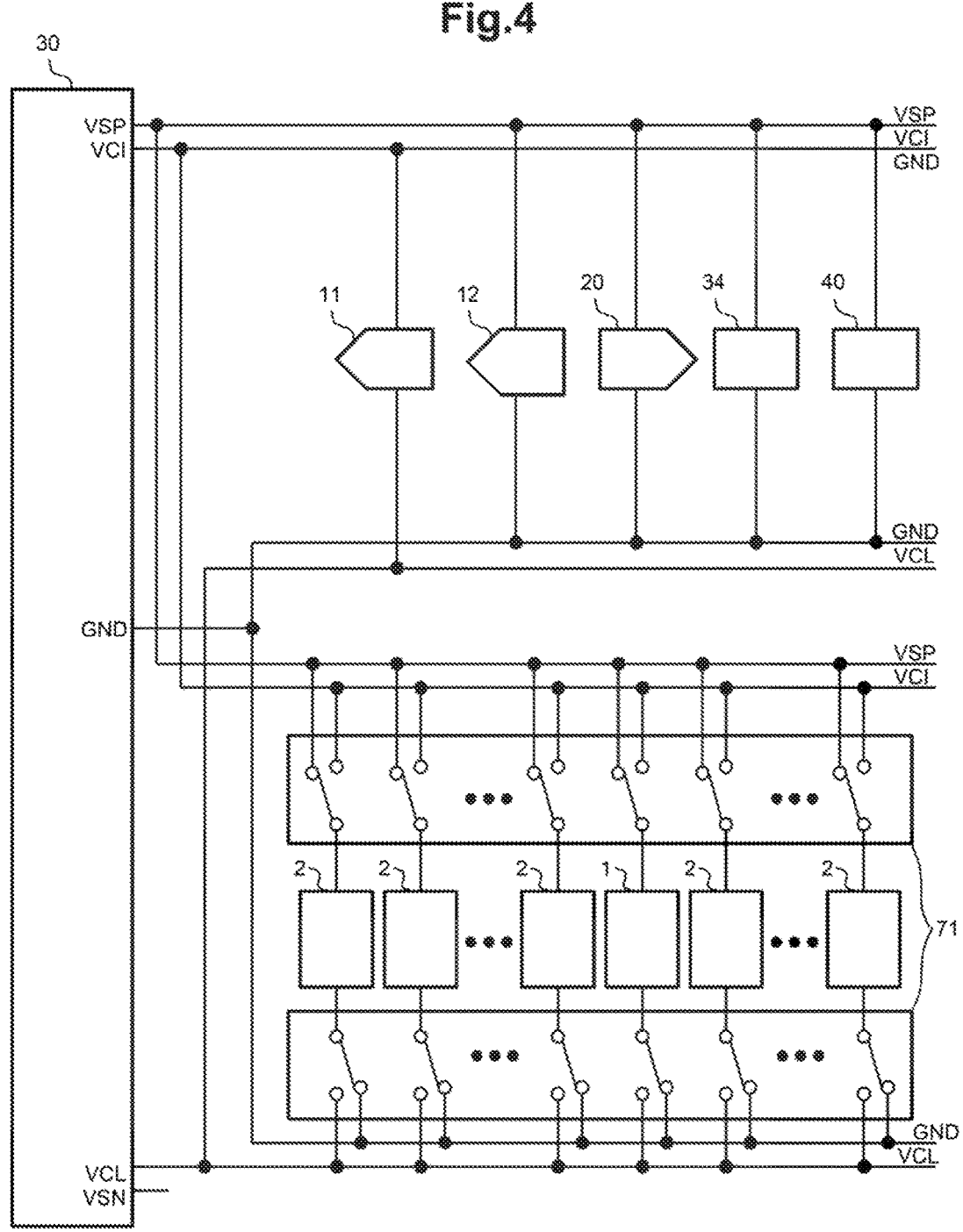
FIG. 4 is a block diagram showing an aspect of power supply to each circuit from a power source circuit and a power source select circuit in the semiconductor device.

The operation source voltage of each of circuits that make up the semiconductor device 100 and the voltage levels of signals will be described. FIG. 4 is a block diagram showing an aspect of power supply to each circuit from the power source circuit 30 and the power source select circuit 71 in the semiconductor device 100.

The power source circuit 30 provided in the semiconductor device 100 is capable of supplying e.g. a first positive voltage (VSP), a second positive voltage (VCI) lower than VSP, a ground voltage (GND), a first negative voltage (VSN), and a second negative voltage (VCL) higher than VSN into the chip. Showing specific voltage values by example, the first positive voltage (VSP) is +6V, the second positive voltage (VCI) is +3V, the first negative voltage (VSN) is −6V, and the second negative voltage (VCL) is −3V, provided that the ground voltage (GND) is 0V. Now, it is noted that the reference voltage (VCOM) for display depends on the specifications of the display panel, and it takes a value of 0 to −3V which varies from one display panel to another, and it is lower than the ground voltage (GND) and higher than the second positive voltage (VCI).

The first positive voltage (VSP) and the ground voltage (GND) are supplied to the toggle drive circuit 12, the toggle output switch 34, and the source drive block 40 including the source amplifier 41 and the select switch 42 as well as the touch detection circuit (AFE) 20. It is common to select, as a power source, a voltage which is positive in polarity with respect to the ground voltage (GND) in order to facilitate the signal exchange with a logic circuit working on a source voltage as low as e.g. +1.3V with respect to the ground voltage (GND). In this case, to enable the output of a reference voltage (VCOM) for display, which is negative in polarity, the reference voltage drive circuit 11 is supplied with the second positive voltage (VCI) and the second negative voltage (VCL).

Under the control of the timing control circuit 70, the power source select circuit 71 supplies the AFE select circuits 1 and 2 with the second positive voltage (VCI) and the second negative voltage (VCL) in a display drive period, and supplies them with the first positive voltage (VSP) and the ground voltage (GND) in a touch detection period, in order to output the following from the terminals 81 and 82: a reference voltage (VCOM) for display, which is of negative polarity, in the display drive period; and a toggle signal composed of an output from the toggle drive circuit 12 and alternating in amplitude between the ground voltage (GND) and the first positive voltage (VSP), i.e. its source voltage in the touch detection period. By providing the power source select circuit 71 to switch the source voltage to be supplied, the breakdown voltages of elements for constituting the AFE select circuits 1 and 2 may be made values which allow the elements to endure, of a potential difference between the first positive voltage (VSP) and the ground voltage (GND) and a potential difference between the second positive voltage (VCI) and the second negative voltage (VCL), a larger potential difference. So, it is not necessary to adopt elements of a large breakdown voltage enough to endure a large potential difference, such as a potential difference between the first positive voltage (VSP) and the second negative voltage (VCL). For instance, with the aforementioned exemplary voltage values, the breakdown voltages of the elements may be made values which allow them to endure a 6V-action.

Figure 5:
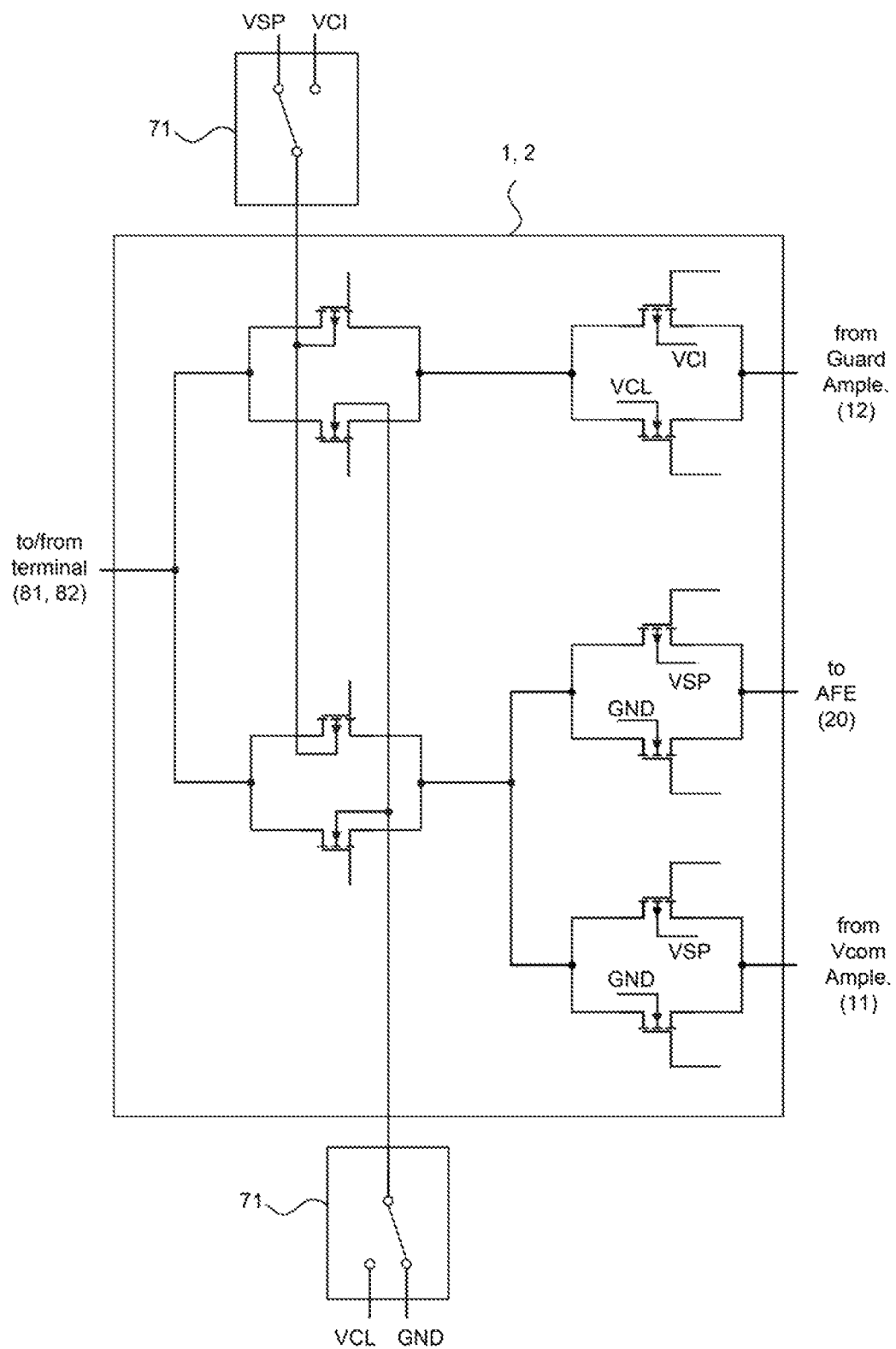
FIG. 5 is a circuit diagram showing an example of the configuration of an AFE select circuit.

FIG. 5 is a circuit diagram showing an example of the configuration of the AFE select circuit (1, 2). The AFE select circuit (1, 2) is schematically illustrated with switch symbols in FIG. 1, but specifically, it can be configured with five CMOS bidirectional switches, each including P and N channel MOS transistors connected in parallel with each other as shown in e.g. FIG. 5. The voltage supplied to the n-well of each P channel MOS transistor included in the two CMOS bidirectional switches on the side of the terminals 81 and 82 is switched between the first positive voltage (VSP) and the second positive voltage (VCI) by a switch provided in the power source select circuit 71; the voltage supplied to the p-well of each N channel MOS transistor is switched between the second negative voltage (VCL) and the ground voltage (GND) by a switch provided in the power source select circuit 71. The well voltages of MOS transistors included in the other CMOS bidirectional switches which are not required to do the well voltage switching may be appropriately decided in consideration of the operation voltages of circuit blocks to which they are connected, and the amplitudes of signals passing therethrough.

FIG. 5 shows, by example, the configuration of the study example shown in FIG. 1. The n-well of the P channel MOS transistor of the bidirectional switch through which a toggle signal from the toggle drive circuit (Guard Ampl.) 12 is passed is supplied with the second positive voltage (VCI), and the p-well of the N channel MOS transistor is supplied with the second negative voltage (VCL). The n-well of the P channel MOS transistor of the bidirectional switch through which an input signal to the touch detection circuit (AFE) 20 is passed is supplied with the first positive voltage (VSP), and the p-well of the N channel MOS transistor is supplied with the ground voltage (GND). The n-well of the P channel MOS transistor of the bidirectional switch through which the reference voltage (VCOM) from the reference voltage drive circuit 11 is passed is supplied with the first positive voltage (VSP), and the p-well of the N channel MOS transistor is supplied with the ground voltage (GND).

While the example of the circuit configuration shown in FIG. 5 is proper to the semiconductor device 100 of the study example shown in FIG. 1, it may be appropriately modified in the respective embodiments.

Now, the action of the semiconductor device 100 will be described.

Figure 6:
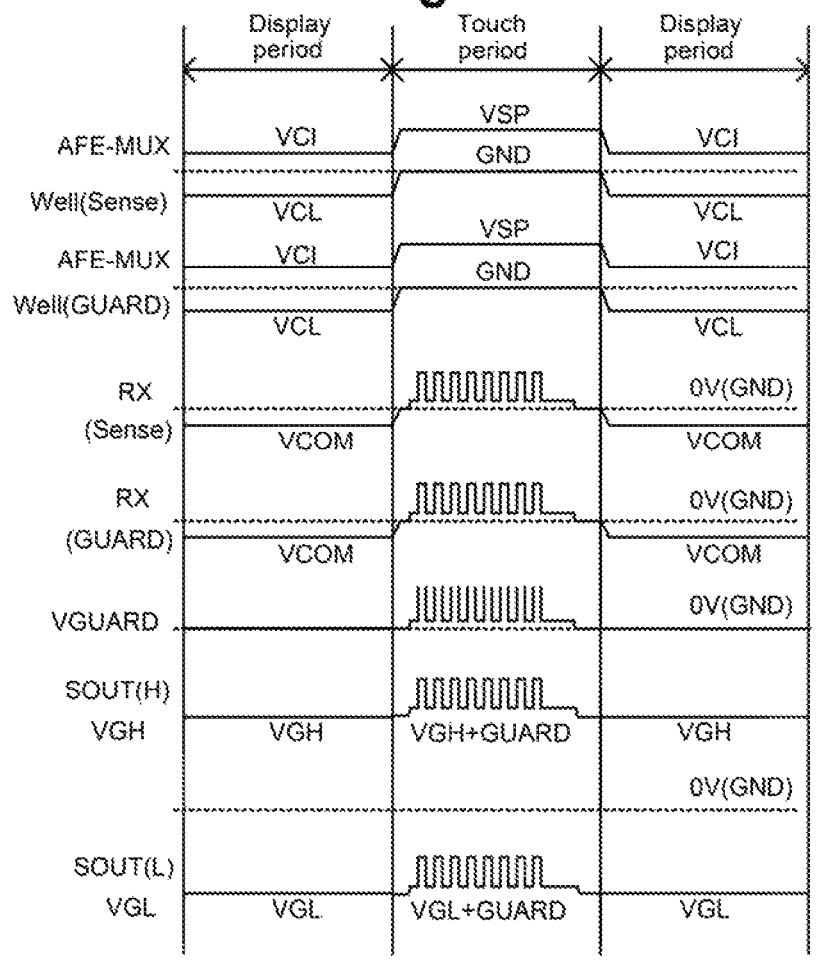
FIG. 6 is a waveform diagram showing an example of the action of the semiconductor device of the study example.

FIG. 6 is a waveform diagram showing an example of the action of the semiconductor device 100 of the study example. The following are shown in turn from the top in a vertical axis direction: a source voltage supplied to the AFE select circuit 1 (AFE-MUXWell (Sense)) corresponding to the sensor capacitance targeted for touch detection; a source voltage supplied to the AFE select circuit 2 (AFE-MUX Well (GUARD)) corresponding to a sensor capacitance not targeted for touch detection; a signal (RX (Sense)) on the terminal 81 corresponding to the sensor capacitance targeted for touch detection; a signal (RX (GUARD)) on the terminal 82 corresponding to the sensor capacitance not targeted for touch detection; a toggle signal (VGUARD) which is an output from the toggle drive circuit 12; and a power source given by SOUT(H)VGH and SOUT(L)VGL supplied to the gate drive circuit 201 on the display touch panel 200 from the power source terminals 83 and 84. In a lateral axis direction, display drive periods and touch detection periods, which are repeated alternately, are partially shown. Each broken line shows the ground potential (GND).

Regardless of whether the AFE select circuit subjected to the power source supply is the AFE select circuit (AFE-MUX Well (Sense)) corresponding to the sensor capacitance targeted for touch detection or another (AFE-MUX Well (GUARD)) corresponding to the non-target sensor capacitances, the power source supplied to the AFE select circuits 1 and 2 is the second positive voltage (VCI) and the second negative voltage (VCL) in a display drive period, and the power source supplied to the AFE select circuits 1 and 2 is the first positive voltage (VSP) and the ground voltage (GND) in a touch detection period.

The toggle signal (VGUARD) which is an output from the toggle drive circuit 12 alternating in amplitude between the ground voltage (GND) and the first positive voltage (VSP) which is the output from the toggle drive circuit 12 and also its source voltage.

The signal (RX (Sense)) on the terminal 81 corresponding to the sensor capacitance targeted for touch detection is a reference voltage (VCOM) for display in display drive period, and it is a toggle signal (VGUARD) in a touch detection period.

The signal (RX (GUARD)) on each terminal 82 corresponding to the sensor capacitance not targeted for touch detection is also the reference voltage (VCOM) for display in a display drive period, and it is the toggle signal (VGUARD) in a touch detection period.

The positive electrode-side power source SOUT(H)VGH supplied from the power source terminals 83 and 84 to the gate drive circuit 201 on the display touch panel 200 is a voltage VGH produced by the charge pump 32 for the high-potential side power source (VGH) in a display drive period, and it becomes a voltage having a waveform VGH+VGUARD with the toggle signal (VGUARD) superposed thereon in a touch detection period. The negative electrode-side power source SOUT(L)VGL is a voltage VGL produced by the charge pump 33 for the low-potential side power source (VGL) in a display drive period, and it becomes a voltage having a waveform VGL+VGUARD with the toggle signal (VGUARD) superposed thereon in a touch detection period.

As described above, in a touch detection period, a toggle signal (VGUARD) is applied as the signal (RX (Sense)) on the terminal 81 corresponding to the sensor capacitance targeted for touch detection and in addition, it is put on every electrode, which includes the toggle signal applied as the signal (RX (GUARD)) on each terminal 82 corresponding to the sensor capacitance not targeted for touch detection. This is the guarding action as described above, in which the same drive pulse is applied to electrodes not targeted for the detection as that to the electrode targeted for the detection. According to the guarding action, an electrode targeted for the detection and other electrodes around it can be kept at the same potential constantly and therefore, the influence of the parasitic capacitance can be eliminated.

Figure 7:
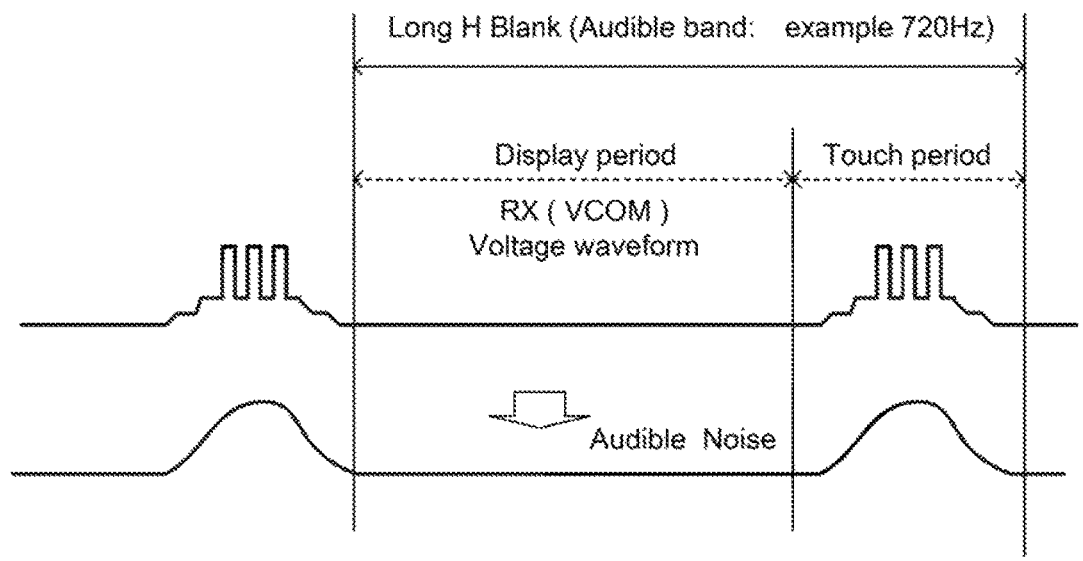
FIG. 7 is a diagram for explaining audible noise.

As shown in FIG. 6, the signal (RX (Sense)) on the terminal 81, and the signal (RX (GUARD)) on each terminal 82 become the same voltage levels as that of the reference voltage (VCOM) for display in a display drive period, and they become a toggle signal (VGUARD) alternating between the first positive voltage (VSP) and the ground voltage (GND) in a touch detection period and therefore, their DC voltage levels during this period roughly become a value of the middle of the first positive voltage (VSP) and the ground voltage (GND), and the audible noise level is large. Specifically, signals as shown in FIG. 7 make audible noise. Further, these terminals are connected with the sensor capacitances Ct1 and Ct2, having relatively large capacitance values for touch detection and therefore, the signals are probably expected to be larger in the level of generated audible noise according to the large capacitance values.

Hence, it was found that the problem to be solved with priority is to suppress the level of audible noise in regard to the signal (RX (Sense)) on the terminal 81 and the signal (RX (GUARD)) on each terminal 82, especially the signal (RX (GUARD)) on the terminal 82 larger in its total number.

The embodiments will be described further in detail.

[First Embodiment]

Figure 8:
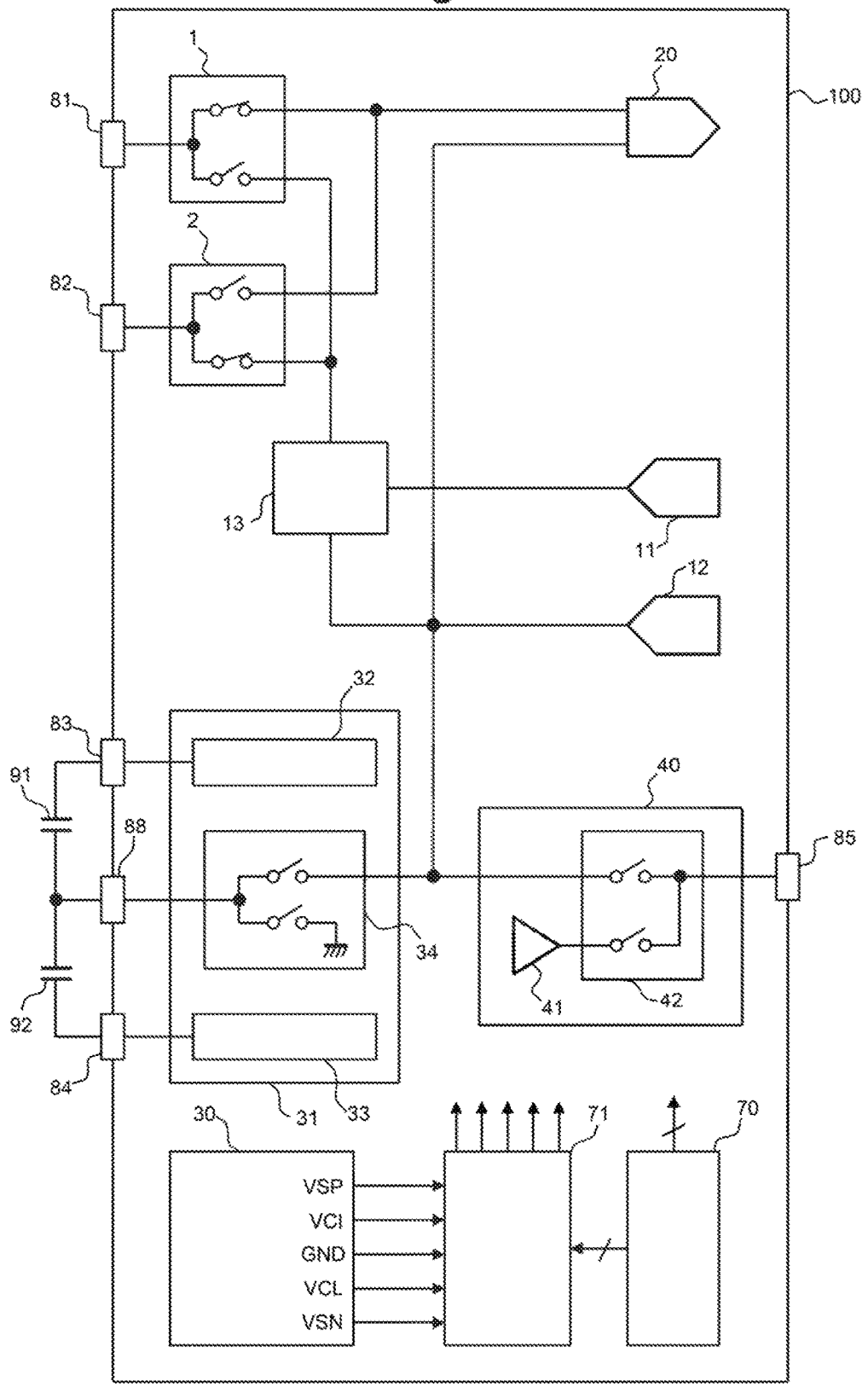
FIG. 8 is a block diagram showing an example of the configuration of a semiconductor device in connection with each representative embodiment of the invention.

FIG. 8 is a block diagram showing an example of the configuration of the semiconductor device 100 according to the representative embodiment of the invention. As shown in FIG. 2, a display device 1000 can be formed by connecting the semiconductor device 100 with the in-cell type display touch panel 200. The same thing can be said for the semiconductor device 100 according to each of the second to sixth embodiments.

The semiconductor device 100 includes: a plurality of terminals 81, 82 connected with the plurality of common electrodes 281, 282 of the display touch panel 200 (see FIG. 2), respectively; a plurality of AFE select circuits 1, 2 connected with the plurality of terminals 81, 82, respectively; a touch detection circuit 20 corresponding to the plurality of AFE select circuits 1, 2; a reference voltage drive circuit 11 for supplying a reference voltage VCOM to the display touch panel 200; a toggle drive circuit 12 for supplying a toggle signal; a DC level shift circuit 13; and a timing control circuit 70.

The DC level shift circuit 13 is a circuit operable to shift the DC level of a toggle output, which is an output signal of the toggle drive circuit 12, to the reference voltage VCOM output by the reference voltage drive circuit 11.

The timing control circuit 70 controls the plurality of AFE select circuits 1, 2 to supply the reference voltage VCOM output by the reference voltage drive circuit 11 to the plurality of terminals 81, 82 in a display drive period, and to supply the output of the DC level shift circuit 13 to at least a part of the plurality of terminals 81, 82 (the terminal 82 in FIG. 8) in a touch detection period.

The other features are the same as those described with reference to FIGS. 1-3 and therefore, the their descriptions are skipped here to avoid the repetition thereof.

In this way, the DC level fluctuation in signals supplied to the part of the terminals in a display drive period and a touch detection period is minimized. Thus, the generation of audible noise stemming from the time-sharing action for display driving and touch detection can be suppressed.

Figure 9:
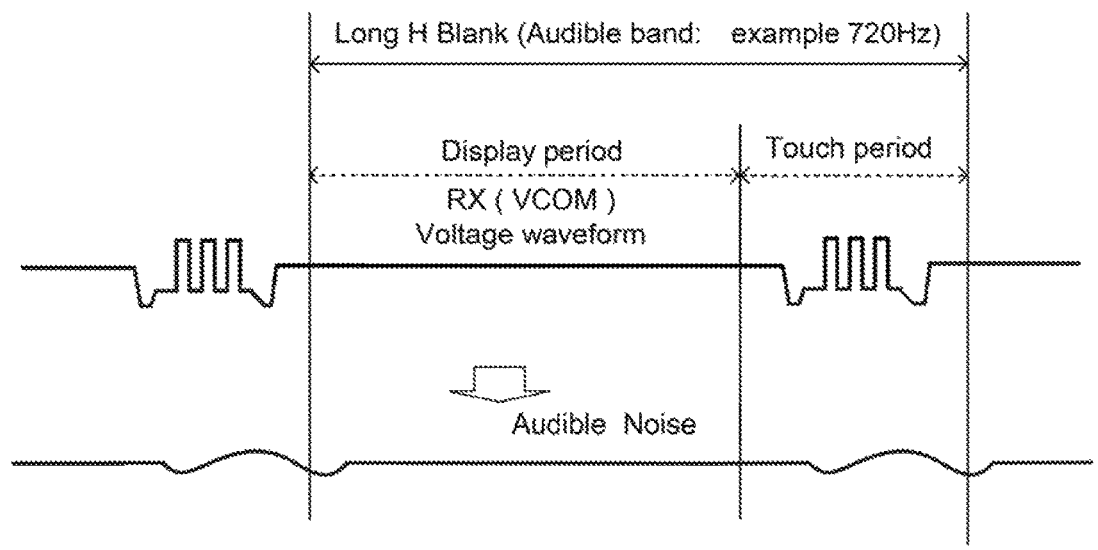
FIG. 9 is an explanatory diagram showing the effect of suppressing the level of audible noise by the semiconductor device in connection with the representative embodiment of the invention.

FIG. 9 is an explanatory diagram showing the effect of suppressing the level of audible noise by the semiconductor device 100 according to the representative embodiment of the invention.

As shown in FIG. 7, the signal (RX (GUARD)) on the terminal 82 is the same, in voltage level, as the reference voltage (VCOM) for display in a display drive period, and it becomes a toggle signal (VGUARD) alternating between the first positive voltage (VSP) and the ground voltage (GND) in a touch detection period, during which its DC voltage level roughly takes a value of the middle of the first positive voltage (VSP) and the ground voltage (GND) and the level of audible noise is large. In the semiconductor device 100 shown in FIG. 8, the DC level shift circuit 13 shifts the DC level of a toggle output, which is an output signal of the toggle drive circuit 12, to the reference voltage VCOM output by the reference voltage drive circuit 11 and then, supplies the resultant signal as the signal (RX (GUARD)) on the terminal 82 in a touch detection period. Thus, the difference in DC voltage level between the display drive period and the touch detection period is eliminated as shown in FIG. 9, whereby the level of audible noise can be kept down to almost zero.

Figure 10:
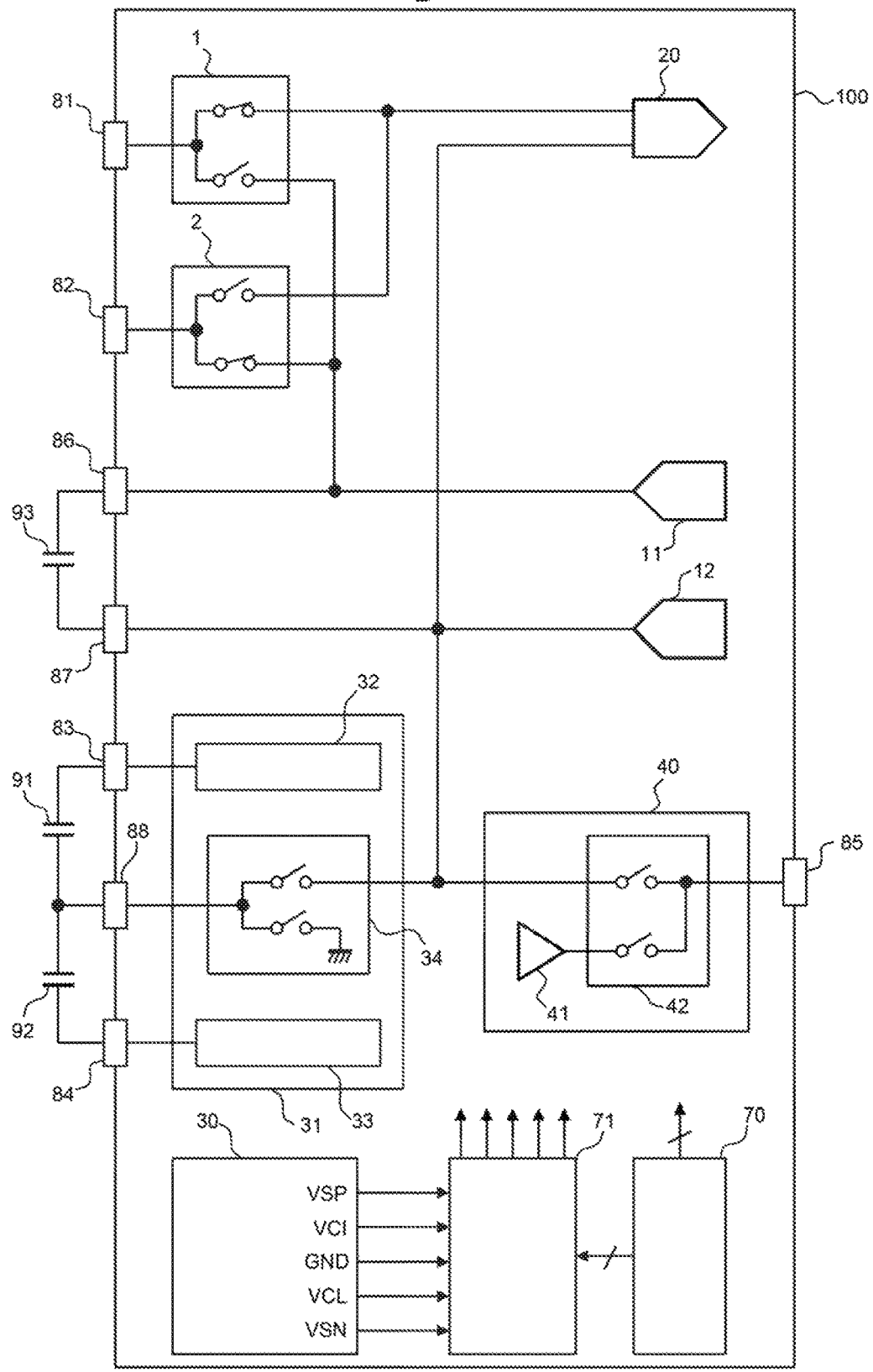
FIG. 10 is a block diagram showing an example of the configuration of the semiconductor device according to the first embodiment of the invention.

FIG. 10 is a block diagram showing an example of the configuration of the semiconductor device 100 according to the first embodiment of the invention. Unlike FIG. 9 showing the semiconductor device 100 of the representative embodiment, FIG. 10 shows one embodiment of the DC level shift circuit 13, and other points in connection with the circuit configuration are not particularly changed. Therefore, the circuit constituting the DC level shift circuit 13 will be described in detail, but the description on other circuits will be skipped.

The semiconductor device 100 of the first embodiment shown in FIG. 10 has a pair of connection terminals 86 and 87 for external attachment of a capacitance 93. The toggle drive circuit 12 outputs a toggle signal (VGUARD) to the connection terminal 87, which is input to the other connection terminal 86 through the externally attached capacitance 93; a DC component of the toggle signal (VGUARD) is cut by the capacitance 93 and thus, only its AC component is input to the connection terminal 86. On the other hand, under the control of the timing control circuit 70, the reference voltage drive circuit 11 outputs a reference voltage (VCOM) for display in a display drive period, and outputs with a high-impedance (HiZ) in a touch detection period.

The reference voltage (VCOM) is applied to each sensor capacitance Ct2 (not shown) targeted for the guarding action through the terminal 82 in a display drive period, and during a touch detection period subsequent thereto, the reference voltage (VCOM) remains held by the sensor capacitance Ct2. Therefore, the DC voltage level of the sensor capacitance Ct2 and terminal 82 in the touch detection period is kept at the reference voltage (VCOM), and the toggle signal (VGUARD) with DC component cut out is superposed on it. That is, the DC voltage level of the toggle signal (VGUARD) output by the toggle drive circuit 12 ends up being shifted to the reference voltage (VCOM).

In this way, the DC level shift circuit can be arranged simply. Further, the DC voltage level of the sensor capacitance Ct2 and terminal 82 is kept at the reference voltage (VCOM) and thus, remains unchanged over the display drive period and the touch detection period and as such, no audible noise is generated.

The reference voltage drive circuit 11 may be arranged to weakly output the reference voltage (VCOM) with a certain value of output resistance instead of the high impedance (HiZ) in a touch detection period. Even in such a case that the reference voltage (VCOM) applied in a display drive period cannot be fully retained with stability in a touch detection period because of a large electric charge leaking out of the sensor capacitance Ct2, the semiconductor device functions so as to keep the DC voltage level of a toggle signal (VGUARD) applied to the sensor capacitance Ct2 in a touch detection period at the reference voltage (VCOM) without being affected by the leak.

Also, in this case, the DC level shift circuit can be arranged simply, and the generation of audible noise can be kept low.

Figure 11:
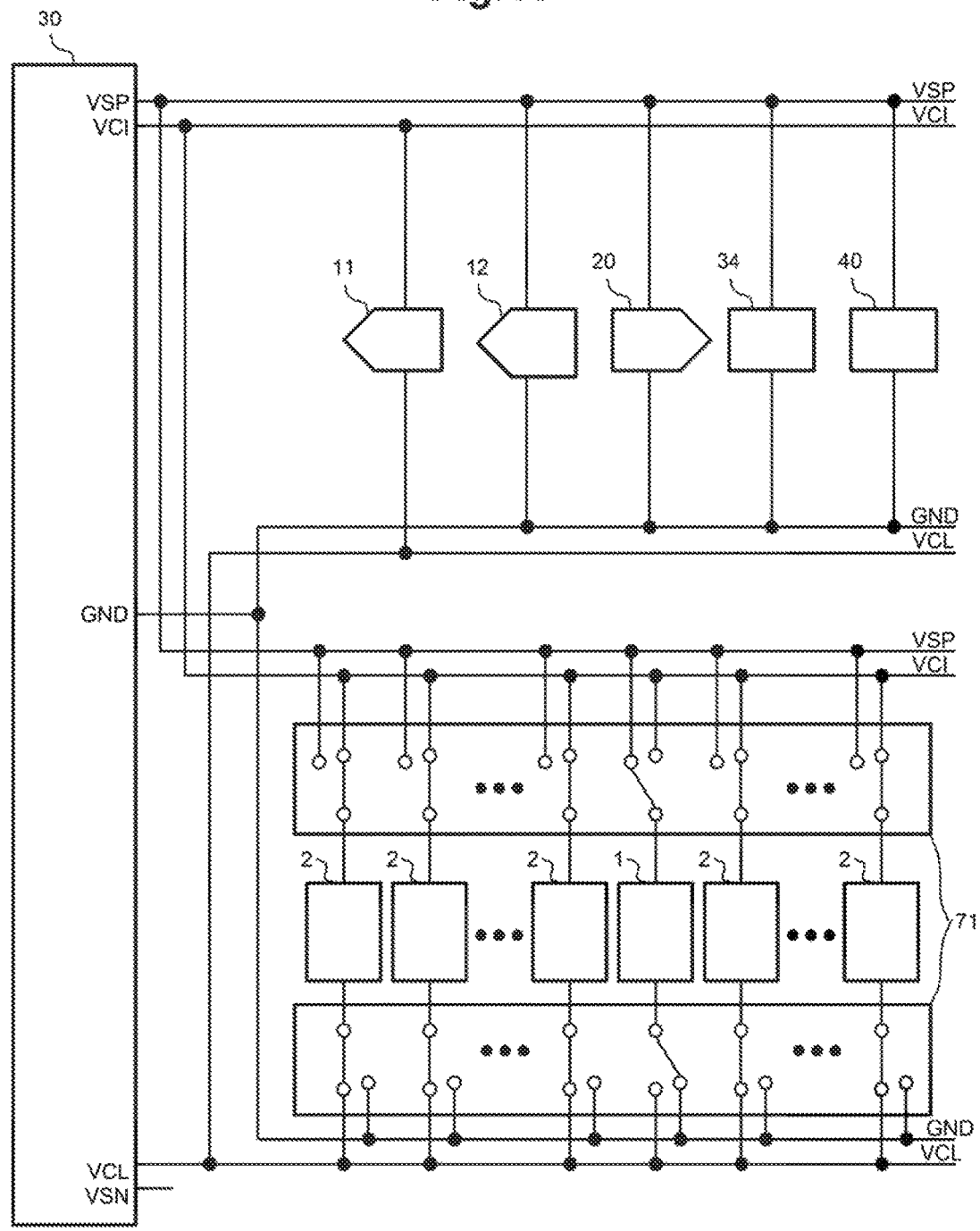
FIG. 11 is a block diagram showing an aspect of power supply to each circuit from a power source circuit and a power source select circuit in the semiconductor device according to the first embodiment of the invention.

FIG. 11 is a block diagram showing an aspect of power supply to each circuit from the power source circuit 30 and the power source select circuit 71 in the semiconductor device 100 according to the first embodiment of the invention. It is different, in the action of the power source select circuit 71, from the aspect of power supply to each circuit from the power source circuit and the power source select circuit in the semiconductor device of the study example, which has been already described with reference to FIG. 4, but identical to it in other features.

As in the case of the study example, the power source select circuit 71 supplies the second positive voltage (VCI) and the second negative voltage (VCL) to the AFE select circuits 1 and 2 and outputs a reference voltage (VCOM) for display, which has a negative polarity, from the terminals 81 and 82 in a display drive period.

In the touch detection period, the power source select circuit 71 supplies the AFE select circuit 1 corresponding to the sensor capacitance Ct1 targeted for touch detection with the first positive voltage (VSP) and the ground voltage (GND), thereby outputting, from the terminal 81, a toggle signal (VGUARD) which is an output of the toggle drive circuit 12, provided that the toggle signal alternates between the ground voltage (GND) and the first positive voltage (VSP) which is its source voltage. The electric charge which is charged/discharged into/from the sensor capacitance Ct1 targeted for touch detection through the terminal 81 is a piece of information input into the AFE select circuit 1.

On the other hand, the power source select circuit supplies the AFE select circuit 2 corresponding to the non-target sensor capacitance Ct2 with the second positive voltage (VCI) and the second negative voltage (VCL), thereby outputting, from the terminal 82, a toggle signal arranged by shifting, in DC voltage level, a toggle signal (VGUARD) output by the toggle drive circuit 12.

The effect of holding down the breakdown voltages of the elements for constituting the AFE select circuits 1 and 2, which is achieved by providing the power source select circuit 71 to switch the source voltage to be supplied, is the same as achieved in the study example.

While in the study example, the toggle drive circuit 12 makes the toggle signal (VGUARD) the ground (GND) level in a display drive period, it may be a center value of the amplitude of the toggle signal (VGUARD) amplitude, i.e. a level 1/2VSP of the middle of the first positive voltage (VSP) and the ground voltage (GND), which is a DC level.

Thus, in both the display drive period and the touch detection period, the potential difference between two opposing ends of the capacitance 93 serving to cut DC component of the toggle signal (VGUARD) is made 1/2VSP-VCOM, i.e. it remains unchanged. Therefore, the stability of DC level of the toggle signal after DC level shift is further increased.

Figure 12:
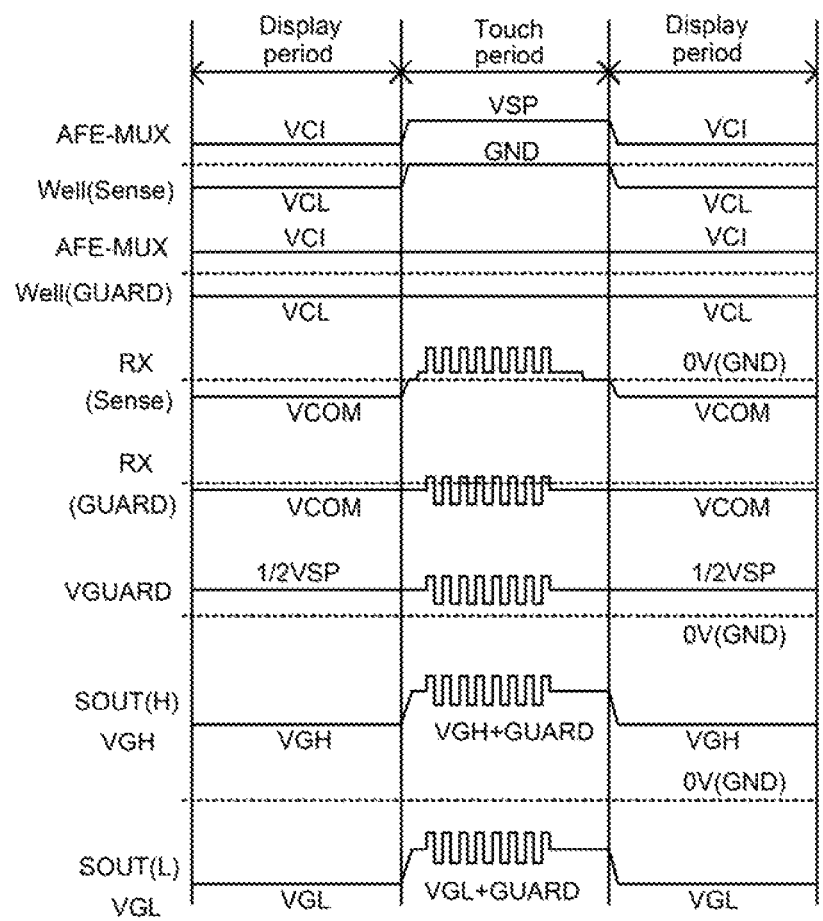
FIG. 12 is a waveform diagram showing an example of the action of the semiconductor device according to the first embodiment of the invention.

Next, the action of the semiconductor device 100 will be described further in detail. FIG. 12 is a waveform diagram showing an example of the action of the semiconductor device 100. As shown in FIG. 6, the following are shown in turn from the top in a vertical axis direction: a source voltage supplied to the AFE select circuit 1 (AFE-MUX Well (Sense)) corresponding to a sensor capacitance targeted for touch detection; a source voltage supplied to the AFE select circuit 2 (AFE-MUX Well (GUARD)) corresponding to a sensor capacitance not targeted for touch detection; a signal (RX (Sense)) on the terminal 81 corresponding to the sensor capacitance targeted for touch detection; a signal (RX (GUARD)) on the terminal 82 corresponding to a sensor capacitance not targeted for touch detection; a toggle signal (VGUARD) which is an output from the toggle drive circuit 12; and a power source given by SOUT(H)VGH and SOUT(L)VGL supplied to the gate drive circuit 201 on the display touch panel 200 from the power source terminals 83 and 84. In a lateral axis direction, display drive periods and touch detection periods, which are repeated alternately, are partially shown. Each broken line shows the ground potential (GND).

Regardless of whether the AFE select circuit subjected to the power source supply is the AFE select circuit (AFE-MUX Well (Sense)) corresponding to the sensor capacitance targeted for touch detection or another (AFE-MUX Well (GUARD)) corresponding to a non-target sensor capacitance, the power source supplied to the AFE select circuits 1 and 2 is the second positive voltage (VCI) and the second negative voltage (VCL) in a display drive period. In a touch detection period, the power source supplied to the AFE select circuit 1 (AFE-MUX Well (Sense)) corresponding to the sensor capacitance targeted for touch detection is the first positive voltage (VSP) and the ground voltage (GND), and the power source supplied to the AFE select circuit 2 (AFE-MUX Well (GUARD)) corresponding to a non-target sensor capacitance is the second positive voltage (VCI) and the second negative voltage (VCL).

The toggle signal (VGUARD) which is an output from the toggle drive circuit 12 alternates between the ground voltage (GND) and the first positive voltage (VSP) which is the output from the toggle drive circuit 12 and also its source voltage in a touch detection period, and it becomes 1/2VSP-VCOM which is its DC level with the alternating stopped in a display drive period.

The signal (RX (Sense)) on the terminal 81 corresponding to the sensor capacitance targeted for touch detection becomes the reference voltage (VCOM) for display in a display drive period, and it becomes the toggle signal (VGUARD) in a touch detection period.

The signal (RX (GUARD)) on the terminal 82 corresponding to a sensor capacitance not targeted for touch detection is a reference voltage (VCOM) for display in a display drive period, and in a touch detection period, it is a toggle signal (VGUARD) of which the DC level is shifted to the reference voltage (VCOM) as in the case of the study example shown in FIG. 6.

As in the study example shown in FIG. 6, the positive electrode-side power source SOUT(H)VGH supplied to the gate drive circuit 201 on the display touch panel 200 through the power source terminals 83 and 84 is a voltage VGH produced by the charge pump 32 for the high-potential side power source (VGH) in a display drive period, and it becomes a voltage having a waveform of VGH+VGUARD with the toggle signal (VGUARD) superposed thereon in a touch detection period. The negative electrode-side power source SOUT(L)VGL is a voltage VGL produced by the charge pump 33 for the low-potential side power source (VGL) in a display drive period, and it becomes a voltage having a waveform of VGL+VGUARD with the toggle signal (VGUARD) superposed thereon in a touch detection period.

As described above, according to the embodiment, the audible noise level in the case of the study example shown in FIG. 7 can be kept low as low as that shown in FIG. 9. With the signal (RX (GUARD)) on the terminal 82 in the study example shown in FIG. 6, the voltage level in a display drive period is the reference voltage (VCOM) for display, and the DC voltage level in a touch detection period is roughly a value of the middle of the first positive voltage (VSP) and the ground voltage (GND) and therefore, the level of audible noise is large and the signal shown in FIG. 7 makes such audible noise. In contrast, the voltage level is the reference voltage (VCOM) for display in the display drive period, and the DC level of the toggle signal (VGUARD) is shifted to the same voltage level of the reference voltage (VCOM) likewise in the touch detection period in this embodiment. Therefore, the level of audible noise can be kept low as shown in FIG. 9.

Figure 13:
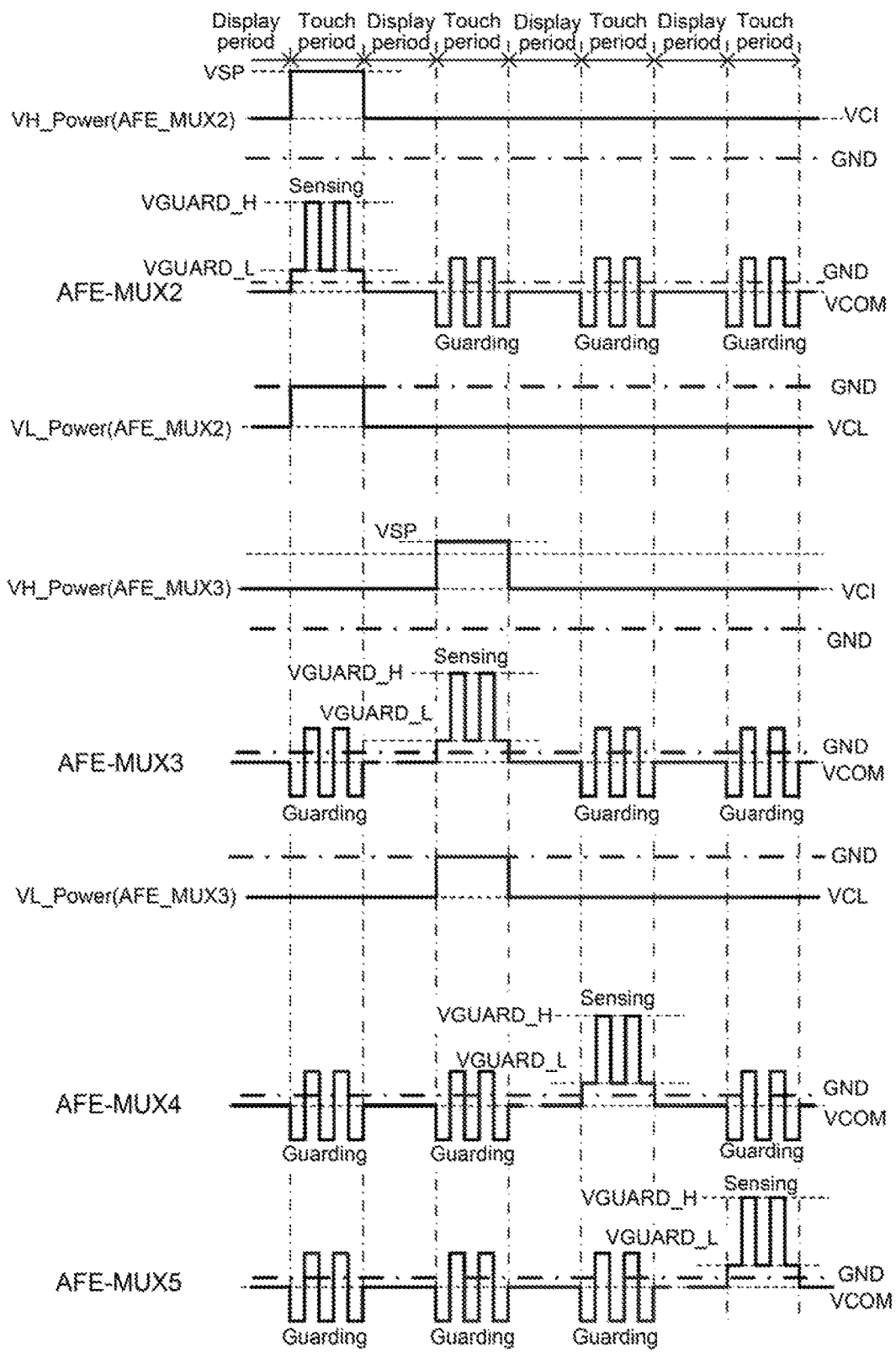
FIG. 13 is a waveform diagram showing an aspect of power supply to each AFE select circuit from the power source select circuit in the semiconductor device according to the first embodiment of the invention.

FIG. 13 is a waveform diagram showing an aspect of power supply to the AFE select circuits 1 and 2 from the power source select circuit 71 of the semiconductor device 100 according to the first embodiment of the invention.

In the description so far, the AFE select circuit corresponding to the sensor capacitance targeted for touch detection is labeled with the numeral 1, and the AFE select circuit corresponding to a non-target sensor capacitance is labeled with the numeral 2. However in fact, the semiconductor device 100 has a plurality of AFE select circuits as shown in FIG. 11. As the sensor capacitances are sequentially targeted for touch detection, the AFE select circuit corresponding to it is also changed in turn. In this time, the source voltages to be supplied to the AFE select circuits are also changed accordingly in turn in the semiconductor device 100 of the first embodiment. The control therefor is performed by the timing control circuit 10 and the power source select circuit 11.

With reference to the aspect of FIG. 13, the description is made on the assumption that of the plurality of the AFE select circuits, the AFE select circuits AFE-MUX2, AFE-MUX3 and AFE-MUX4 (corresponding to "AFE select circuit 1") perform the touch detection (Sensing) on the corresponding sensor capacitances in turn, and other AFE select circuits AFE-MUX (corresponding to "AFE select circuit 2") perform the guarding action (Guarding). In addition, in the guarding action (Guarding), the toggle signal alternates between the voltages VGUARD_L and VGUARD_H, inclusive.

The following are shown in turn from the top in a vertical axis direction in FIG. 13: a positive-polarity power source VH_Power (AFE_MUX2) supplied to AFE-MUX2; an output waveform of AFE-MUX2; a negative-polarity power source VL_Power (AFE_MUX2) supplied to AFE-MUX2; a positive-polarity power source VH_Power (AFE_MUX3) supplied to AFE-MUX3; an output waveform of AFE-MUX3; a negative-polarity power source VL_Power(AFE_MUX3) supplied to AFE-MUX3; an output waveform of AFE-MUX4; and an output waveform of AFE-MUX4. In a lateral axis direction, the display drive period and the touch detection period are alternately repeated. Specifically, the first display drive period (Display period), the first touch detection period (Touch period), the second display drive period, the second touch detection period, the third display drive period, the third touch detection period, the fourth display drive period, and the fourth touch detection period are shown in turn.

In the first touch detection period, AFE-MUX2 performs the touch detection action (Sensing), and the other AFE-MUX3, AFE-MUX4 and AFE-MUX5 perform the guarding action (Guarding). The power source to be supplied to AFE-MUX2 performing the touch detection action (Sensing) is the first positive voltage (VSP) in positive polarity and the ground voltage (GND) in negative polarity. The output of AFE-MUX2 is a toggle signal alternating between VGUARD_L and VGUARD_H, inclusive. The power source to be supplied to AFE-MUX3, AFE-MUX4 and AFE-MUX5 which perform the guarding action (Guarding) in this time is the second positive voltage (VCI) in positive polarity and the second negative voltage (VCL) in negative polarity, and the outputs of AFE-MUX3, AFE-MUX4 and AFE-MUX5 are each a toggle signal (i.e. Guarding signal) with its DC level shifted to the reference voltage (VCOM).

In the second display drive period subsequent to the first touch detection period, the power source to be supplied to all of AFE-MUX2, AFE-MUX3, AFE-MUX4 and AFE-MUX5 is the second positive voltage (VCI) in positive polarity, and the second negative voltage (VCL) in negative polarity; the outputs of AFE-MUX2, AFE-MUX3, AFE-MUX4 and AFE-MUX5 are all the reference voltage (VCOM) for display.

In the second touch detection period subsequent to the second display drive period, AFE-MUX3 performs the touch detection action (Sensing) instead of AFE-MUX2, and the other AFE-MUX2, AFE-MUX4 and AFE-MUX5 perform the guarding action (Guarding). The power source to be supplied to AFE-MUX3 which performs the touch detection action (Sensing) is the first positive voltage (VSP) in positive polarity, and the ground voltage (GND) in negative polarity; the output of AFE-MUX3 is a toggle signal alternating between VGUARD_L and VGUARD_H, inclusive. The power source to be supplied to AFE-MUX2, AFE-MUX4 and AFE-MUX5 which perform the guarding action (Guarding) in this time is the second positive voltage (VCI) in positive polarity, and the second negative voltage (VCL) in negative polarity; the outputs of AFE-MUX2, AFE-MUX4 and AFE-MUX5 are each a toggle signal (Guarding signal) with its DC level shifted to the reference voltage (VCOM).

In the third display drive period subsequent to the second touch detection period, the power source to be supplied to all of AFE-MUX2, AFE-MUX3, AFE-MUX4 and AFE-MUX5 is the second positive voltage (VCI) in positive polarity and the second negative voltage (VCL) in negative polarity; the outputs of AFE-MUX2, AFE-MUX3, AFE-MUX4 and AFE-MUX5 are all the reference voltage (VCOM) for display.

In the third touch detection period subsequent to the third display drive period, AFE-MUX4 performs the touch detection action (Sensing) instead of AFE-MUX3, and the other AFE-MUX2, AFE-MUX3 and AFE-MUX5 perform the guarding action (Guarding). The power source to be supplied to AFE-MUX4 which performs the touch detection action (Sensing) is the first positive voltage (VSP) in positive polarity and the ground voltage (GND) in negative polarity; the output of AFE-MUX4 is a toggle signal alternating between VGUARD_L and VGUARD_H, inclusive. The power source to be supplied to the AFE select circuits AFE-MUX2, AFE-MUX3 and AFE-MUX5 which perform the guarding action (Guarding) in this time is the second positive voltage (VCI) in positive polarity and the second negative voltage (VCL) in negative polarity; the outputs of AFE-MUX2, AFE-MUX3 and AFE-MUX5 are each a toggle signal (i.e. Guarding signal) with its DC level shifted to the reference voltage (VCOM).

In the fourth display drive period subsequent to the third touch detection period, the power source to be supplied to all of AFE-MUX2, AFE-MUX3, AFE-MUX4 and AFE-MUX5 is the second positive voltage (VCI) in positive polarity and the second negative voltage (VCL) in negative polarity; the outputs of AFE-MUX2, AFE-MUX3, AFE-MUX4 and AFE-MUX5 are all the reference voltage (VCOM) for display.

In the fourth touch detection period subsequent to the fourth display drive period, AFE-MUX5 performs the touch detection action (Sensing) instead of AFE-MUX4, and AFE-MUX2, AFE-MUX3 and AFE-MUX4 perform the guarding action (Guarding). The power source to be supplied to AFE-MUX4 which performs the touch detection action (Sensing) is the first positive voltage (VSP) in positive polarity and the ground voltage (GND) in negative polarity; the output of AFE-MUX4 is a toggle signal alternating between VGUARD_L and VGUARD_H, inclusive. The power source to be supplied to AFE-MUX2, AFE-MUX3 and AFE-MUX4 which performs the guarding action (Guarding) in this time is the second positive voltage (VCI) in positive polarity and the second negative voltage (VCL) in negative polarity; the outputs of AFE-MUX2, AFE-MUX3 and AFE-MUX4 are each a toggle signal (i.e. Guarding signal) with its DC level shifted to the reference voltage (VCOM).

By switching the source voltages to be supplied to the AFE select circuits with the power source select circuit 71 as described above, the breakdown voltages of the elements for constituting the plurality of AFE select circuits AFE-MUX2, AFE-MUX3, AFE-MUX4 and AFE-MUX5 may be made values which allow the elements to endure, of a potential difference between the first positive voltage (VSP) and the ground voltage (GND) and a potential difference between the second positive voltage (VCI) and the second negative voltage (VCL), a larger potential difference. So, it is not necessary to adopt elements having a large breakdown voltage enough to endure a large potential difference, such as a potential difference between the first positive voltage (VSP) and the second negative voltage (VCL). For instance, with the aforementioned exemplary voltage values (VSP=+6V, VCI=+3V, GND=0V, VCL=−3V, and VSN=−6V), the breakdown voltages of the elements may be made values which allow them to endure a 6V-action.

[Second Embodiment]

As described above, the reference voltage (VCOM) for display depends on the specifications of the display panel concerned, which varies from panel to another. For instance, in the case of the display panel composed of a liquid crystal module (LCM: Liquid Crystal Module) based on low-temperature polycrystal silicon (LTPS: Low Temperature Poly-crystal Silicon), the reference voltage varies in a range of 0 to −1.0V, centering at VCOM=−0.5V in general. In the case of the display panel composed of an amorphous silicon (amorphous Silicon) LCM, the reference voltage varies around a voltage level larger in a negative polarity direction, e.g. VCOM=−3V. On condition that the source voltages of the circuits in the semiconductor device 100 in this time are made the aforementioned exemplary voltage values (VSP=+6V, VCI=+3V, GND=0V, VCL=−3V, and VSN=−6V), the amplitude of a toggle signal for the guarding action is restricted to some extent even with a display panel based on LTPS.

Figure 14:
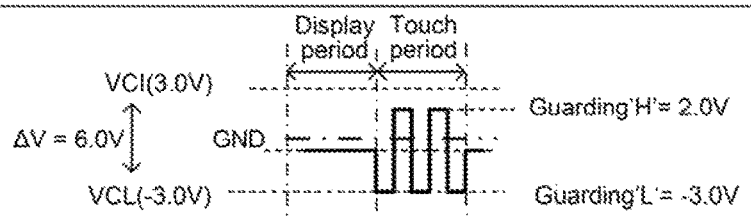
FIG. 14 is an explanatory diagram showing the relation between the range of a reference voltage (VCOM) for display and the amplitude of a toggle signal for a guarding action, which is expected on the assumption that the display panel concerned is a low-temperature polycrystal silicon LCM.

FIG. 14 is an explanatory diagram showing the relation between the range of the reference voltage (VCOM) for display and the amplitude of a toggle signal for the guarding action, which is expected on the assumption that the display panel is LTPS-LCM.

In the case of the semiconductor device 100 of the first embodiment, which operates with the source voltages shown, by example, in FIG. 11, the power source to be supplied to the AFE select circuit 2 through which a toggle signal (Guarding signal) with its DC level shifted for the guarding action is passed in a touch detection period is the second positive voltage (VCI=+3V) and the second negative voltage (VCL=−3V). On this account, the amplitude of the guarding signal (Guarding signal) is limited to a source voltage range of −3V to +3V.

Supposing that the target value of the amplitude of the guarding signal is 5V, which is based on a peak-to-peak measurement, all that is required is to make the amplitude of the guarding signal (Guarding signal) −3V to +2V in the case of VCOM=−0.5V, which can be actualized. Also, in the case of VCOM=0V, it is sufficient to make the amplitude of the guarding signal (Guarding signal) −2.5V to +2.5V, which can be materialized. However, under the condition of VCOM=−1.0V, the guarding signal will go below VCL=−3V, which is the lower source voltage in case that the amplitude of the guarding signal (Guarding signal) is made −3.5V to +1.5V. Consequently, the amplitude target of 5Vp-p cannot be achieved, and the guarding signal amplitude is limited to a range of −3V to +1V.

Figure 15:
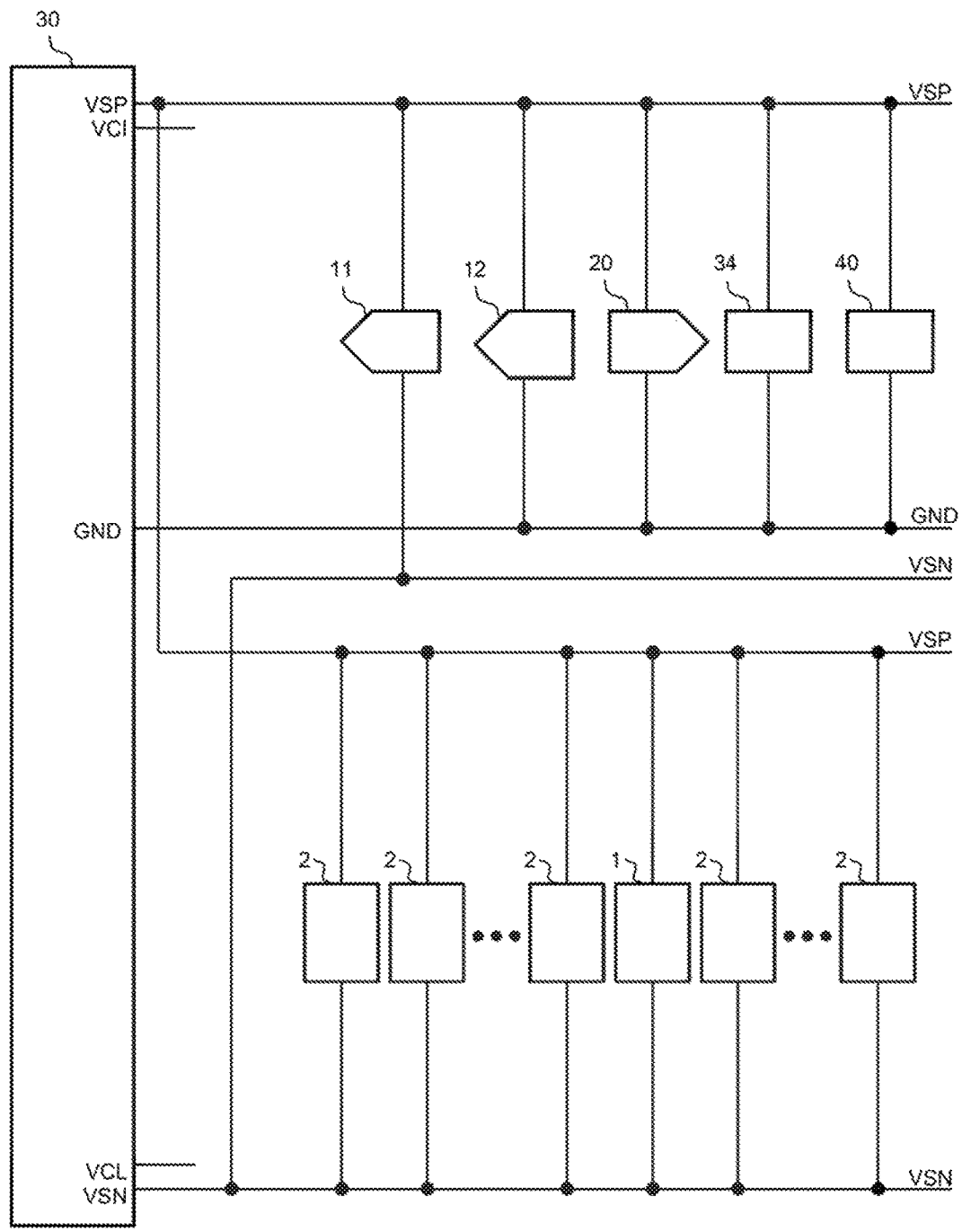
FIG. 15 is a block diagram showing an aspect of power supply to each circuit from the power source circuit in the semiconductor device according to the second embodiment of the invention.

FIG. 15 is a block diagram showing an aspect of power supply to the circuits from the power source circuit 30 in the semiconductor device 100.

The power source circuit 30 supplies the touch detection circuit (AFE) 20, the toggle drive circuit 12, the toggle output switch 34, and the source drive block 40 including the source amplifier 41 and the select switch 42 with the first positive voltage (VSP) and the ground voltage (GND), and supplies the reference voltage drive circuit 11 with the first positive voltage (VSP) and the first negative voltage (VSN). Also, the power source circuit 30 supplies the AFE select circuits 1 and 2 with the first positive voltage (VSP) and the first negative voltage (VSN) regardless of whether the device is in a display drive period or touch detection period.

This eliminates the need for switching the source voltage between a display drive period and a touch detection period and therefore, the necessity for providing the power source select circuit 71 can be avoided.

On condition that the source voltages of the circuits in the semiconductor device 100 are made the aforementioned exemplary voltage values (VSP=+6V, VCI=+3V, GND=0V, VCL=−3V, and VSN=−6V) in this time, the power source supplied to the AFE select circuit 2 through which the guarding signal (Guarding signal) is passed becomes the first positive voltage (VSP=+6V) and the first negative voltage (VSN=−6V) and therefore, the restriction on the amplitude of the guarding signal (Guarding signal) is eased significantly. For instance, in the case of VCOM=−1V as described above, the maximum which can be taken as the amplitude of the guarding signal (Guarding signal) is −6V to +4V and thus 10Vp-p can be achieved, or it becomes possible to adapt to a wide range of the reference voltage (VCOM) for display.

[Third Embodiment]

To realize the aspect of source voltage supply shown in the second embodiment, high-breakdown voltage elements are required for constituting the respective circuits of the semiconductor device 100, which is disadvantageous in terms of device characteristics and area. For instance, with the aforementioned exemplary voltage values, the elements for constituting the reference voltage drive circuit 11 and the AFE select circuits 1 and 2 are required to have a breakdown voltage (12V+Design Margin) higher than 12V.

In the third embodiment, it is intended to hold down the breakdown voltages of the elements for constituting the reference voltage drive circuit 11 and the AFE select circuits 1 and 2 as low as those achieved by the first embodiment.

Figure 16:
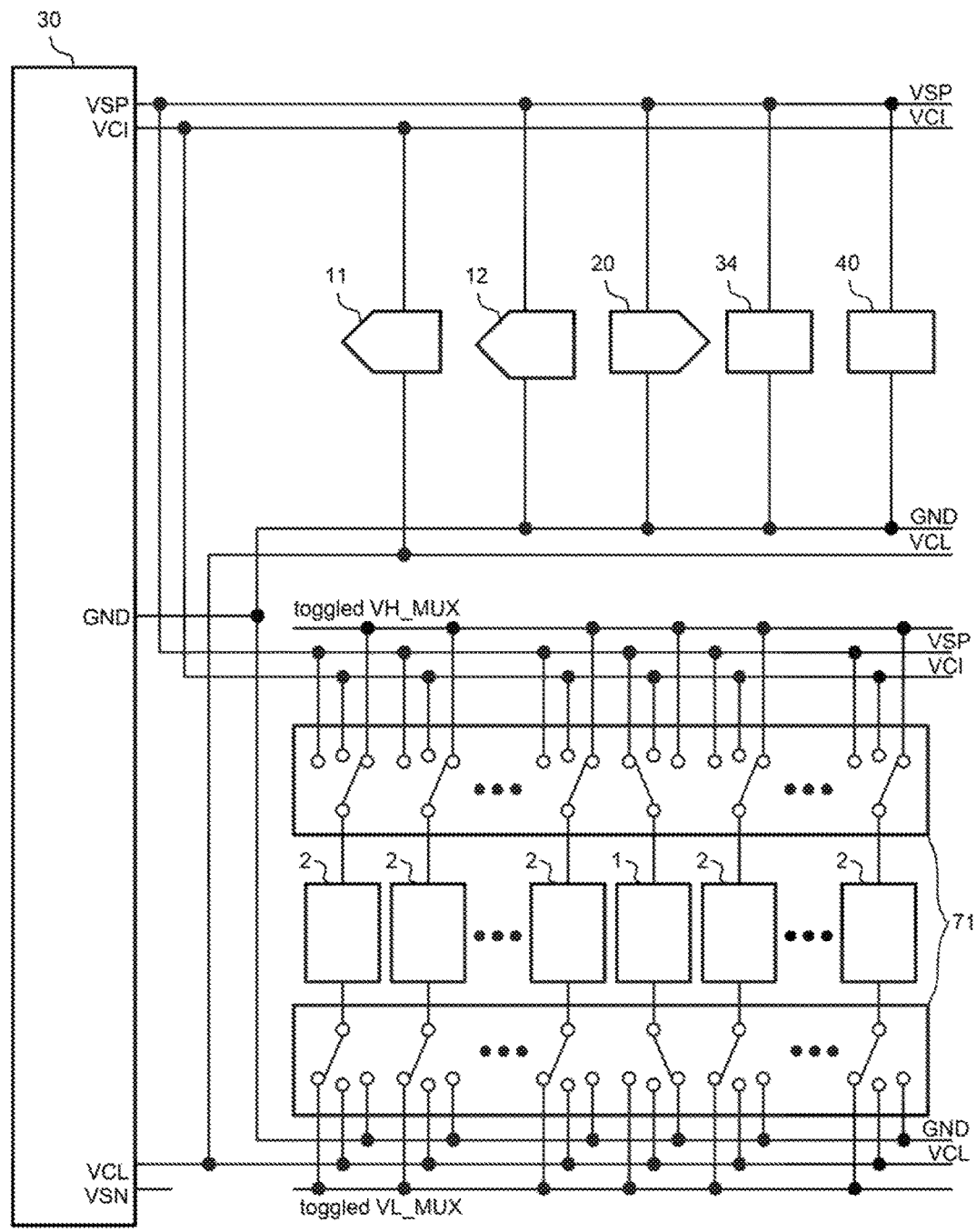
FIG. 16 is a block diagram showing an aspect of power supply to each circuit from the power source circuit and the power source select circuit in the semiconductor device according to the third embodiment of the invention.

FIG. 16 is a block diagram showing an aspect of power supply to the circuits from the power source circuit 30 and the power source select circuit 71 in the semiconductor device 100 according to the third embodiment. It is identical to the aspect of power supply to the circuits from the power source circuit and the power source select circuit in the semiconductor device of the first embodiment, which has been described with reference to FIG. 11 except for the structure of the power source select circuit 71 and the action thereof.

The power source circuit 30 supplies the AFE select circuits 1 and 2 with the second positive voltage (VCI) and the second negative voltage (VCL) as a power source in a display drive period. On the other hand, in a touch detection period, the power source circuit 30 supplies, through the power source select circuit 71, the AFE select circuit 2 corresponding to the sensor capacitance not targeted for touch detection with a voltage (toggled VH_MUX) alternating between the first positive voltage (VSP) and the ground voltage (GND) in synchronization with a toggle signal on the positive polarity side, and a voltage (toggled VL_MUX) alternating between the ground voltage (GND) and the first negative voltage (VSN) in synchronization with the toggle output on the negative polarity side as a power source, and it supplies the AFE select circuit 1 corresponding to the sensor capacitance targeted for touch detection with the first positive voltage (VSP) and the ground voltage (GND) as a power source.

Thus, even in the case of the reference voltage (VCOM) for display spreading over a wide range because of the necessity for supporting various display touch panels, the breakdown voltages of all the elements for constituting the circuits involved therewith in the semiconductor device 100 can be kept low. In other words, these circuits can be arranged by use of elements having endurance against the potential difference between the first positive voltage (VSP) and the ground voltage (GND), and the potential difference between the ground voltage (GND) and the first negative voltage (VSN).

Now, the action of the semiconductor device 100 will be described further in detail.

Figure 17:
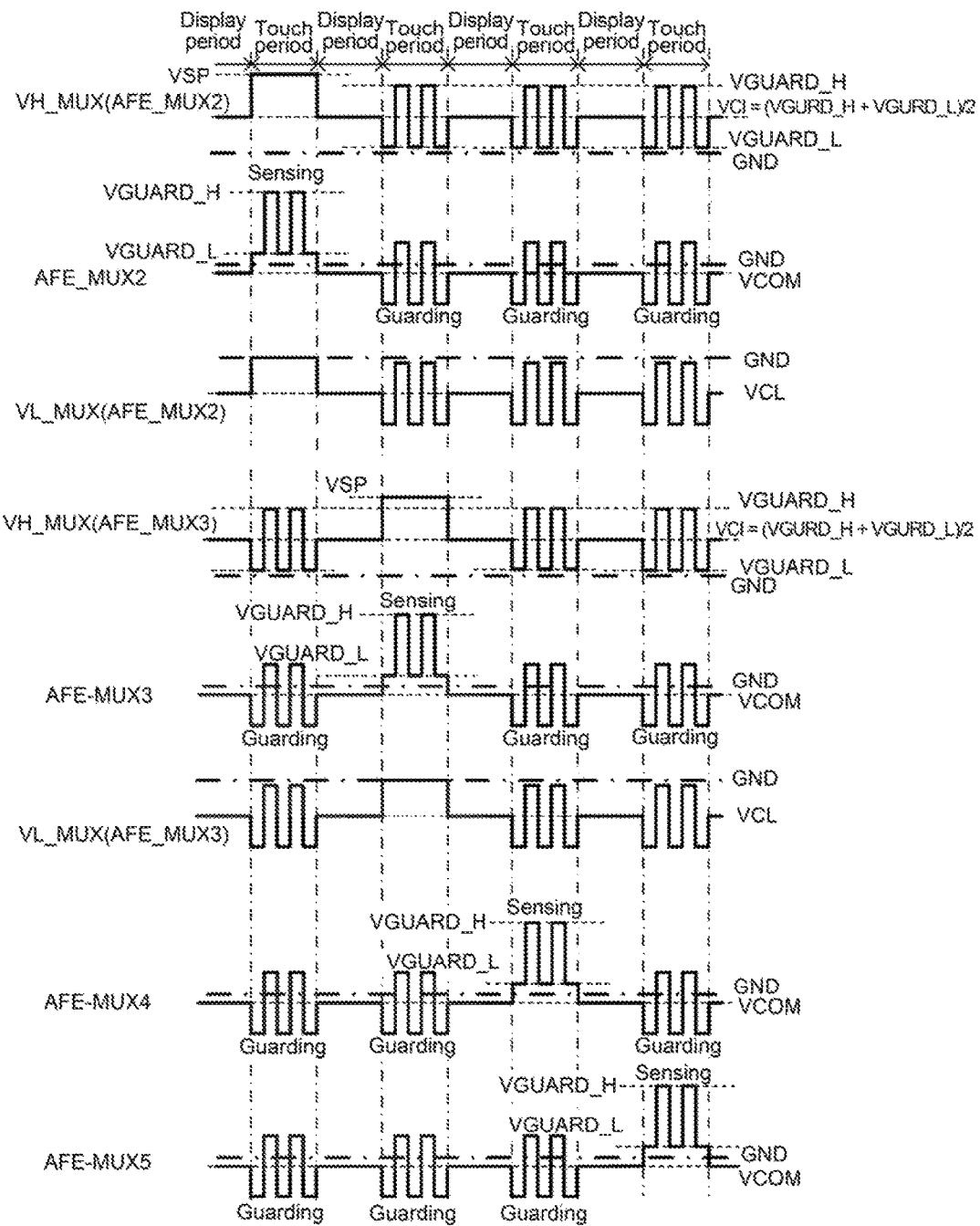
FIG. 17 is a waveform diagram showing an aspect of power supply to each AFE select circuit from the power source select circuit in the semiconductor device according to the third embodiment of the invention.

FIG. 17 is a waveform diagram showing an aspect of power supply to the AFE select circuits 1 and 2 from the power source select circuit 71 of the semiconductor device 100.

The following are shown in turn from the top in a vertical axis direction in FIG. 17 in the same way as in FIG. 13: a positive-polarity power source VH_Power (AFE_MUX2) supplied to AFE-MUX2; an output waveform of AFE-MUX2; a negative-polarity power source VL_Power(AFE_MUX2) supplied to AFE-MUX2; a positive-polarity power source VH_Power (AFE_MUX3) supplied to AFE-MUX3; an output waveform of AFE-MUX3; a negative-polarity power source VL_Power(AFE_MUX3) supplied to AFE-MUX3; an output waveform of AFE-MUX4; and an output waveform of AFE-MUX4. In a lateral axis direction, the display drive period and the touch detection period are alternately repeated. Specifically, the first display drive period (Display period), the first touch detection period (Touch period), the second display drive period, the second touch detection period, the third display drive period, the third touch detection period, the fourth display drive period, and the fourth touch detection period are shown in turn.

In the first touch detection period, AFE-MUX2 performs the touch detection action (Sensing), and the other AFE-MUX3, AFE-MUX4 and AFE-MUX5 perform the guarding action (Guarding).

The power source to be supplied to AFE-MUX2 performing the touch detection action (Sensing) is the first positive voltage (VSP) in positive polarity and the ground voltage (GND) in negative polarity. The output of AFE-MUX2 is a toggle signal alternating between VGUARD_L and VGUARD_H, inclusive. In addition, the outputs of AFE-MUX3, AFE-MUX4 and AFE-MUX5 which perform the guarding action (Guarding) are each a toggle signal (Guarding signal) with its DC level shifted to the reference voltage (VCOM). The power source to be supplied to AFE-MUX3, AFE-MUX4 and AFE-MUX5 in this time is a voltage (toggled VH_MUX) alternating between the first positive voltage (VSP) and the ground voltage (GND) in synchronization with the toggle signal in positive polarity, and a voltage (toggled VL_MUX) alternating between the ground voltage (GND) and the first negative voltage (VSN) in synchronization with the toggle output in negative polarity.

In the third and fourth display drive periods as well as the second display drive period subsequent to the first touch detection period, the power source to be supplied to all of AFE-MUX2, AFE-MUX3, AFE-MUX4 and AFE-MUX5 is the second positive voltage (VCI) in positive polarity and the second negative voltage (VCL) in negative polarity; the outputs of AFE-MUX2, AFE-MUX3, AFE-MUX4 and AFE-MUX5 are all the reference voltage (VCOM) for display.

In the second, third, fourth touch detection periods, AFE-MUX3, AFE-MUX4 and AFE-MUX5 perform the touch detection action (Sensing) instead of AFE-MUX2 in turn; and the others AFE-MUX perform the guarding action (Guarding). The power source to be supplied to AFE-MUX which performs the touch detection action (Sensing) is the first positive voltage (VSP) in positive polarity, and the ground voltage (GND) in negative polarity. The power source to be supplied to the other AFE select circuits AFE-MUX which perform the guarding action (Guarding) in this time is a voltage (toggled VH_MUX), alternating between the first positive voltage (VSP) and the ground voltage (GND) in synchronization with a toggle signal in positive polarity, and a voltage (toggled VL_MUX) alternating between the ground voltage (GND) and the first negative voltage (VSN) in synchronization with the toggle output in negative polarity.

As described above, by switching the source voltages to be supplied to the AFE select circuits with the power source select circuit 71, the breakdown voltages of the elements for constituting the plurality of AFE select circuits AFE-MUX2, AFE-MUX3, AFE-MUX4 and AFE-MUX5 may be made values which allow the elements to ensure, of a potential difference between the first positive voltage (VSP) and the ground voltage (GND), and a potential difference between the second positive voltage (VCI) and the second negative voltage (VCL), a larger potential difference. So, it is not necessary to adopt elements having a large breakdown voltage enough to endure a large potential difference, such as a potential difference between the first positive voltage (VSP) and the negative voltage (VCL). For instance, with the aforementioned exemplary voltage values, the breakdown voltages of the elements may be made values which allow the elements to endure a 6V-action.

Figure 18:
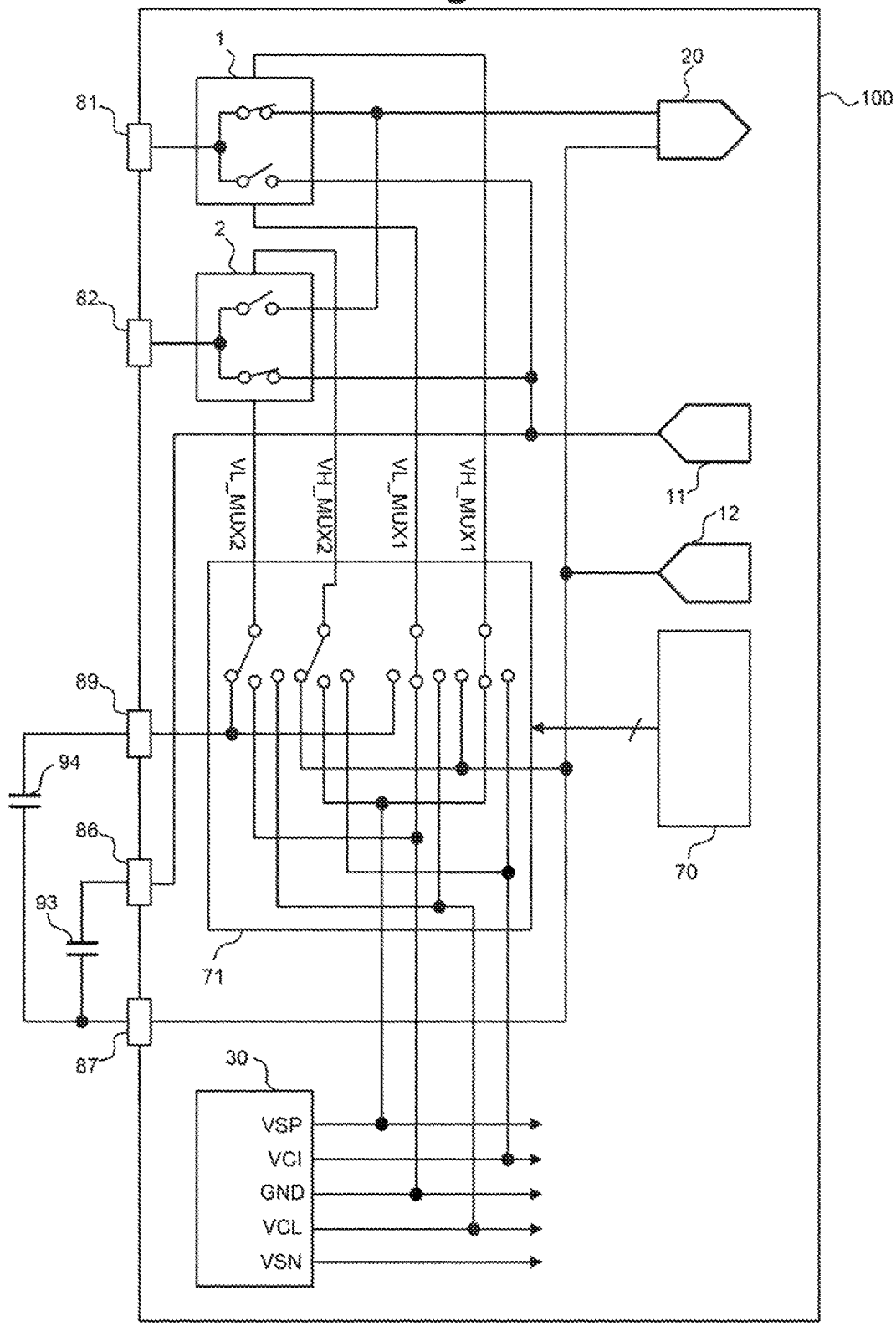
FIG. 18 is a block diagram showing an example of the configuration of the semiconductor device according to the third embodiment of the invention.

FIG. 18 is a block diagram showing an example of the configuration of the semiconductor device 100 according to the third embodiment of the invention. The semiconductor device is arranged by adding a circuit which generates a power source alternating in synchronization with a toggle output to the semiconductor device 100 of the first embodiment shown in FIG. 10. The semiconductor device includes power source terminals 83 and 84 for supplying the power source to the gate drive circuit 201 on the display touch panel 200, externally attached capacitances 91 and 92, a charge pump block 31, a source drive block 40, and a source drive terminal 85, which are the same as those in the study example (FIG. 1) and the first embodiment (FIG. 10) and of which the visual representations are omitted. Further, the semiconductor device includes a touch detection circuit 20, a reference voltage drive circuit 11, a toggle drive circuit 12, an externally attached capacitance 93, and connection terminals 86 and 87, which are the same as those in the first embodiment (FIG. 10). So, their detailed descriptions are omitted here.

The semiconductor device 100 according to the third embodiment further includes an externally attached capacitance 94 and a connection terminal 89. The externally attached capacitance 94 has one electrode commonly connected to the terminal 87 to which one electrode of the externally attached capacitance 93 is connected, and is supplied with a toggle signal from the toggle drive circuit 12. From the terminal 89 to which the other electrode of the externally attached capacitance 94 is connected, a toggle signal with its DC component cut out by the capacitance 94 is input to the semiconductor device. According to the arrangement like this, a toggle signal alternating, in amplitude, with respect to the second positive voltage (VCI) is supplied as a power source of positive polarity to be supplied to AFE-MUX which performs the guarding action (Guarding), and a toggle signal alternating, in amplitude, with respect to the second negative voltage (VCL) is supplied as a power source of the negative polarity. In this way, the semiconductor device according to the third embodiment can be readily achieved by just adding one externally attached capacitance 94.

The circuit operable to toggle a source voltage will be described further in detail.

Figure 19:
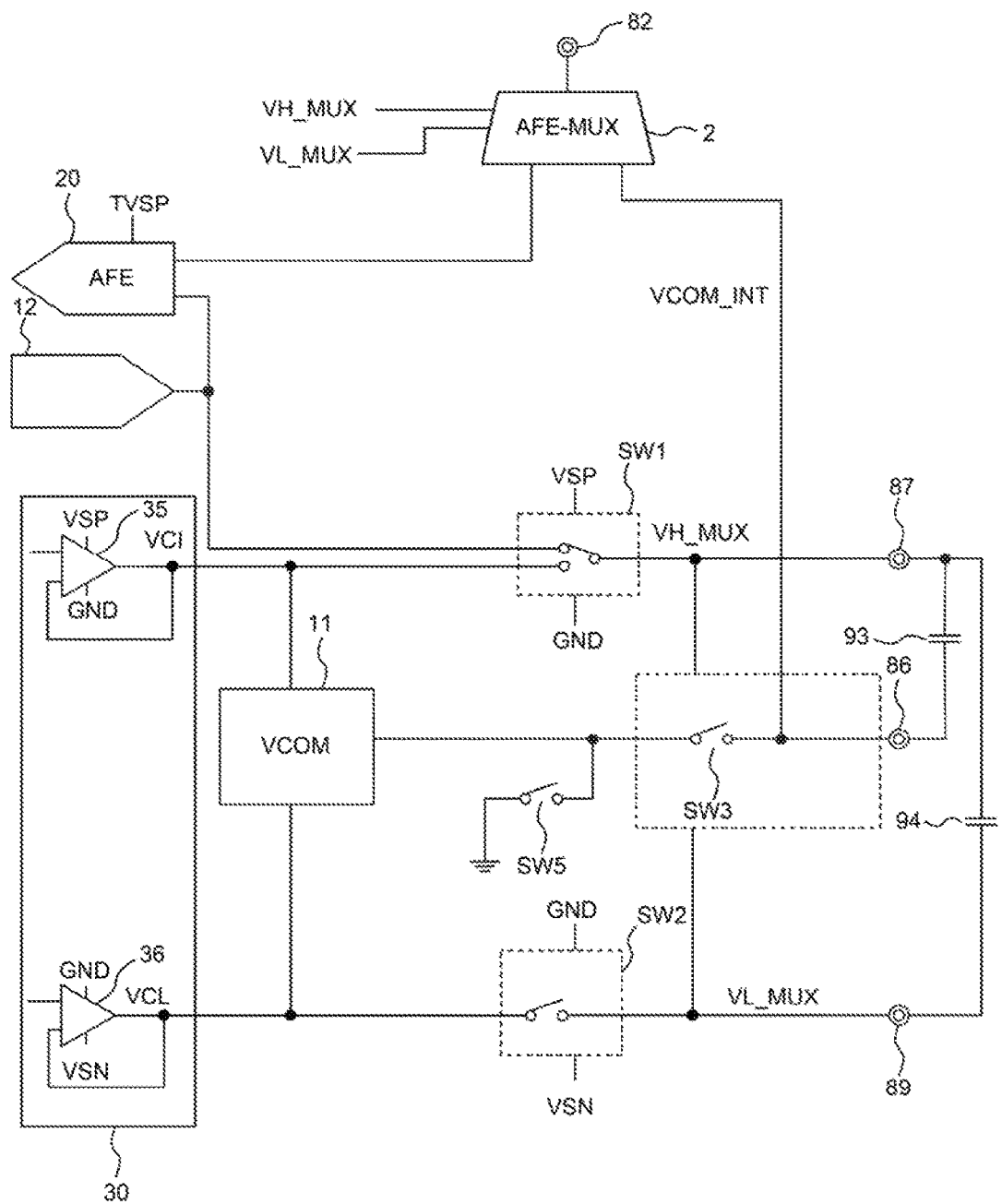
FIG. 19 is an example of the configuration of a circuit operable to toggle a source voltage in the semiconductor device according to the third embodiment.
Figure 20:
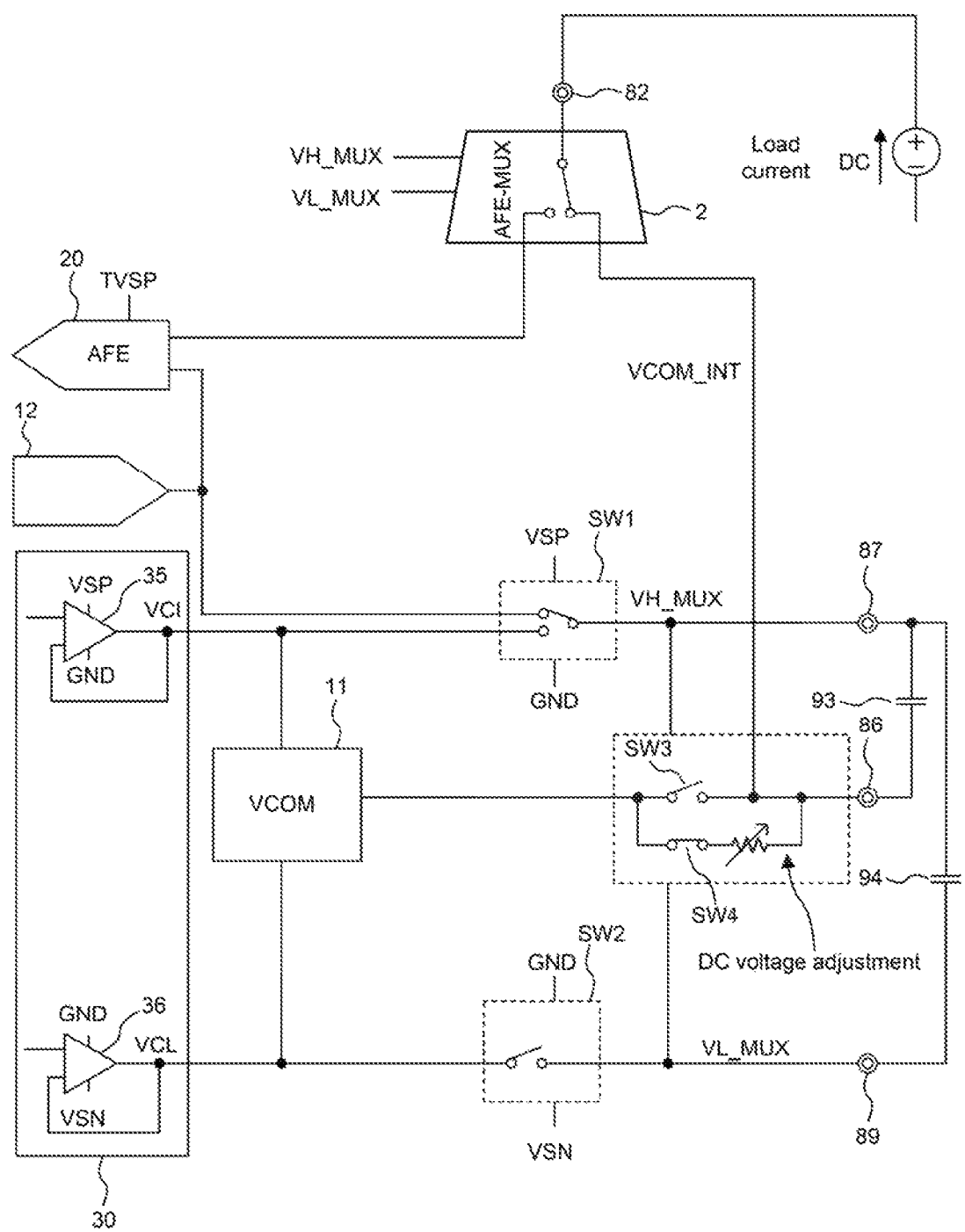
FIG. 20 is another example of the configuration of the circuit operable to toggle the source voltage in the semiconductor device according to the third embodiment.

FIGS. 19 and 20 each show an example of the configuration of the circuit operable to toggle a source voltage in the semiconductor device 100 of the third embodiment. The diagrams focus on the circuit deeply participating in the action of toggling a source voltage in the circuit shown in FIG. 18, showing the configuration of the circuit further in detail.

In the circuit for toggling the power source VH_MUX/VLMUX to be supplied to the AFE select circuit 2 which performs the guarding action (Guarding), the AFE select circuit 2 has one terminal connected to the touch detection circuit 20, and it is supplied with VCOM_INT at the other terminal and connected to the terminal 82 for connecting to the sensor capacitance Ct2 (not shown). The power source circuit 30 has a VCI amplifier 35 operable to output the second positive voltage (VCI), and a VCL amplifier 36 operable to output the second negative voltage (VCL), and supplies the power source VCI/VCL to the reference voltage drive circuit 11. The externally attached capacitances 93 and 94, and the terminals 86, 87 and 89 are as described with reference to FIG. 18.

In a display drive period, the second positive voltage VCI is supplied to VH_MUX through SW1, and the second negative voltage VCL is supplied to VL_MUX through SW2. In a touch detection period, a toggle signal which is an output of the toggle drive circuit 12 is supplied to VH_MUX through SW1, and VL_MUX is cut off from the VCL amplifier 36 by SW2 and put in a high impedance (Hi-Z) state, and thus a toggle signal with its DC level cut out is supplied by the externally attached capacitance 94 instead.

As for VCOM_INT, in a display drive period, SW3 is closed and the reference voltage (VCOM) for display is supplied to the terminal 82. In the case of performing the guarding action in a touch detection period, SW3 is opened to bring an output from the reference voltage drive circuit 11 into a high impedance (Hi-Z) state, and then a toggle signal with its DC level cut out is supplied by the externally attached capacitance 93 instead.

Because of the presence of the capacitive coupling 93 between VH_MUX and VCOM INT as described above, VCOM INT is toggled in waveform in synchronization with toggling of VH_MUX by a toggle signal which is an output of the toggle drive circuit 12.

Incidentally, it is desirable to make the setting of VCI=1/2VSP for the purpose of correctly matching the VCOM voltage value with the average voltage of the guarding action, although the achievement of the effect of reducing noise is promised entirely as long as VCI is a voltage near 1/2VSP.

FIG. 20 shows another example of the configuration of the circuit operable to toggle a source voltage in the semiconductor device 100 according to the third embodiment. The circuit of FIG. 20 is different from that shown in FIG. 19 in that an amorphous silicon liquid crystal module is assumed as the display panel. In the amorphous silicon liquid crystal module, the leak current in the sensor capacitance Ct2 (not shown) is relatively large. Therefore, a current source "Load current" representing the leak current is shown in FIG. 20. In this case, a reference voltage (VCOM) output by the reference voltage drive circuit 11 is passed through a resistance Rt by closing SW4 instead of opening SW3 to make a high impedance (Hi-Z) state and consequently, the reference voltage in a state of being weakened is output for VCOM_INT in a touch detection period in the semiconductor device 100. Thus, the DC voltage level of VCOM_INT can be kept at the reference voltage (VCOM) even with current leaking from the sensor capacitance Ct2 (not shown). The value of the resistance Rt may be decided in consideration of the quantity of the leak current and more preferably, the resistance may be made variable one.

[Fourth Embodiment]

In the semiconductor device 100 according to the fourth embodiment, the touch detection circuit 20 includes a differential amplifier circuit having a pair of input terminals to which differential signals are input, and a toggle signal is supplied to one input terminal from the toggle drive circuit 12; the touch detection circuit has a DC voltage level shift circuit 23 operable to shift the DC voltage level at the other input terminal.

Figure 21:
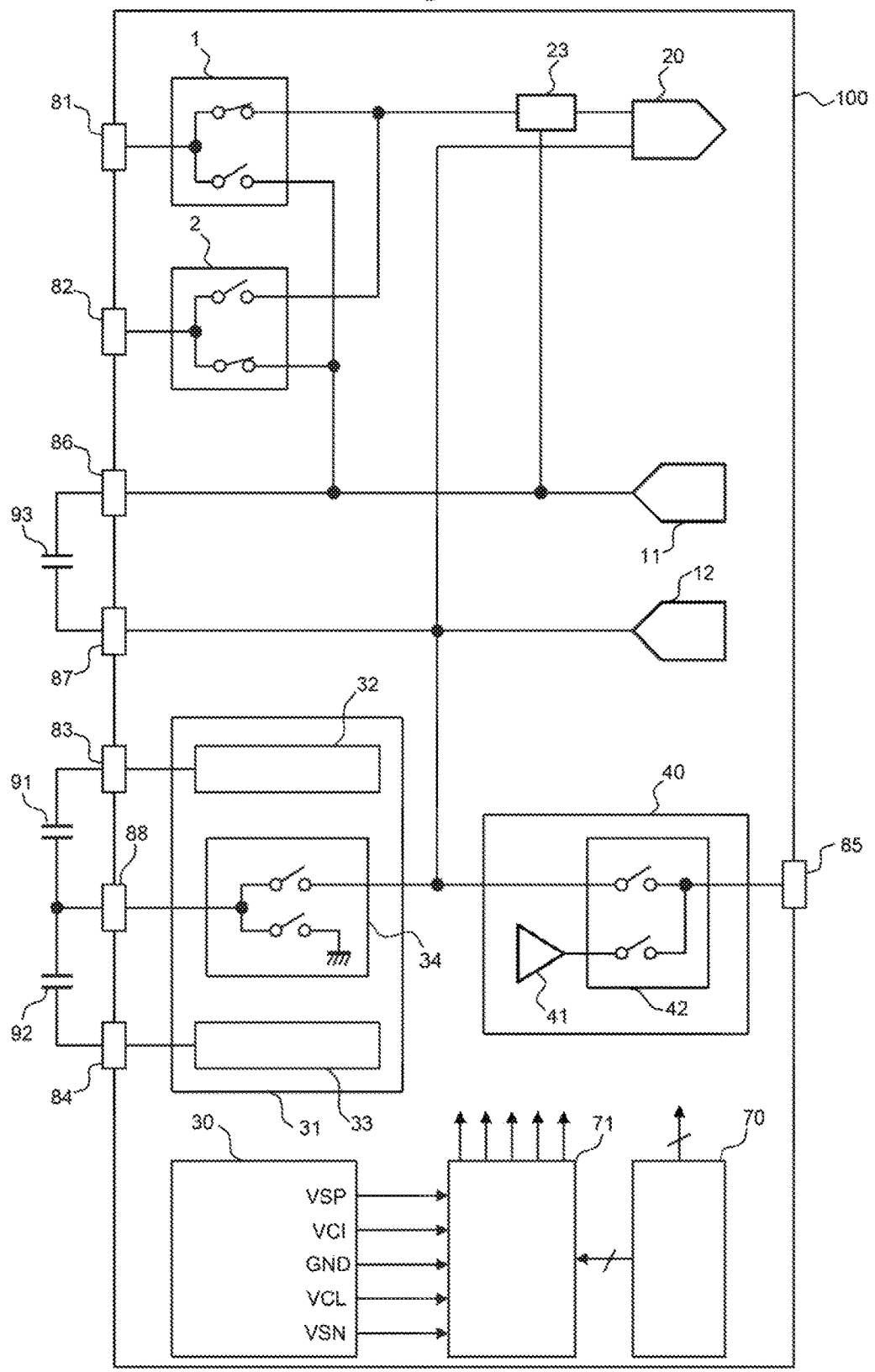
FIG. 21 is a block diagram showing an example of the configuration of the semiconductor device according to the fourth embodiment of the invention.

FIG. 21 is a block diagram showing an example of the configuration of the semiconductor device 100. The semiconductor device is different from the semiconductor device 100 of the first embodiment shown in FIG. 10 in that it includes the DC voltage level shift circuit 23 for an input part of the touch detection circuit 20. With other points of the circuit configuration, there is no particular modification. So, the configuration of the DC voltage level shift circuit 23 and the action thereof will be described in detail, while omitting the descriptions about the other circuits.

Figure 22:
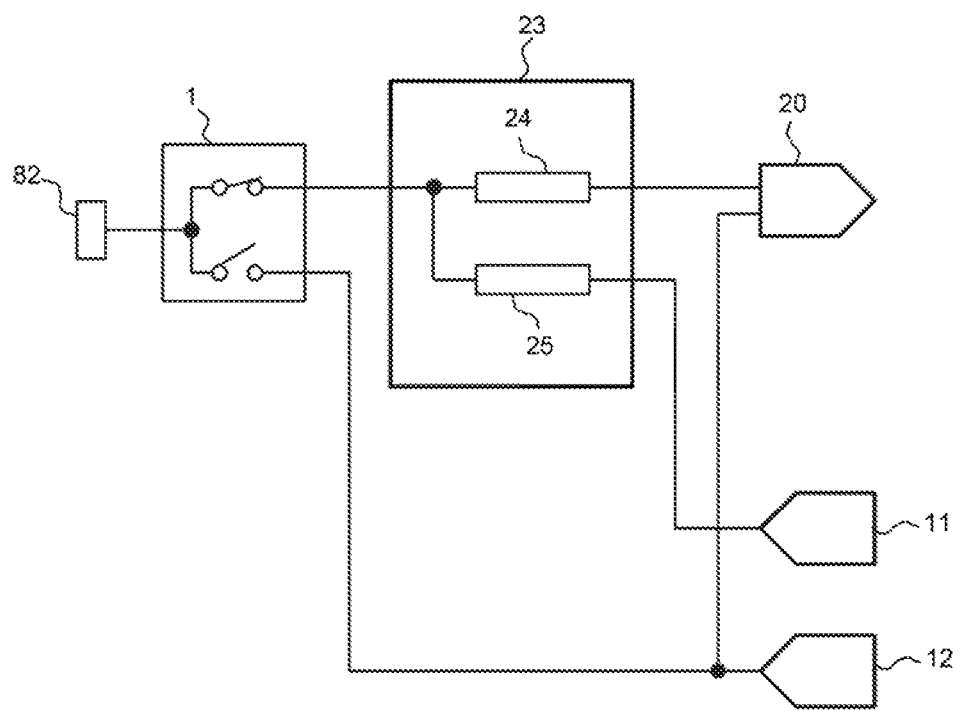
FIG. 22 is a circuit diagram showing an example of the configuration of a DC voltage level shift circuit 23.

FIG. 22 is a circuit diagram showing an example of the configuration of the DC voltage level shift circuit 23. The touch detection circuit 20 is an integration circuit arranged with a differential amplifier circuit as shown in FIG. 3, and the DC voltage level shift circuit 23 is added to one differential input thereof. The DC voltage level shift circuit 23 includes a capacitance 24 and a resistance 25. The capacitance 24 is inserted between the AFE select circuit 1 and the touch detection circuit 20, whereby a DC component is cut out, and the reference voltage (VCOM) is supplied from the reference voltage drive circuit 11 through the resistance 25 instead.

Thus, even if the touch detection circuit 20 is a circuit working with the source voltage VSP/GND supplied thereto, and a toggle signal supplied from the toggle drive circuit 12 is a signal alternating between VSP and GND in amplitude, its DC level is shifted to the reference voltage (VCOM) and as such, signals output through the terminal 81 are unified into the reference voltage (VCOM) in DC level in both of a display drive period and a touch detection period. Therefore, it is appropriate that the AFE select circuit works on the source voltage, e.g. VCI/VCL, centering at the reference voltage (VCOM) regardless of whether it corresponds to a sensor capacitance targeted for touch detection or a non-target sensor capacitance.

Likewise, as for not only an electrode on which the guarding action (Guarding) is performed, but also an electrode on which the touch detection action (Sensing) is conducted in a touch detection period, the effect of suppressing audible noise is further increased by matching the center of the toggle voltage to the reference voltage (VCOM).

Figure 23:
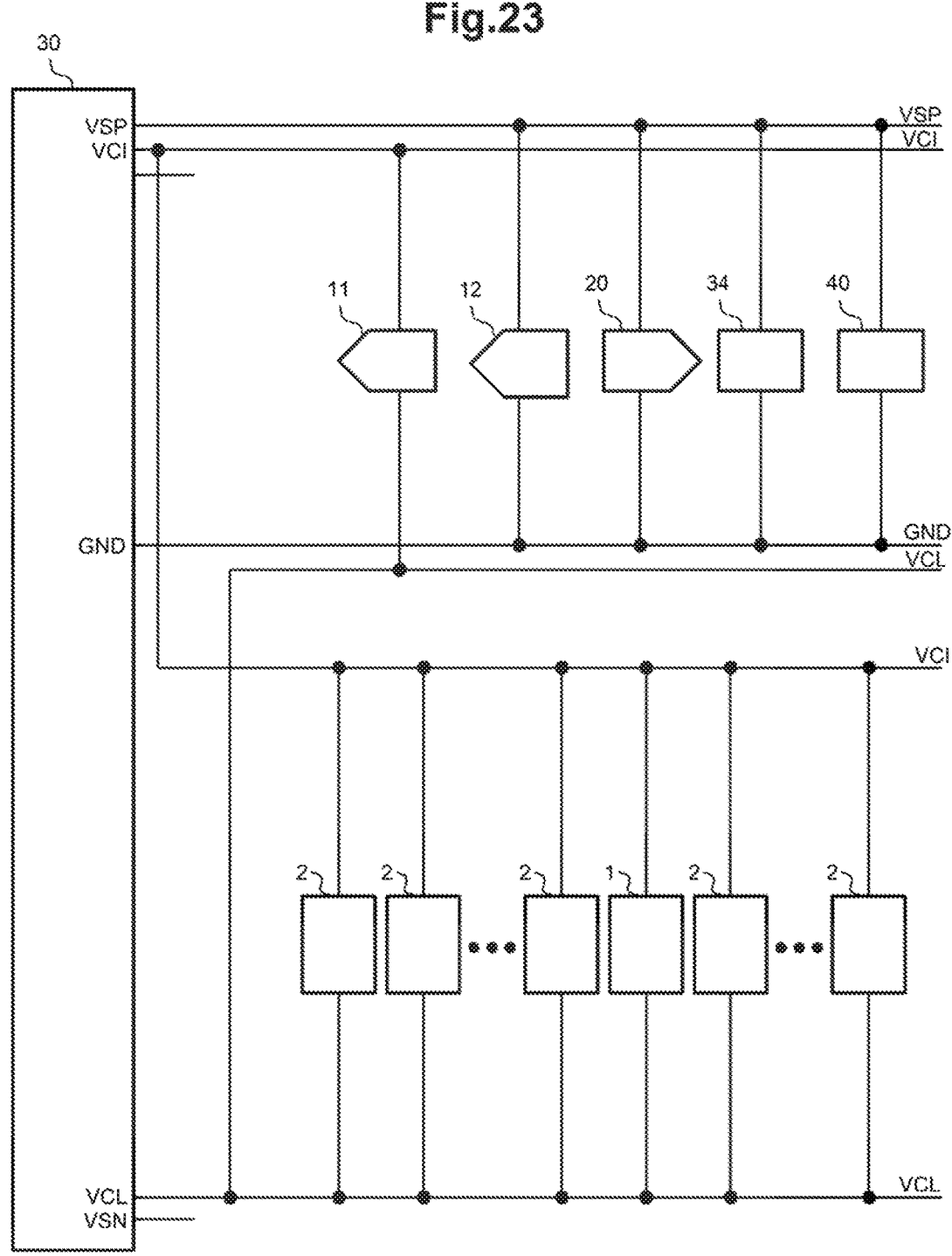
FIG. 23 is a block diagram showing an aspect of power supply to each circuit from the power source circuit in the semiconductor device according to the fourth embodiment of the invention.

FIG. 23 is a block diagram showing an aspect of power supply to each circuit from the power source circuit 30 in the semiconductor device 100.

The power source circuit 30 supplies the first positive voltage (VSP) and the ground voltage (GND) to each touch detection circuit (AFE) 20, the toggle drive circuit 12, the toggle output switch 34, and the source drive block 40 including the source amplifier 41 and the select switch 42, and supplies the second positive voltage (VCI) and the second negative voltage (VCL) to the reference voltage drive circuit 11 and the AFE select circuits 1 and 2.

This eliminates the need for switching the source voltage between a display drive period and a touch detection period and therefore, the necessity for providing the power source select circuit 71 can be avoided.

Now, the action of the semiconductor device 100 will be described further in detail.

Figure 24:
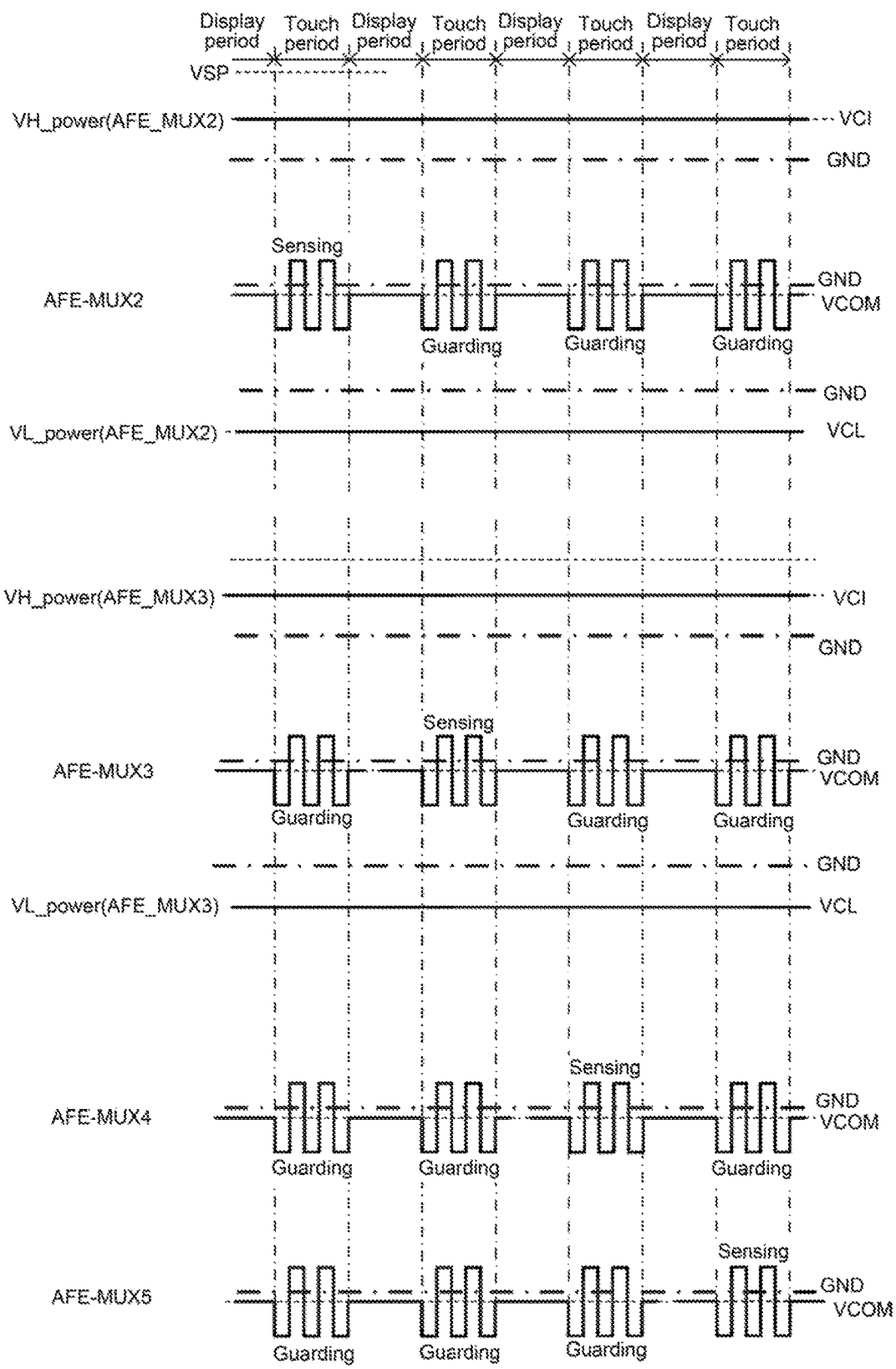
FIG. 24 is a waveform diagram showing an aspect of power supply to each AFE select circuit from the power source circuit in the semiconductor device according to the fourth embodiment of the invention.

FIG. 24 is a waveform diagram showing an aspect of power supply to each AFE select circuit 1, 2 from the power source circuit 30 of the semiconductor device 100.

The following are shown in turn from the top in a vertical axis direction in FIG. 24 as in FIGS. 13 and 17: a positive-polarity power source VH_Power (AFE_MUX2) supplied to AFE-MUX2; an output waveform of AFE-MUX2; a negative-polarity power source VL_Power(AFE_MUX2) supplied to AFE-MUX2; a positive-polarity power source VH_Power (AFE_MUX3) supplied to AFE-MUX3; an output waveform of AFE-MUX3; a negative-polarity power source VL_Power(AFE_MUX3) supplied to AFE-MUX3; an output waveform of AFE-MUX4; and an output waveform of AFE-MUX4. In a lateral axis direction, the display drive period and the touch detection period are alternately repeated. Specifically, the first display drive period (Display period), the first touch detection period (Touch period), the second display drive period, the second touch detection period, the third display drive period, the third touch detection period, the fourth display drive period, and the fourth touch detection period are shown in turn.

In the first touch detection period, AFE-MUX2 performs the touch detection action (Sensing), and other AFE-MUX3, AFE-MUX4 and AFE-MUX5 perform the guarding action (Guarding). In the second, third, fourth touch detection periods after that, AFE-MUX3, AFE-MUX4 and AFE-MUX5 perform the touch detection action (Sensing) in turn instead of AFE-MUX2, and the others AFE-MUX perform the guarding action (Guarding).

Regardless of performing the touch detection action (Sensing) or the guarding action (Guarding), the power source to be supplied to all of AFE-MUX2, AFE-MUX3, AFE-MUX4 and AFE-MUX5 is the second positive voltage (VCI) in positive polarity and the second negative voltage (VCL) in negative polarity. Likewise, in a display drive period, the power source to be supplied to all of AFE-MUX2, AFE-MUX3, AFE-MUX4 and AFE-MUX5 is the second positive voltage (VCI) in positive polarity and the second negative voltage (VCL) in negative polarity.

[Fifth Embodiment]

In the above embodiment, the touch detection circuits 20 are arranged to work on the source voltage of VSP/GND in consideration of the matching with a logic circuit of the subsequent stage running on a source voltage of positive polarity, and as to the fifth embodiment and the sixth embodiment subsequent thereto, the description will be presented about an embodiment arranged so that the touch detection circuits 20 operate on the source voltage GND/VSN of negative polarity. A level shift circuit is provided between each AFE select circuit and the logic circuit of the subsequent stage working on the source voltage of positive polarity appropriately, which is not shown in the diagram.

Figure 25:
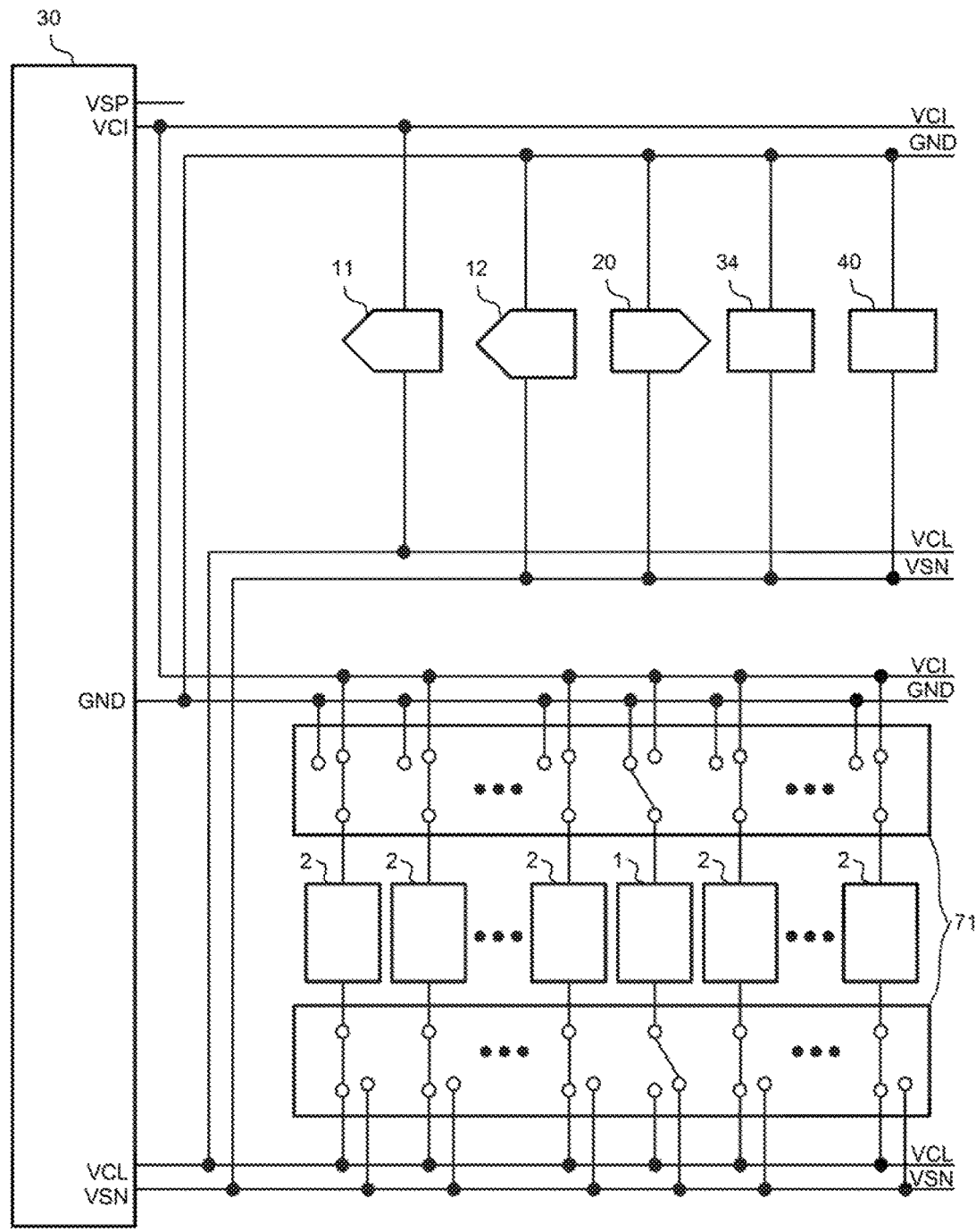
FIG. 25 is a block diagram showing an aspect of power supply to each circuit from the power source circuit and the power source select circuit in the semiconductor device according to the fifth embodiment of the invention.

FIG. 25 is a block diagram showing an aspect of power supply to each circuit from the power source circuit 30 and the power source select circuit 71 in the semiconductor device 100.

Each touch detection circuit (AFE) 20, the toggle drive circuit 12, the toggle output switch 34, and the source drive block 40 including the source amplifier 41 and the select switch 42 are supplied with the ground voltage (GND) and the first negative voltage (VSN). The reference voltage drive circuit 11 is supplied with the second positive voltage (VCI) and the second negative voltage (VCL).

In a display drive period, the power source select circuit 71 supplies the AFE select circuits 1 and 2 with the second positive voltage (VCI) and the second negative voltage (VCL), thereby outputting the reference voltage (VCOM) for display in negative polarity from the terminals 81 and 82.

In a touch detection period, the power source select circuit 71 supplies the AFE select circuit 1 corresponding to the sensor capacitance Ct1 targeted for touch detection with the ground voltage (GND) and the first negative voltage (VSN), thereby outputting a toggle signal (VGUARD) from the terminal 81, provided that the toggle signal is an output from the toggle drive circuit 12, and alternates, in amplitude, between the ground voltage (GND) and the first negative voltage (VSN), which make the source voltage of the toggle drive circuit in combination. The electric charge charged into/discharged from the sensor capacitance Ct1 targeted for touch detection through the terminal 81 is a piece of information input to the AFE select circuit 1.

On the other hand, the AFE select circuit 2 corresponding to the non-target sensor capacitance Ct2 is supplied with the second positive voltage (VCI) and the second negative voltage (VCL), and it outputs, from the terminal 82, a toggle signal produced by shifting, in DC voltage level, a toggle signal (VGUARD) output by the toggle drive circuit 12.

The effect of holding down the breakdown voltages of the elements for constituting the AFE select circuits 1 and 2 by providing the power source select circuit 71 to switch the source voltage to be supplied is the same as that achieved in the first embodiment or the like.

Figure 26:
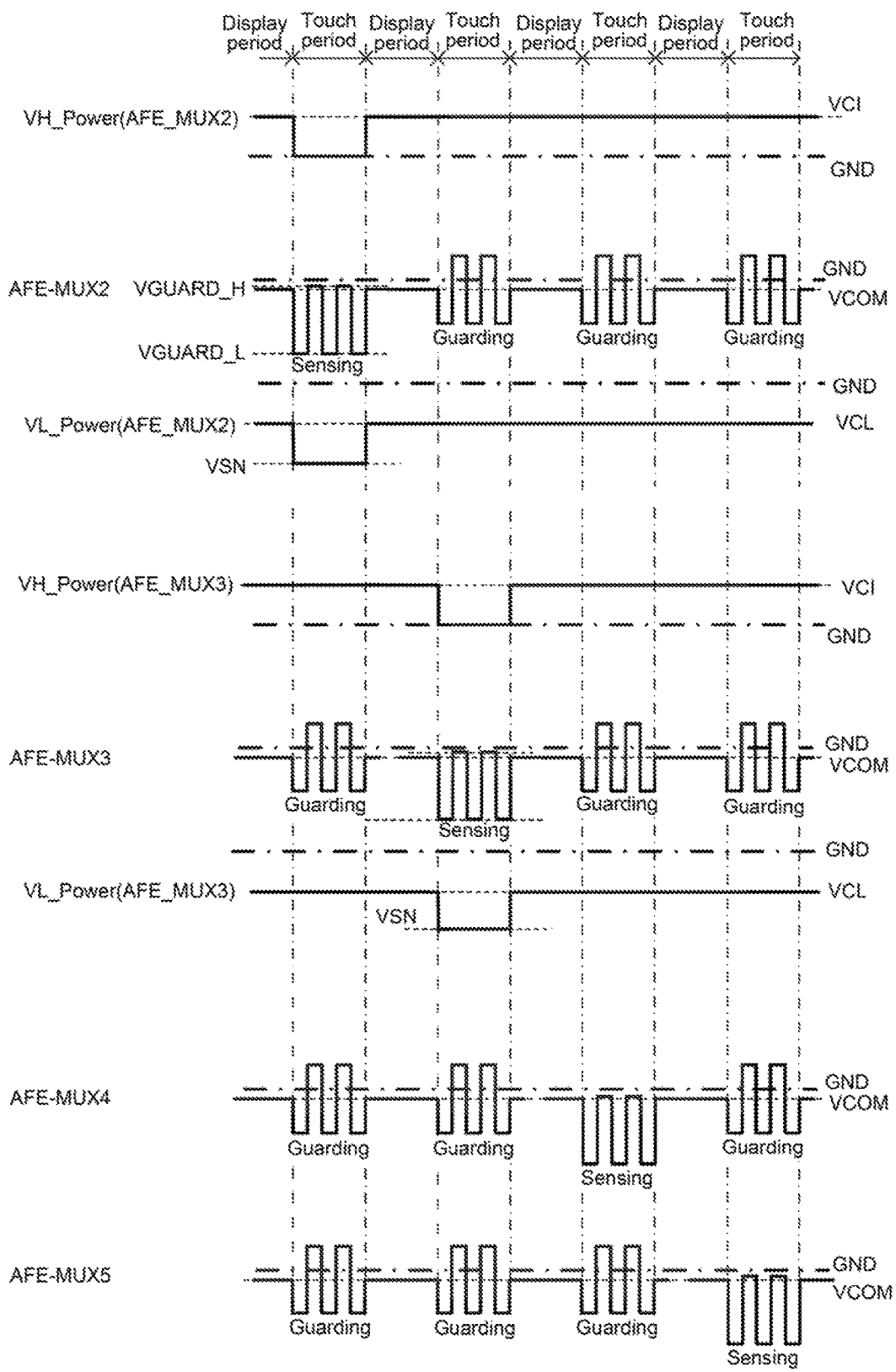
FIG. 26 is a waveform diagram showing an aspect of power supply to each AFE select circuit from the power source select circuit in the semiconductor device according to the fifth embodiment of the invention.

Next, the action of the semiconductor device 100 will be described further in detail. FIG. 26 is a waveform diagram showing an aspect of power supply to the AFE select circuits 1 and 2 from the power source select circuit 71 in the semiconductor device 100.

The following are shown in turn from the top in a vertical axis direction in FIG. 26 in the same way as in FIG. 13: a positive-polarity power source VH_Power (AFE_MUX2) supplied to AFE-MUX2; an output waveform of AFE-MUX2; a negative-polarity power source VL_Power(AFE_MUX2) supplied to AFE-MUX2; a positive-polarity power source VH_Power(AFE_MUX3) supplied to AFE-MUX3; an output waveform of AFE-MUX3; a negative-polarity power source VL_Power(AFE_MUX3) supplied to AFE-MUX3; an output waveform of AFE-MUX4; and an output waveform of AFE-MUX5. In a lateral axis direction, the display drive period and the touch detection period are alternately repeated. Specifically, the first display drive period (Display period), the first touch detection period (Touch period), the second display drive period, the second touch detection period, the third display drive period, the third touch detection period, the fourth display drive period, and the fourth touch detection period are shown in turn.

In the first touch detection period, AFE-MUX2 performs the touch detection action (Sensing), and other AFE-MUX3, AFE-MUX4 and AFE-MUX5 conduct the guarding action (Guarding). The power source to be supplied to AFE-MUX2 which performs the touch detection action (Sensing) is the ground voltage (GND) in positive polarity and the first negative voltage (VSN) in negative polarity; the output of AFE-MUX2 is a toggle signal alternating between VGUARD_L and VGUARD_H inclusive. The power source to be supplied to AFE-MUX3, AFE-MUX4 and AFE-MUX5 which perform the guarding action (Guarding) in this time is the second positive voltage (VCI) in positive polarity and the second negative voltage (VCL) in negative polarity; the outputs of AFE-MUX3, AFE-MUX4 and AFE-MUX5 are each a toggle signal (Guarding signal) with its DC level shifted to the reference voltage (VCOM).

In the second display drive period subsequent to the first touch detection period, and the third and fourth display drive periods, the power source to be supplied to all of AFE-MUX2, AFE-MUX3, AFE-MUX4 and AFE-MUX5 is the second positive voltage (VCI) in positive polarity and the second negative voltage (VCL) in negative polarity; the outputs of AFE-MUX2, AFE-MUX3, AFE-MUX4 and AFE-MUX5 are all the reference voltage (VCOM) for display.

In the second, third, fourth touch detection periods, AFE-MUX3, AFE-MUX4 and AFE-MUX5 perform the touch detection action (Sensing) instead of AFE-MUX2 in turn, and others AFE-MUX perform the guarding action (Guarding). The power source to be supplied to each AFE-MUX which performs the touch detection action (Sensing) is the ground voltage (GND) in positive polarity and the first negative voltage (VSN) in negative polarity. The power source to be supplied to the other AFE select circuits AFE-MUX which perform the guarding action (Guarding) in this time is the second positive voltage (VCI) in positive polarity and the second negative voltage (VCL) in negative polarity.

As described above, by switching the source voltages supplied to the AFE select circuits with the power source select circuit 71, the breakdown voltages of the elements for constituting the plurality of AFE select circuits AFE-MUX2, AFE-MUX3, AFE-MUX4 and AFE-MUX5 may be made values which allow the elements to ensure, of a potential difference between the first negative voltage (VSN) and the ground voltage (GND), and a potential difference between the second positive voltage (VCI) and the second negative voltage (VCL), a larger potential difference. For instance, with the aforementioned exemplary voltage values, the breakdown voltages of the elements may be made values which allow the elements to endure a 6V-action.

[Sixth Embodiment]

As described concerning the second embodiment, in the case of the display panel composed of an amorphous silicon (amorphous Silicon) LCM, the reference voltage (VCOM) for display varies around a voltage level, e.g. VCOM=−3V, which is larger than that in the case of LCM based on low-temperature polycrystal silicon (LTPS) in a negative polarity direction. In case that the power source supplied to the AFE select circuit 2 which performs the guarding action (Guarding) at this time is VCI/VCN, the amplitude of a toggle signal for the guarding action will be restricted.

Figure 27:
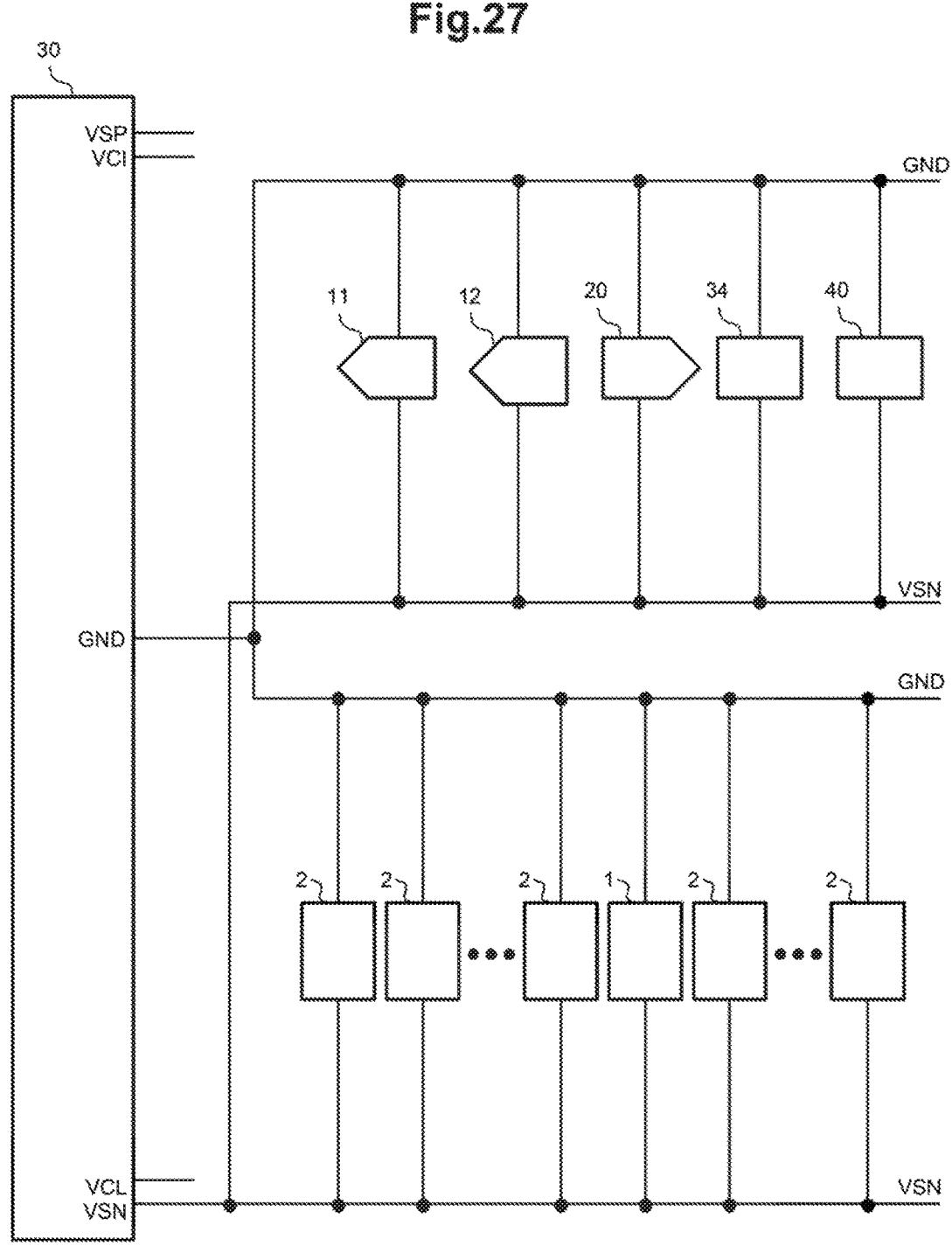
FIG. 27 is a block diagram showing an aspect of power supply to each circuit from the power source circuit in the semiconductor device according to the sixth embodiment of the invention.

FIG. 27 is a block diagram showing an aspect of power supply to each circuit from the power source circuit 30 in the semiconductor device 100.

The power source circuit 30 supplies each touch detection circuit (AFE) 20, the toggle drive circuit 12, the toggle output switch 34, and the source drive block 40 including the source amplifier 41 and the select switch 42 with the ground voltage (GND) and the first negative voltage (VSN), and it further supplies the reference voltage drive circuit 11 with the ground voltage (GND) and the first negative voltage (VSN) likewise. In addition, the power source circuit 30 supplies the AFE select circuits 1 and 2 with the ground voltage (GND) and the first negative voltage (VSN) regardless of whether the device is in a display drive period or touch detection period.

Thus, in the display panel composed of an amorphous silicon LCM, the amplitude of a toggle signal for the guarding action is not limited largely even in case that the reference voltage (VCOM) varies around e.g. −3V. In addition, the need for switching the source voltage between a display drive period and a touch detection period is eliminated and as such, the necessity for providing the power source select circuit 71 can be avoided.

Figure 28:
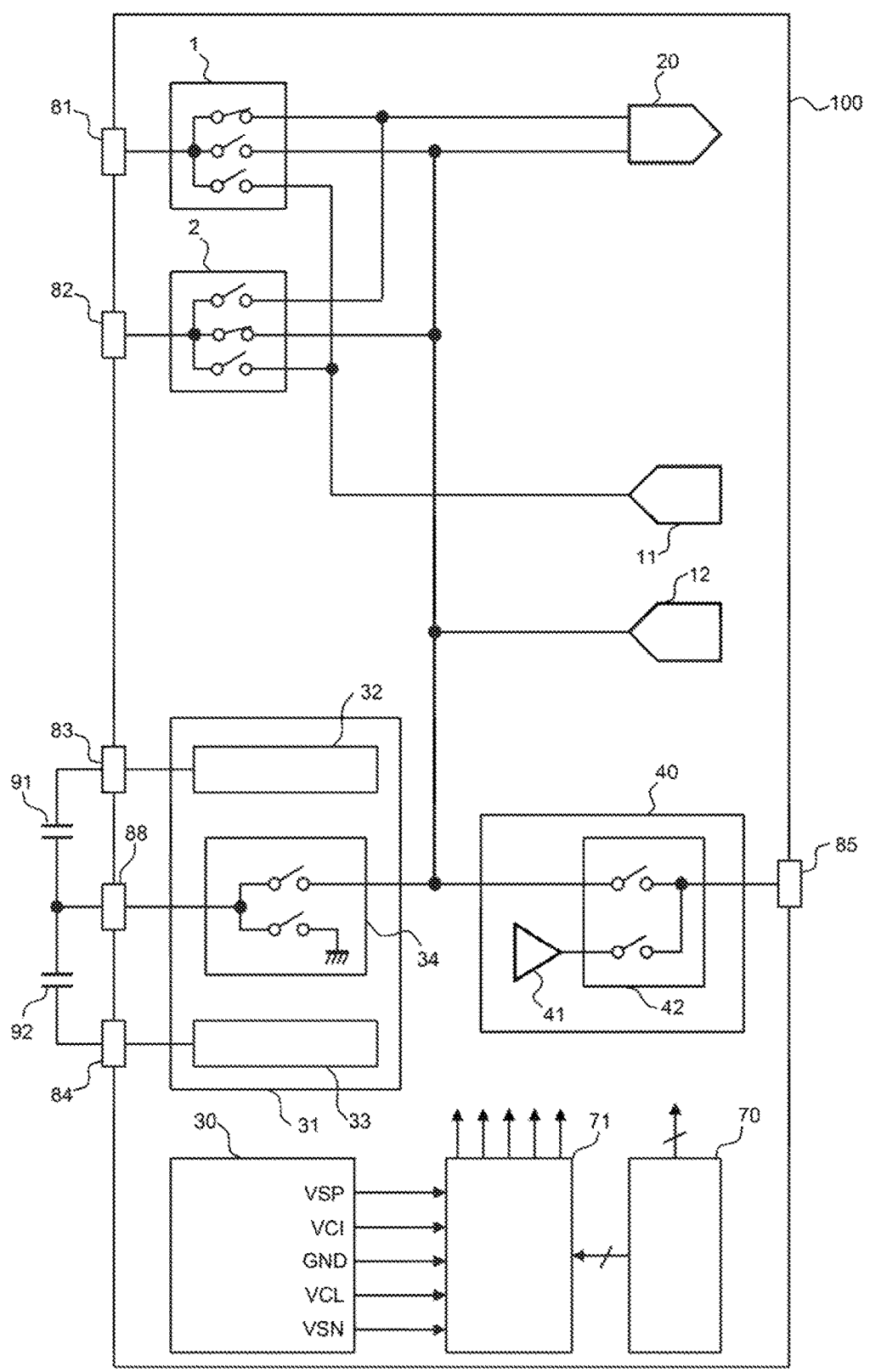
FIG. 28 is a block diagram showing an example of the configuration of a modification of the semiconductor device according to the sixth embodiment of the invention.

FIG. 28 is a block diagram showing an example of the configuration of a modification of the semiconductor device 100 according to the sixth embodiment of the invention.

In case that the reference voltage (VCOM) for display varies around −3V as described above under the condition that the ground voltage (GND) is 0V, the first positive voltage (VSP) is +6V, the second positive voltage (VCI) is +3V, the first negative voltage (VSN) is −6V, and the second negative voltage (VCL) is −3V, the DC level of a toggle signal can be brought close to the reference voltage (VCOM) in terms of design (ideally, made coincident therewith) instead of providing the DC level shift circuit 13 to actively shift the DC level of a toggle signal which is an output of the toggle drive circuit 12 to the reference voltage (VCOM). Thus, it becomes possible to omit a set of the terminals 86 and 87 and the externally attached capacitance 93 as shown in FIG. 28.

While the invent ion made by the inventor has been described above based on the embodiments concretely, the invention is not limited to the embodiments. It is obvious that various changes or modifications may be made without departing from the subject matter thereof. For instance, the description has been presented while showing, by example, a rectangular wave as the toggle signal, the toggle signal is arbitrary in waveform, which is allowed to take a sine wave, a cosine wave, a triangular wave or the like.

What is claimed is:

1. A semiconductor device configured to be connected with an in-cell type display touch panel having a plurality of common electrodes configured for display updating during a display drive period and as sensor electrodes during a touch detection period, the semiconductor device comprising:
    terminals connected with the plurality of common electrodes of the display touch panel, respectively;
    a plurality of select circuits connected with the plurality of terminals, respectively;
    a touch detection circuit;
    a reference voltage drive circuit configured to output the reference voltage to the plurality of common electrodes during the display drive period;
    a toggle drive circuit configured to supply a toggle signal to the plurality of common electrodes during the touch detection period, wherein the toggle signal alternates between a first voltage and a second voltage;
    a DC level shift circuit configured to shift the DC level of the toggle signal to the reference voltage; and
    a timing control circuit configured to:
        control the plurality of select circuits to supply the reference voltage output by the reference voltage drive circuit to the plurality of common electrodes via the plurality of terminals during the display drive period; and
        control the plurality of select circuits to supply a detection signal input from a first common electrode of the plurality of common electrodes via a first terminal of the plurality of terminals to the touch detection circuit and to synchronously supply the DC level shifted toggle signal to at least a second common electrode of the plurality of common electrodes via at least a second terminal of the plurality of terminals during the touch detection period.

2. The semiconductor device according to claim 1, wherein the DC level shift circuit comprises a pair of connection terminals for external attachment of a capacitance,
    the toggle drive circuit is further configured to output the toggle signal to one connection terminal of the connection terminal pair, and
    the timing control circuit is further configured to perform control so that an output to the other connection terminal of the connection terminal pair from the reference voltage drive circuit becomes the reference voltage output in the display drive period, and the output becomes high impedance in the touch detection period.

3. The semiconductor device according to claim 2, wherein the toggle drive circuit is configured such that during the display drive period the toggle signal coincides with the DC level of the toggle signal in the touch detection period.

4. The semiconductor device according to claim 1, wherein the DC level shift circuit comprises a pair of connection terminals for external attachment of a capacitance,
the toggle drive circuit is further configured to output the toggle signal to one connection terminal of the connection terminal pair, and
the timing control circuit is further configured to perform control so as to output the reference voltage output from the reference voltage drive circuit to the other connection terminal of the connection terminal pair directly in the display drive period or through a resistance in the touch detection period.

5. The semiconductor device according to claim 4, wherein during the display drive period the toggle signal coincides with the DC level of the toggle signal in the touch detection period.

6. The semiconductor device according to claim 1, further comprising:
a power source circuit configured to supply a first positive voltage, a second positive voltage lower than the first positive voltage, a ground voltage, a first negative voltage, and a second negative voltage higher than the first negative voltage, wherein the reference voltage is lower than the ground voltage and higher than the second negative voltage; and
a power source select circuit configured to:
supply the toggle drive circuit with the first positive voltage and the ground voltage as a power source;
supply the reference voltage drive circuit with the second positive voltage and the second negative voltage as a power source; and
supply the touch detection circuit with the first positive voltage and the ground voltage as a power source, and
the timing control circuit is further configured to cause the power source to be supplied from the power source circuit through the power source select circuit in such a way that the plurality of select circuits are supplied with the second positive voltage and the second negative voltage as the power source in the display drive period and, that in the touch detection period, the select circuit corresponding to the second terminal is supplied with the second positive voltage and the second negative voltage as the power source and the other select circuits are supplied with the first positive voltage and the ground voltage as the power source.

7. The semiconductor device according to claim 1, further comprising:
a power source circuit configured to:
supply the toggle drive circuit with a first positive voltage and a ground voltage as a power source;
supply the reference voltage drive circuit with the first positive voltage and a first negative voltage as a power source;
supply the touch detection circuit with the first positive voltage and the ground voltage as a power source;
supply the plurality of select circuits with the first positive voltage and the first negative voltage as a power source;
supply a second positive voltage is lower than the first positive voltage; and
supply a second negative voltage is higher than the first negative voltage, wherein the reference voltage is lower than the ground voltage and higher than the second negative voltage.

8. The semiconductor device according to claim 1, further comprising:
a power source circuit configured to: supply a first positive voltage, a second positive voltage lower than the first positive voltage, a ground voltage, a first negative voltage, and a second negative voltage higher than the first negative voltage, the reference voltage for display is lower than the ground voltage and higher than the second negative voltage; and
a power source select circuit configured to:
supply the toggle drive circuit with the ground voltage and the first negative voltage as a power source,
supply the reference voltage drive circuit with the second positive voltage and the second negative voltage as a power source, and
supply the touch detection circuit with the ground voltage and the first negative voltage as a power source,
wherein the timing control circuit is further configured to cause the power source to be supplied from the power source circuit through the power source select circuit in such a way that the plurality of select circuits are supplied with the second positive voltage and the second negative voltage as the power source in the display drive period, and that in the touch detection period, the select circuit corresponding to the second terminal is supplied with the second positive voltage and the second negative voltage as the power source, and the other select circuits are supplied with the ground voltage and the first negative voltage as the power source.

9. The semiconductor device according to claim 1, further comprising:
a power source circuit configured to:
supply the toggle drive circuit with a ground voltage and a first negative voltage as a power source;
supply the reference voltage drive circuit with the ground voltage and the first negative voltage as a power source,
supply the touch detection circuit with the ground voltage and the first negative voltage as a power source, and
supply the plurality of select circuits with the ground voltage and the first negative voltage as a power source;
supply a first positive voltage;
supply a second positive voltage that is lower than the first positive voltage; and
supply a second negative voltage higher than the first negative voltage,
wherein the reference voltage for display is lower than the ground voltage and higher than the second negative voltage.

10. The semiconductor device according to claim 1, further comprising:
a power source circuit configured to: supply a first positive voltage, a second positive voltage lower than the first positive voltage, a ground voltage, a first negative voltage, and a second negative voltage higher than the first negative voltage, the reference voltage for display is lower than the ground voltage and higher than the second negative voltage, and
a power source select circuit configured to:
supply the toggle drive circuit with the first positive voltage and the ground voltage as a power source;

the reference voltage drive circuit with the second positive voltage and the second negative voltage as a power source; and the touch detection circuit with the first positive voltage and the ground voltage as a power source, and the timing control circuit is further configured to cause the power source to be supplied from the power source circuit through the power source select circuit in such a way that the plurality of select circuits are supplied with the second positive voltage and the second negative voltage as the power source in the display drive period, and that in the touch detection period, the select circuit corresponding to the second terminal is supplied with a voltage alternating between the first positive voltage and the ground voltage in synchronization with the toggle signal in positive polarity, and a voltage alternating between the ground voltage and the first negative voltage in synchronization with the toggle signal in negative polarity as the power source, and the other select circuit is supplied with the first positive voltage and the ground voltage as the power source.

11. The semiconductor device according to claim 10, further comprising:

a common connection terminal configured to externally connect to first electrode of a first capacitance and a first electrode of a second capacitance;

a first connection terminal configured to externally connect to a second electrode of the first capacitance; and a second connection terminal configured to externally connect to a second electrode of the second capacitance, wherein the toggle drive circuit is further configured to output the toggle signal to the common connection terminal, the timing control circuit is further configured to control the reference voltage drive circuit to output to the first connection terminal the reference voltage output during the display drive period, and that in the touch detection period, the output of the reference voltage drive circuit is made high impedance or given to the first connection terminal after passing through a resistance, and the voltage supplied, in positive polarity, to the select circuit corresponding to the second terminal from the power source circuit through the power source select circuit in the touch detection period is the toggle signal, and the voltage supplied thereto in negative polarity is supplied from the second connection terminal.

12. The semiconductor device according to claim 1, wherein the touch detection circuit comprises:

a differential amplifier circuit having a pair of input terminals to which differential signals are input, a DC voltage level shift circuit configured to shift the DC voltage level to a first input terminal of the pair of input terminals, and the toggle drive circuit is further configured to supply the toggle signal to a second input terminal of the pair of input terminals, and the timing control circuit is further configured to control the plurality of select circuits to enter a signal input to the first terminal into the touch detection circuit through the DC voltage level shift circuit during the touch detection period, and wherein the semiconductor device further comprises:

a power source circuit configured to:

supply the toggle drive circuit with a first positive voltage and a ground voltage as a power source;

supply the reference voltage drive circuit with a second positive voltage and a second negative voltage as a power source;

supply the touch detection circuit with the first positive voltage and the ground voltage as a power source; and supply the plurality of select circuits with the second positive voltage and the second negative voltage as a power source, wherein the second positive voltage is lower than the first positive voltage, the second negative voltage is higher than the a negative voltage, and the reference voltage for display is lower than the ground voltage and higher than the second negative voltage.

13. The semiconductor device according to claim 12, wherein the DC voltage level shift circuit comprises a capacitive element between the second input terminal, and the corresponding one of the plurality of select circuits.

14. A display device comprising:

an in-cell type display touch panel comprising a plurality of common electrodes to which a reference voltage is applied during a display drive period, and the common electrodes are configured to serve as sensor electrodes during a touch detection period; and a semiconductor device connected with the display touch panel, the semiconductor device comprises:

a plurality of terminals connected with the plurality of common electrodes of the display touch panel, respectively;

a plurality of select circuits connected with the plurality of terminals, respectively;

a touch detection circuit;

a reference voltage drive circuit configured to supply the reference voltage to the display touch panel, a toggle drive circuit configured to supply a toggle signal to the sensor electrodes, wherein the toggle signal alternates between a first voltage and a second voltage;

a DC level shift circuit configured to shift the DC level of the toggle signal to the reference voltage; and a timing control circuit configured to:

control the plurality of select circuits to supply the reference voltage to the plurality of common electrodes via the plurality of terminals during the display drive period, and control the select circuits to supply a detection signal input from a first common electrode of the plurality of common electrode via a first terminal of the plurality of terminals to the touch detection circuit and to synchronously supply the DC level shifted toggle signal to at least a second common electrode of the plurality of common electrodes via at least via a second terminal of the plurality of terminals during the touch detection period.

15. The display device according to claim 14, further comprising:

a capacitance coupled to the DC level shift circuit via a pair of connection terminals, wherein the toggle drive circuit is further configured to output the toggle signal to one connection terminal of the connection terminal pair, and the timing control circuit is further configured to perform control so that an output to the other connection terminal of the connection terminal pair from the reference voltage drive circuit becomes the reference voltage output during the display drive period, and the output becomes high impedance during the touch detection period.

16. The display device according to claim 15, wherein the toggle drive circuit is configured such that during the display drive period the toggle signal coincides with the DC level of the toggle signal in the touch detection period.

17. The display device according to claim 14, further comprising a capacitance coupled to the DC level shift circuit via a pair of connection terminals,
the toggle drive circuit is further configured to output the toggle signal to one connection terminal of the connection terminal pair, and
the timing control circuit is further configured to perform control so as to output the reference voltage output from the reference voltage drive circuit to the other connection terminal of the connection terminal pair directly during the display drive period or through a resistance during the touch detection period.

18. The display device according to claim 17, wherein during the display drive period the toggle signal coincides with the DC level of the toggle signal in the touch detection period.

19. The display device according to claim 14, wherein the semiconductor device further comprises;
a power source circuit configured to supply a first positive voltage, a second positive voltage lower than the first positive voltage, a ground voltage, a first negative voltage, and a second negative voltage higher than the first negative voltage, wherein the reference voltage for display is lower than the ground voltage and higher than the second negative voltage; and
a power source select circuit configured to:
supply the toggle drive circuit with the first positive voltage and the ground voltage as a power source;
supply the reference voltage drive circuit with the second positive voltage and the second negative voltage as a power source; and
supply the touch detection circuit with the first positive voltage and the ground voltage as a power source, and
the timing control circuit is further configured to cause the power source to be supplied from the power source circuit through the power source select circuit in such a way that the plurality of select circuits are supplied with the second positive voltage and the second negative voltage as the power source in the display drive period and that in the touch detection period, the select circuit corresponding to the second terminal is supplied with the second positive voltage and the second negative voltage as the power source and the other select circuits are supplied with the first positive voltage and the ground voltage as the power source.

20. The display device according to claim 14, wherein the semiconductor device further comprises:
a power source circuit configured to supply a first positive voltage, a second positive voltage lower than the first positive voltage, a ground voltage, a first negative voltage, and a second negative voltage higher than the first negative voltage, wherein the reference voltage for display is lower than the ground voltage and higher than the second negative voltage; and
a power source select circuit configured to:
supply the toggle drive circuit with the ground voltage and the first negative voltage as a power source;
supply the reference voltage drive circuit with the second positive voltage and the second negative voltage as a power source; and
supply the touch detection circuit with the ground voltage and the first negative voltage as a power source,
wherein the timing control circuit is further configured to cause the power source to be supplied from the power source circuit through the power source select circuit in such a way that the plurality of select circuits are supplied with the second positive voltage and the second negative voltage as the power source in the display drive period and that in the touch detection period, the select circuit corresponding to the second terminal is supplied with the second positive voltage and the second negative voltage as the power source, and the other select circuits are supplied with the ground voltage and the first negative voltage as the power source.

21. The display device according to claim 14, wherein the semiconductor device further comprises:
a power source circuit configured to supply a first positive voltage, a second positive voltage lower than the first positive voltage, a ground voltage, a first negative voltage, and a second negative voltage higher than the first negative voltage,
the reference voltage for display is lower than the ground voltage and higher than the second negative voltage,
a power source select circuit configured to:
supply the toggle drive circuit with the first positive voltage and the ground voltage as a power source;
supply the reference voltage drive circuit with the second positive voltage and the second negative voltage as a power source; and
supply the touch detection circuit with the first positive voltage and the ground voltage as a power source,
wherein the timing control circuit is configured to cause the power source to be supplied from the power source circuit through the power source select circuit in such a way that the plurality of select circuits are supplied with the second positive voltage and the second negative voltage as the power source in the display drive period and that in the touch detection period, the select circuit corresponding to the second terminal is supplied with a voltage alternating between the first positive voltage and the ground voltage in synchronization with the toggle signal in positive polarity, and a voltage alternating between the ground voltage and the first negative voltage in synchronization with the toggle signal in negative polarity as the power source, and the other select circuit is supplied with the first positive voltage and the ground voltage as the power source.

22. The display device according to claim 14, wherein the touch detection circuit comprises a differential amplifier circuit having a pair of input terminals configured to receive differential signals,
the toggle drive circuit is further configured to output the toggle signal to a first input terminal of the input terminal pair,
the touch detection circuit comprises a DC voltage level shift circuit configured to shift the DC voltage level at a second input terminal of the pair of input terminals, and
the timing control circuit is further configured to control the plurality of select circuits to enter a signal input to the first terminal into the touch detection circuit through the DC voltage level shift circuit in the touch detection period, the semiconductor device further includes a power source circuit configured to:
  supply the toggle drive circuit with a first positive voltage and a ground voltage as a power source;
  supply the reference voltage drive circuit with a second positive voltage and a second negative voltage as a power source;
  supply the touch detection circuit with the first positive voltage and the ground voltage as a power source; and
  supply the plurality of select circuits with the second positive voltage and the second negative voltage as a power source,
wherein the second positive voltage is lower than the first positive voltage, and the second negative voltage is higher than a first negative voltage, and the reference voltage for display is lower than the ground voltage and higher than the second negative voltage.

* * * * *